United States Patent
Gotoh et al.

(10) Patent No.: US 9,296,951 B2
(45) Date of Patent: Mar. 29, 2016

(54) COMPOUND HAVING 3,3-DIFLUORO-1-PROPENYLOXY, LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yasuyuki Gotoh, Tokyo (JP); Masakazu Yano, Ichihara (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/470,702

(22) Filed: Aug. 27, 2014

(65) Prior Publication Data

US 2015/0060732 A1    Mar. 5, 2015

(30) Foreign Application Priority Data

Aug. 28, 2013    (JP) .................................. 2013-176577

(51) Int. Cl.

| | |
|---|---|
| *C09K 19/00* | (2006.01) |
| *C09K 19/30* | (2006.01) |
| *C09K 19/34* | (2006.01) |
| *C09K 19/20* | (2006.01) |
| *C09K 19/32* | (2006.01) |
| *C09K 19/42* | (2006.01) |
| *C09K 19/44* | (2006.01) |
| *C09K 19/04* | (2006.01) |

(52) U.S. Cl.
CPC ............. *C09K 19/3066* (2013.01); *C09K 19/20* (2013.01); *C09K 19/3068* (2013.01); *C09K 19/32* (2013.01); *C09K 19/322* (2013.01); *C09K 19/3444* (2013.01); *C09K 19/3458* (2013.01); *C09K 19/42* (2013.01); *C09K 19/44* (2013.01); *C09K 2019/0444* (2013.01); *C09K 2019/0466* (2013.01); *C09K 2019/3077* (2013.01); *C09K 2019/3083* (2013.01); *C09K 2019/3422* (2013.01); *C09K 2019/3425* (2013.01)

(58) Field of Classification Search
CPC .......... C09K 19/3066; C09K 19/3444; C09K 19/3458; C09K 19/3068; C09K 19/20; C09K 19/322; C09K 19/42; C09K 19/44; C09K 2019/3422; C09K 2019/3425; C09K 2019/3083; C09K 2019/0444; C09K 2019/0466; C09K 2019/3077
USPC ............... 252/299.01, 299.6, 299.61, 299.62, 252/299.63, 299.66; 428/1.1; 349/182
See application file for complete search history.

(56) References Cited

U.S. PATENT DOCUMENTS

| | | | |
|---|---|---|---|
| 5,403,512 A * | 4/1995 | Bartmann et al. ........ | 252/299.01 |
| 5,728,319 A | 3/1998 | Matsui et al. | |
| 2002/0120168 A1 | 8/2002 | Kondo et al. | |
| 2015/0060731 A1 * | 3/2015 | Saito et al. ............... | 252/299.61 |

FOREIGN PATENT DOCUMENTS

| | | |
|---|---|---|
| DE | 19959721 A1 | 6/2000 |
| JP | 2002053513 A | 2/2002 |
| WO | 9611897 A1 | 4/1996 |

* cited by examiner

*Primary Examiner* — Geraldina Visconti
(74) *Attorney, Agent, or Firm* — Hogan Lovells US LLP

(57) ABSTRACT

An object is to provide a liquid crystal compound satisfying at least one of physical properties such as a high stability to heat and light, a high clearing point, a low minimum temperature of a liquid crystal phase, a small viscosity, a suitable optical anisotropy, a large dielectric anisotropy, a suitable elastic constant and an excellent compatibility with other liquid crystal compounds, a liquid crystal composition containing the compound, and a liquid crystal display device including the composition. A solution is a compound represented by formula (1).

$$R^1 - (A^1 - Z^1)_a - A^2 - Z^2 - \underset{L^2}{\overset{L^1}{\text{Ar}}} - O - CF_2H \quad (1)$$

In formula 1,
$R^1$ is alkyl having 1 to 10 carbons, for example; ring $A^1$ and ring $A^2$ are independently 1,4-cyclohexylene or 1,4-phenylene; $Z^1$ and $Z^2$ are independently a single bond or —$CF_2O$—; $L^1$ and $L^2$ are halogen; and $a$ is 1 or 2.

14 Claims, No Drawings

COMPOUND HAVING 3,3-DIFLUORO-1-PROPENYLOXY, LIQUID CRYSTAL COMPOSITION AND LIQUID CRYSTAL DISPLAY DEVICE

TECHNICAL FIELD

The invention relates to a liquid crystal compound, a liquid crystal composition and a liquid crystal display device. More specifically, the invention relates to a compound having 3,3-difluoro-1-propenyloxy, a liquid crystal composition that contains the compound and has a nematic phase, and a liquid crystal display device including the composition.

A liquid crystal display device is widely utilized for a display of a personal computer, television and so forth. The device utilizes optical anisotropy, dielectric anisotropy and so forth of a liquid crystal compound. As an operating mode of the liquid crystal display device, such modes are known as a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode, a fringe field switching (FFS) mode and a polymer sustained alignment (PSA) mode.

For such a liquid crystal display device, a liquid crystal composition having suitable physical properties is used. In order to further improve characteristics of the liquid crystal display device, a liquid crystal compound contained in the composition preferably has physical properties described in items (1) to (8) below.

(1) High stability to heat, light and so forth,
(2) a high clearing point,
(3) a low minimum temperature of a liquid crystal phase,
(4) a small viscosity ($\eta$),
(5) a suitable optical anisotropy ($\Delta n$),
(6) a large dielectric anisotropy ($\Delta\epsilon$),
(7) a suitable elastic constant (K),
(8) an excellent compatibility with other liquid crystal compounds.

An effect of physical properties of the liquid crystal compound on the characteristics of the device is as described below. A compound having a high stability to heat, light and so forth as described in (1) increases a voltage holding ratio of the device. Thus, a service life of the device becomes longer. A compound having a high clearing point as described in (2) extends a temperature range in which the device can be used. A compound having a low minimum temperature of the liquid crystal phase such as a nematic phase and a smectic phase, as described in (3), in particular, a compound having a low minimum temperature of the nematic phase, also extends a temperature range in which the device can be used. A compound having a small viscosity as described in (4) decreases a response time of the device.

A compound having a suitable optical anisotropy as described in (5) improves a contrast of the device. In accordance with a design of the device, a compound having a large optical anisotropy or a small optical anisotropy, more specifically, a compound having a suitable optical anisotropy, is required. When decreasing the response time by decreasing a cell gap of the device, a compound having a large optical anisotropy is suitable. A compound having a large dielectric anisotropy as described in (6) decreases a threshold voltage of the device. Thus, an electric power consumption of the device is decreased. On the other hand, a compound having a small dielectric anisotropy decreases a response time of the device by a composition having a small viscosity.

With regard to (7), a compound having a large elastic constant decreases a response time of the device. A compound having a small elastic constant decreases the threshold voltage of the device. Therefore, a suitable elastic constant is required according to characteristics that are desirably improved. A compound having an excellent compatibility with other liquid crystal compounds as described in (8) is preferred because physical properties of a composition are adjusted by mixing liquid crystal compounds having different physical properties.

A variety of liquid crystal compounds having a large dielectric anisotropy have so far been prepared because excellent physical properties that are not found in conventional compounds are expected from a new compound, and because a suitable balance between at least two of physical properties is expected to be obtained by adding a new compound to a liquid crystal composition. Under such a circumstance, development has been desired for a compound having excellent physical properties and a suitable balance with regard to items (1) to (8) described above, and in particular, for a compound having a large dielectric anisotropy ($\Delta\epsilon$).

CITATION LIST

Patent Literature

Patent literature No. 1: DE 19959721 A.
Patent literature No. 2: WO 96/011897 A.
Patent literature No. 3: JP 2002-53513 A.

SUMMARY OF INVENTION

Technical Problem

A first object of the invention is to provide a liquid crystal compound having at least one of physical properties such as a high stability to light, a high clearing point, a low minimum temperature of a liquid crystal phase, a small viscosity, a suitable optical anisotropy, a large dielectric anisotropy, a suitable elastic constant and an excellent compatibility with other liquid crystal compounds. The object is to provide a compound having a particularly large dielectric anisotropy. A second object is to provide a liquid crystal composition that contains the compound and satisfies at least one of physical properties such as a high maximum temperature of a nematic phase, a low minimum temperature of the nematic phase, a small viscosity, a suitable optical anisotropy, a large dielectric anisotropy and a suitable elastic constant. The object is to provide a liquid crystal composition having a suitable balance regarding at least two of the physical properties. A third object is to provide a liquid crystal display device that includes the composition, and has a wide temperature range in which the device can be used, a short response time, a large voltage holding ratio, a low threshold voltage, a large contrast ratio and a long service life.

Solution to Problem

The invention concerns a compound represented by formula (1), a liquid crystal composition containing the compound, and a liquid crystal display device including the composition.

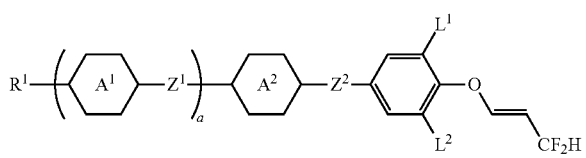
(1)

In formula (1),

R$^1$ is alkyl having 1 to 10 carbons, and in the alkyl, at least one of —CH$_2$— may be replaced by —O—, at least one of —CH$_2$CH$_2$— may be replaced by —CH=CH—, and in the groups, at least one of hydrogen may be replaced by halogen;

ring A$^1$ and ring A$^2$ are independently 1,4-cyclohexylene, 1,4-cyclohexenylene, 1,4-phenylene, 1,4-phenylene in which at least one of hydrogen is replaced by halogen, tetrahydropyran-2,5-diyl, pyrimidine-2,5-diyl, pyridine-2,5-diyl, 1,3-dioxane-2,5-diyl or 2,6,7-trioxabicyclo[2.2.2]octane-1,4-diyl;

Z$^1$ and Z$^2$ are independently a single bond or alkylene having 1 to 4 carbons, and in the alkylene, at least one of —CH$_2$— may be replaced by —O— or —COO—, at least one of —CH$_2$CH$_2$— may be replaced by —CH=CH— or and in the groups, at least one of hydrogen may be replaced by halogen;

L$^1$ and L$^2$ are independently hydrogen or halogen; and a is 0, 1, 2 or 3.

Advantageous Effects of Invention

A first advantage of the invention is to provide a liquid crystal compound satisfying at least one of physical properties such as a high stability to light, a high clearing point, a low minimum temperature of a liquid crystal phase, a small viscosity, a suitable optical anisotropy, a large dielectric anisotropy, a suitable elastic constant and an excellent compatibility with other liquid crystal compounds. The advantage is to provide a compound having a particularly large dielectric anisotropy. A second advantage is to provide a liquid crystal composition that contains the compound and satisfies at least one of physical properties such as a high maximum temperature of a nematic phase, a low minimum temperature of the nematic phase, a small viscosity, a suitable optical anisotropy, a large dielectric anisotropy and a suitable elastic constant. A third advantage is to provide a liquid crystal display device that includes the composition and has a wide temperature range in which the device can be used, a short response time, a large voltage holding ratio, a low threshold voltage, a large contrast ratio and a long service life.

DESCRIPTION OF EMBODIMENTS

Usage of terms herein is as described below. A liquid crystal compound is a generic term for a compound having a liquid crystal phase such as a nematic phase or a smectic phase, and also for a compound having no liquid crystal phase but being added for the purpose of adjusting physical properties of a composition, such as a maximum temperature, a minimum temperature, viscosity and dielectric anisotropy. The compounds have a 6-membered ring such as 1,4-cyclohexylene and 1,4-phenylene, and rod-like molecular structure. A liquid crystal composition is adjusted by mixing such liquid crystal compound. A ratio (content) of the liquid crystal compounds is expressed in terms of weight percent (% by weight) based on the weight of the liquid crystal composition.

An additive such as a polymerizable compound, a polymerization initiator, an optically active compound, an antioxidant, an ultraviolet light absorber, a light stabilizer, a heat stabilizer, a defoaming agent and a coloring matter is added to the composition, when necessary. A ratio (content) of the additive is expressed in terms of weight percent (% by weight) based on the weight of the liquid crystal composition in a manner similar to the ratio of the liquid crystal compound. Weight parts per million (ppm) may be occasionally used. A liquid crystal display device is a generic term for a liquid crystal display panel and a liquid crystal display module. The liquid crystal compound, the liquid crystal composition and the liquid crystal display device may be occasionally abbreviated as "compound," "composition" and "device," respectively. A clearing point is a transition temperature between the liquid crystal phase and an isotropic phase in the liquid crystal compound. A minimum temperature of the liquid crystal phase is a transition temperature between a solid and the liquid crystal phase (the smectic phase, the nematic phase or the like) in the liquid crystal compound. A maximum temperature of the nematic phase is a transition temperature between the nematic phase and the isotropic phase in the liquid crystal composition, and may be occasionally abbreviated as a maximum temperature. A minimum temperature of the nematic phase may be occasionally abbreviated as a minimum temperature.

A compound represented by formula (1) may be occasionally abbreviated as "compound (1)." The abbreviation may also apply to a compound represented by formula (2) or the like. In formulas (1) to (15), symbol A$^1$, symbol B$^1$, symbol C$^1$ or the like surrounded by a hexagonal shape corresponds to ring A$^1$, ring B$^1$, ring C$^1$ or the like, respectively. A symbol of terminal group R$^{11}$ is used for a plurality of compounds. In the compounds, two groups represented by two of arbitrary R$^{11}$ may be identical or different. In one example, R$^{11}$ of compound (2) is ethyl and R$^{11}$ of compound (3) is ethyl. In another example, R$^{11}$ of compound (2) is ethyl and R$^{11}$ of compound (3) is propyl. A same rule also applies to a symbol of any other terminal group, ring or the like. In formula (5), two of ring C$^1$ exist when i is 2. In the compound, two groups represented by two of ring C$^1$ may be identical or different. A same rule is applied to arbitrary two when i is larger than 2. The rule is also applied to a symbol of any other ring, bonding group or the like.

An expression "at least one of "A" may be replaced by "B"" means that a position of "A" is arbitrary when the number of "A" is 1, and also when the number of "A" is two or more, positions thereof can be selected without restriction. An expression "at least one of A may be replaced by B, C or D" means inclusion of a case where arbitrary A is replaced by B, a case where arbitrary A is replaced by C, and a case where arbitrary A is replaced by D, and also a case where a plurality of A are replaced by at least two of B, C or D. For example, alkyl in which at least one of —CH$_2$— may be replaced by —O— or —CH=CH— includes alkyl, alkenyl, alkoxy, alkoxyalkyl, alkoxyalkenyl and alkenyloxyalkyl. In addition, such a case where replacement of two successive —CH$_2$— by —O— results in forming —O—O— is not preferred. In alkyl or the like, a case where replacement of —CH$_2$— of a methyl part (—CH$_2$—H) by —O— results in forming —O—H is not preferred, either.

Then, 2-fluoro-1,4-phenylene means two divalent groups described below. In a chemical formula thereof, fluorine may be leftward (L) or may be rightward (R). The rule is also applied to an asymmetrical divalent ring in tetrahydropyran-2,5-diyl or the like.

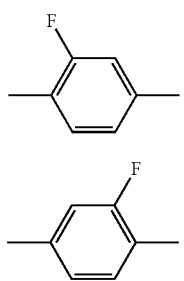

The invention includes the content as described in item 1 to item 14 below.

Item 1. A compound represented by formula (1):

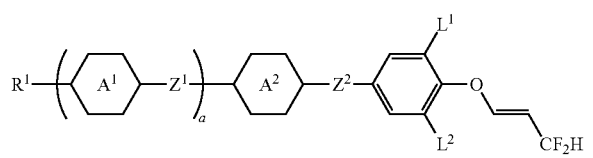

In formula (1),

R¹ is alkyl having 1 to 10 carbons, and in the alkyl, at least one of —CH₂— may be replaced by —O—, at least one of —CH₂CH₂— may be replaced by —CH═CH—, and in the groups, at least one of hydrogen may be replaced by halogen;

ring A¹ and ring A² are independently 1,4-cyclohexylene, 1,4-cyclohexenylene, 1,4-phenylene, 1,4-phenylene in which at least one of hydrogen is replaced by halogen, tetrahydropyran-2,5-diyl, pyrimidine-2,5-diyl, pyridine-2,5-diyl, 1,3-dioxane-2,5-diyl or 2,6,7-trioxabicyclo[2.2.2]octane-1,4-diyl;

Z¹ and Z² are independently a single bond or alkylene having 1 to 4 carbons, and in the alkylene, at least one of —CH₂— may be replaced by —O— or —COO—, at least one of —CH₂CH₂— may be replaced by —CH═CH— or and at least one of hydrogen may be replaced by halogen;

L¹ and L² are independently hydrogen or halogen; and a is 0, 1, 2 or 3.

Item 2. The compound according to item 1, wherein, in formula (1),

R¹ is alkyl having 1 to 10 carbons, and in the alkyl, at least one of —CH₂— may be replaced by —O—, at least one of —CH₂CH₂— may be replaced by —CH═CH—, and in the groups, at least one of hydrogen may be replaced by halogen;

ring A¹ and ring A² are independently 1,4-cyclohexylene, 1,4-cyclohexenylene, 1,4-phenylene, 1,4-phenylene in which at least one of hydrogen is replaced by halogen, tetrahydropyran-2,5-diyl, pyrimidine-2,5-diyl, pyridine-2,5-diyl, 1,3-dioxane-2,5-diyl or 2,6,7-trioxabicyclo[2.2.2]octane-1,4-diyl;

Z¹ and Z² are independently a single bond, —CH₂CH₂—, —CH═CH—, —CF₂O—, —CH₂O— or —COO—;

L¹ and L² are independently hydrogen or halogen; and a is 0, 1, 2 or 3.

Item 3. The compound according to item 1, wherein, in formula (1),

R¹ is alkyl having 1 to 10 carbons or alkenyl having 2 to 10 carbons, and in the groups, at least one of hydrogen may be replaced by fluorine;

ring A¹ and ring A² are independently 1,4-cyclohexylene, 1,4-phenylene, 2-fluoro-1,4-phenylene, 2,6-difluoro-1,4-phenylene, 2-chloro-1,4-phenylene, 2-chloro-6-fluoro-1,4-phenylene, 2,6-dichloro-1,4-phenylene, tetrahydropyran-2,5-diyl, 1,3-dioxane-2,5-diyl or 2,6,7-trioxabicyclo[2.2.2]octane-1,4-diyl;

Z¹ and Z² are independently a single bond, —CH₂CH₂—, —CH═CH—, —CF₂O— or —COO—;

L¹ and L² are independently hydrogen, chlorine or fluorine; and a is 0, 1, 2 or 3.

Item 4. The compound according to item 1, wherein, in formula (1), R¹ is alkyl having 1 to 10 carbons or alkenyl having 2 to 10 carbons; ring A¹ and ring A² are independently 1,4-cyclohexylene, 1,4-phenylene, 2-fluoro-1,4-phenylene, 2,6-difluoro-1,4-phenylene, 2-chloro-1,4-phenylene, 2-chloro-6-fluoro-1,4-phenylene, tetrahydropyran-2,5-diyl or 1,3-dioxane-2,5-diyl; Z¹ and Z² are a single bond, —CH₂CH₂—, —CH═CH— or —CF₂O—; L¹ and L² are independently hydrogen, chlorine or fluorine; and a is 0, 1 or 2.

Item 5. The compound according to item 1, wherein, in formula (1), R¹ is alkyl having 1 to 10 carbons or alkenyl having 2 to 10 carbons; ring A¹ and ring A² are independently 1,4-cyclohexylene, 1,4-phenylene, 2-fluoro-1,4-phenylene, 2,6-difluoro-1,4-phenylene, tetrahydropyran-2,5-diyl or 1,3-dioxane-2,5-diyl; Z¹ and Z² are a single bond or —CF₂O—; L¹ and L² are independently hydrogen or fluorine; and a is 1, 2 or 3.

Item 6. The compound according to item 1, wherein, in formula (1), R¹ is alkyl having 1 to 10 carbons or alkenyl having 2 to 10 carbons; ring A¹ and ring A² are independently 1,4-cyclohexylene, 1,4-phenylene, 2-fluoro-1,4-phenylene, 2,6-difluoro-1,4-phenylene, tetrahydropyran-2,5-diyl or 1,3-dioxane-2,5-diyl; Z¹ and Z² are a single bond or CF₂O; L¹ and L² are fluorine; and a is 0, 1 or 2.

Item 7. The compound according to item 1, represented by formula (1-2), (1-3) or (1-4):

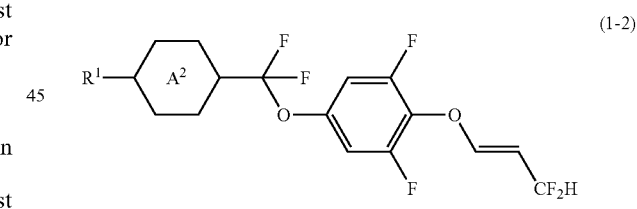

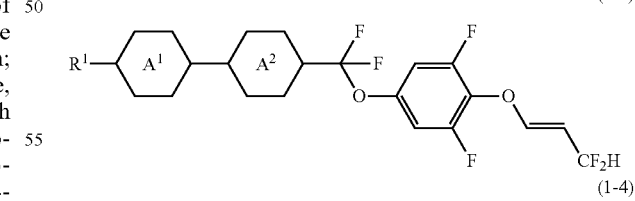

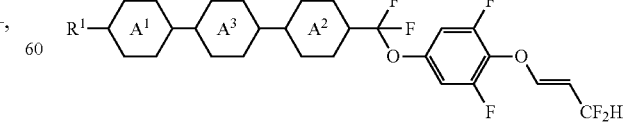

wherein, in formulas (1-2), (1-3) and (1-4),

R¹ is alkyl having 1 to 10 carbons or alkenyl having 2 to 10 carbons;

ring $A^1$ is 1,4-cyclohexylene, 1,4-phenylene, 2-fluoro-1,4-phenylene, 2,6-difluoro-1,4-phenylene, tetrahydropyran-2,5-diyl or 1,3-dioxane-2,5-diyl; and ring $A^2$ and ring $A^3$ are independently 1,4-cyclohexylene, 1,4-phenylene, 2-fluoro-1,4-phenylene or 2,6-difluoro-1,4-phenylene.

Item 8. A liquid crystal composition, containing at least one compound according to any one of items 1 to 7.

Item 9. The liquid crystal composition according to item 8, further containing at least one compound selected from the group of compounds represented by formulas (2) to (4):

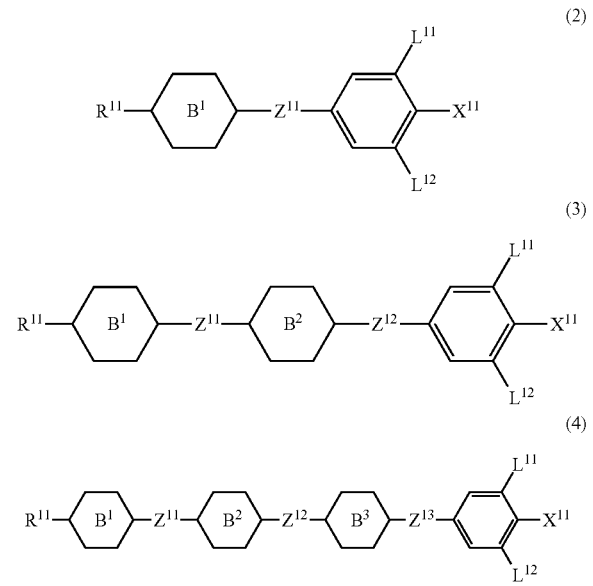

(2)

(3)

(4)

wherein, in formulas (2) to (4), $R^{11}$ is alkyl having 1 to 10 carbons or alkenyl having 2 to 10 carbons, and in the alkyl and the alkenyl, at least one of hydrogen may be replaced by fluorine and at least one of —$CH_2$— may be replaced by —O—;

$X^{11}$ is fluorine, chlorine, —$OCF_3$, —$OCHF_2$, —$CF_3$, —$CHF_2$, —$CH_2F$, —$OCF_2CHF_2$ or —$OCF_2CHFCF_3$;

ring $B^1$, ring $B^2$ and ring $B^3$ are independently 1,4-cyclohexylene, 1,4-phenylene in which at least one of hydrogen may be replaced by fluorine, tetrahydropyran-2,5-diyl, 1,3-dioxane-2,5-diyl or pyrimidine-2,5-diyl;

$Z^{11}$, $Z^{12}$ and $Z^{13}$ are independently a single bond, —$CH_2CH_2$—, —$CH=CH$—, —$COO$—, —$CF_2O$—, —$OCF_2$—, —$CH_2O$— or —$(CH_2)_4$—; and $L^{11}$ and $L^{12}$ are independently hydrogen or fluorine.

Item 10. The liquid crystal composition according to item 8 or 9, further containing at least one compound selected from the group of compounds represented by formula (5):

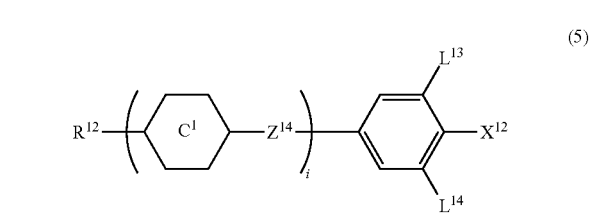

(5)

wherein, in formula (5), $R^{12}$ is alkyl having 1 to 10 carbons or alkenyl having 2 to 10 carbons, and in the alkyl and the alkenyl, at least one of hydrogen may be replaced by fluorine and at least one of —$CH_2$— may be replaced by —O—;

$X^{12}$ is —C≡N or —C≡C—C≡N;

ring $C^1$ is 1,4-cyclohexylene, 1,4-phenylene in which at least one of hydrogen may be replaced by fluorine, tetrahydropyran-2,5-diyl, 1,3-dioxan-2,5-diyl or pyrimidine-2,5-diyl;

$Z^{14}$ is a single bond, —$CH_2CH_2$—, —C≡C—, —COO—, —$CF_2O$—, —$OCF_2$— or —$CH_2O$—;

$L^{13}$ and $L^{14}$ are independently hydrogen or fluorine; and i is 1, 2, 3 or 4.

Item 11. The liquid crystal composition according to any one of items 8 to 10, further containing at least one compound selected from the group of compounds represented by formulas (6) to (12):

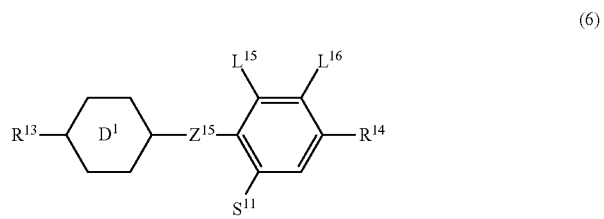

(6)

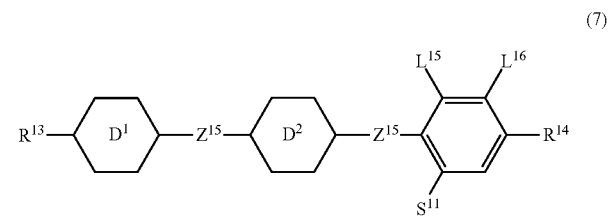

(7)

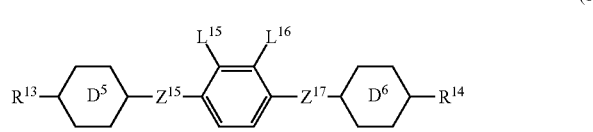

(8)

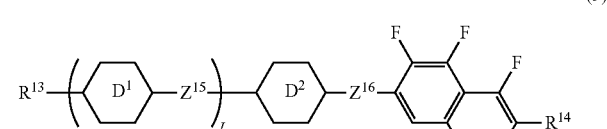

(9)

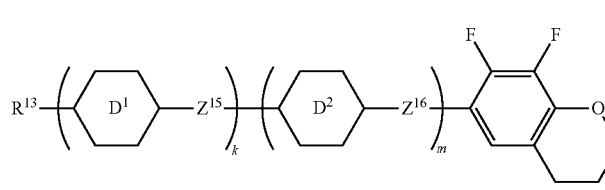

(10)

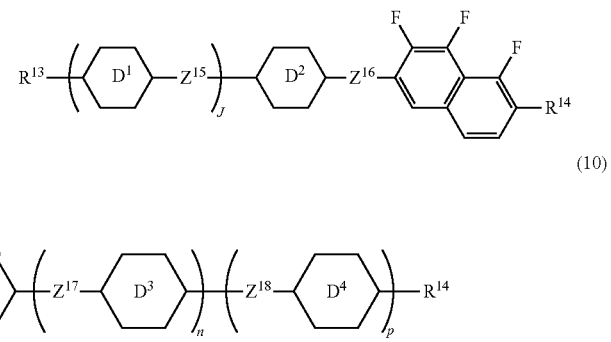

-continued

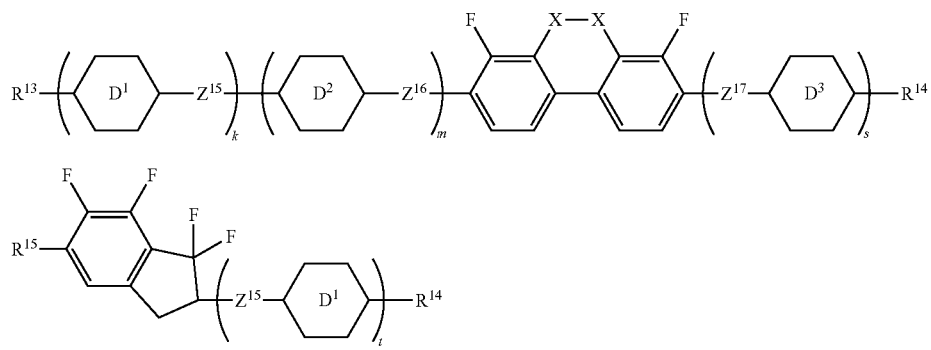

wherein, in formulas (6) to (12), $R^{13}$ and $R^{14}$ are independently alkyl having 1 to 10 carbons or alkenyl having 2 to 10 carbons, and in the alkyl and the alkenyl, at least one of —$CH_2$— may be replaced by —O— and at least one of hydrogen may be replaced by fluorine;

$R^{15}$ is hydrogen, fluorine, alkyl having 1 to 10 carbons or alkenyl having 2 to 10 carbons, and in the alkyl and the alkenyl, at least one of —$CH_2$— may be replaced by —O— and at least one of hydrogen may be replaced by fluorine;

$S^{11}$ is hydrogen or methyl;

X is —$CF_2$—, —O— or —CHF—;

ring $D^1$, ring $D^2$, ring $D^3$ and ring $D^4$ are independently 1,4-cyclohexylene, 1,4-cyclohexenylene, 1,4-phenylene in which at least one of hydrogen may be replaced by fluorine, tetrahydropyran-2,5-diyl or decahydronaphthalene-2,6-diyl;

ring $D^5$ and ring $D^6$ are independently 1,4-cyclohexylene, 1,4-cyclohexenylene, 1,4-phenylene, tetrahydropyran-2,5-diyl or decahydronaphthalene-2,6-diyl;

$Z^{15}$, $Z^{16}$, $Z^{17}$ and $Z^{18}$ are independently a single bond, —$CH_2CH_2$—, —COO—, —$CH_2O$—, —$OCF_2$— or —$OCF_2CH_2CH_2$—;

$L^{15}$ and $L^{16}$ are independently fluorine or chlorine; and j, k, m, n, p, q, r and s are independently 0 or 1, a sum of k, m, n and p is 1 or 2, a sum of q, r and s is 0, 1, 2 or 3, and t is 1, 2 or 3.

Item 12. The liquid crystal composition according to any one of items 8 to 11, further containing at least one compound selected from the group of compounds represented by formulas (13) to (15):

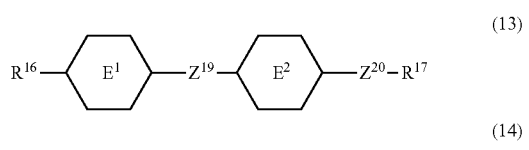

(13)

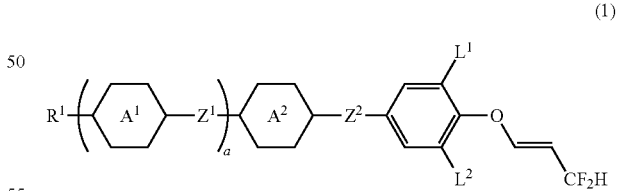

(14)

(15)

wherein, in formulas (13) to (15), $R^{16}$ and $R^{17}$ are independently alkyl having 1 to 10 carbons or alkenyl having 2 to 10 carbons, and in the alkyl or the alkenyl, at least one of —$CH_2$— may be replaced by —O— and at least one of hydrogen may be replaced by fluorine;

ring $E^1$, ring $E^2$, ring $E^3$ and ring $E^4$ are independently 1,4-cyclohexylene, 1,4-phenylene, 2-fluoro-1,4-phenylene, 2,5-difluoro-1,4-phenylene or pyrimidine-2,5-diyl; and $Z^{19}$, $Z^{20}$ and $Z^{21}$ are independently a single bond, —$CH_2CH_2$—, —CH=CH—, —C≡C— or —COO—.

Item 13. The liquid crystal composition according to any one of items 8 to 12, further containing at least one of a polymerizable compound, an optically active compound, an antioxidant, an ultraviolet light absorber, a light stabilizer, a heat stabilizer and a defoaming agent.

Item 14. A liquid crystal display device including the liquid crystal composition according to any one of items 8 to 13.

The compound, the liquid crystal composition and the liquid crystal display device according to the invention will be described in the order.

1-1. Compound (1)

Compound (1) of the invention includes a compound having 3,3-difluoro-1-propenyloxy, and therefore has a feature of having a particularly large dielectric anisotropy (Δ∈). Moreover, 3,3-difluoro-1-propenyloxy has an E isomer and a Z isomer, but includes both in the invention. Compound (1) and preferred examples of compound (1) according to the invention will be described. Preferred examples of a terminal group, a ring structure, a bonding group and a substituent in compound (1) are also applied to a compound represented by a subordinate formula of compound (1):

(1)

wherein, in formula (1), $R^1$ is alkyl having 1 to 10 carbons, and in the alkyl, at least one of —$CH_2$— may be replaced by —O—, at least one of —$CH_2CH_2$— may be replaced by —CH=CH—, and in the groups, at least one of hydrogen may be replaced by halogen.

Examples of such left-terminal group $R^1$ include alkyl, alkoxy, alkoxyalkyl, alkoxyalkoxy, alkenyl, alkenyloxy, alkenyloxyalkyl and alkoxyalkenyl. In the groups, at least one of hydrogen may be replaced by halogen. Preferred halogen is fluorine or chlorine. Further preferred halogen is fluorine. The groups have a straight chain or a branched chain, and do not include a cyclic group such as cyclohexyl. In the groups, a straight chain is preferred to a branched chain.

A preferred configuration of —CH═CH— in alkenyl depends on a position of a double bond. A trans configuration is preferred in alkenyl having the double bond in an odd-numbered position, such as —CH═CHCH$_3$, —CH═CHC$_2$H$_5$, —CH═CHC$_3$H$_7$, —CH═CHC$_4$H$_9$, —C$_2$H$_4$—CH═CHCH$_3$ and —C$_2$H$_4$—CH═CHC$_2$H$_5$. A cis configuration is preferred in alkenyl having the double bond in an even-numbered position, such as —CH$_2$CH═CHCH$_3$, —CH$_2$CH═CHC$_2$H$_5$ and —CH$_2$CH═CHC$_3$H$_7$. The alkenyl compound having a preferred configuration has a high clearing point or a wide temperature range of the liquid crystal phase. Detailed description is found in Mol. Cryst. Liq. Cryst., 1985, 131, 109 and Mol. Cryst. Liq. Cryst., 1985, 131 and 327.

Examples of alkyl include —CH$_3$, —C$_2$H$_5$, —C$_3$H$_7$, —C$_4$H$_9$, —C$_5$H$_{11}$, —C$_6$H$_{13}$ or —C$_7$H$_{15}$.

Examples of alkoxy include —OCH$_3$, —OC$_2$H$_5$, —OC$_3$H$_7$, —OC$_4$H$_9$, —OC$_5$H$_{11}$, —OC$_6$H$_{13}$ or —OC$_7$H$_{15}$.

Examples of alkoxyalkyl include —CH$_2$OCH$_3$, —CH$_2$OC$_2$H$_5$, —CH$_2$OC$_3$H$_7$, —(CH$_2$)$_2$—OCH$_3$, —(CH$_2$)$_2$—OC$_2$H$_5$, —(CH$_2$)$_2$—OC$_3$H$_7$, —(CH$_2$)$_3$—OCH$_3$, —(CH$_2$)$_4$—OCH$_3$ or —(CH$_2$)$_5$—OCH$_3$.

Examples of alkenyl include —CH═CH$_2$, —CH═CHCH$_3$, —CH$_2$CH═CH$_2$, —CH═CHC$_2$H$_5$, —CH$_2$CH═CHCH$_3$, —(CH$_2$)$_2$—CH═CH$_2$, —CH═CHC$_3$H$_7$, —CH$_2$CH═CHC$_2$H$_5$, —(CH$_2$)$_2$—CH═CHCH$_3$ or —(CH$_2$)$_3$—CH═CH$_2$.

Examples of alkenyloxy include —OCH$_2$CH═CH$_2$, —OCH$_2$CH═CHCH$_3$ or —OCH$_2$CH═CHC$_2$H$_5$.

Examples of alkyl in which at least one of hydrogen is replaced by halogen include —CH$_2$F, —CHF$_2$, —CF$_3$, —(CH$_2$)$_2$—F, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCF$_2$CF$_3$, —(CH$_2$)$_4$—F, —(CF$_2$)$_4$—F, —(CH$_2$)$_5$—F, —(CF$_2$)$_5$—F, —CH$_2$Cl, —CHCl$_2$, —CCl$_3$, —(CH$_2$)$_2$—Cl, —CCl$_2$CH$_2$Cl, —CCl$_2$CHCl$_2$, —CH$_2$CCl$_3$, —CCl$_2$CCl$_3$, —(CH$_2$)$_3$—Cl, —(CCl$_2$)$_3$—Cl, —CCl$_2$CHClCCl$_3$, —CHClCCl$_2$CCl$_3$, —(CH$_2$)$_4$—Cl, —(CCl$_2$)$_4$—Cl, —(CH$_2$)$_5$—Cl or —(CCl$_2$)$_5$—Cl.

Examples of alkoxy in which at least one of hydrogen is replaced by halogen include —OCH$_2$F, —OCHF$_2$, —OCF$_3$, —O—(CH$_2$)$_2$—F, —OCF$_2$CH$_2$F, —OCF$_2$CHF$_2$, —OCH$_2$CF$_3$, —O—(CH$_2$)$_3$—F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CH$_2$)$_5$—F, —O—(CF$_2$)$_5$—F, —OCH$_2$Cl, —OCHCl$_2$, —OCCl$_3$, —O—(CH$_2$)$_2$—Cl, —OCCl$_2$CH$_2$Cl, —OCCl$_2$CHCl$_2$, —OCH$_2$CCl$_3$, —O—(CH$_2$)$_3$—Cl, —O—(CCl$_2$)$_3$—Cl, —OCCl$_2$CHClCCl$_3$, —OCHClCCl$_2$CCl$_3$, —O(CH$_2$)$_4$—Cl, —O—(CCl$_2$)$_4$—Cl, —O—(CH$_2$)$_5$—Cl or —O—(CCl$_2$)$_5$—Cl.

Examples of alkenyl in which at least one of hydrogen is replaced by halogen include —CH═CHF, —CH═CF$_2$, —CF═CHF, —CH═CHCH$_2$F, —CH═CHCF$_3$, —(CH$_2$)$_2$—CH═CF$_2$, —CH$_2$CH═CHCF$_3$, —CH═CHCF$_2$CF$_3$, —CH═CHCl, —CH═CCl$_2$, —CCl═CHCl, —CH═CHCH$_2$Cl, —CH═CHCCl$_3$, —(CH$_2$)$_2$—CH═CCl$_2$, —CH$_2$CH═CHCCl$_3$ or —CH═CHCCl$_2$CCl$_3$.

Preferred examples of R$^1$ include alkyl having 1 to 10 carbons, alkenyl having 2 to 10 carbons, alkoxy having 1 to 10 carbons, alkyl having 1 to 10 carbons in which one or two of hydrogen are replaced by fluorine, or alkenyl having 2 to 10 carbons in which one or two of hydrogen are replaced by fluorine. Further preferred examples of R$^1$ include alkyl having 1 to 7 carbons or alkenyl having 2 to 8 carbons. Most preferred examples of R$^1$ include —CH$_3$, —C$_2$H$_5$, —C$_3$H$_7$, —C$_4$H$_9$, —C$_5$H$_{11}$, —CH═CH$_2$, —CH═CHCH$_3$, —(CH$_2$)$_2$—CH═CH$_2$, —CH$_2$CH═CHC$_2$H$_5$ or —(CH$_2$)$_2$—CH═CHCH$_3$.

In formula (1), ring A$^1$ and ring A$^2$ are independently 1,4-cyclohexylene, 1,4-cyclohexenylene, 1,4-phenylene, 1,4-phenylene in which at least one of hydrogen is replaced by halogen, tetrahydropyran-2,5-diyl, pyrimidine-2,5-diyl, pyridine-2,5-diyl, 1,3-dioxane-2,5-diyl or 2,6,7-trioxabicyclo[2.2.2]octane-1,4-diyl.

Preferred examples of ring A$^1$ or ring A$^2$ include 1,4-cyclohexylene, 1,4-phenylene, 1,4-phenylene in which at least one of hydrogen is replaced by halogen, tetrahydropyran-2,5-diyl, 1,3-dioxane-2,5-diyl or 2,6,7-trioxabicyclo[2.2.2]octane-1,4-diyl. Cis and trans configurations exist in 1,4-cyclohexylene. From a viewpoint of a high maximum temperature, the trans configuration is referred. Preferred examples of 1,4-phenylene in which at least one of hydrogen are replaced by halogen include rings (A-1) to (A-17).

(A-1)

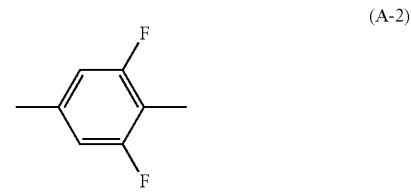
(A-2)

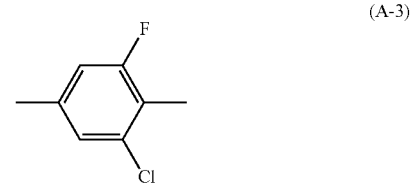
(A-3)

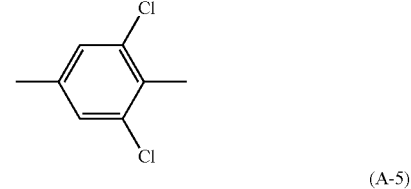
(A-4)

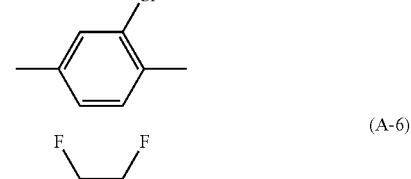
(A-5)

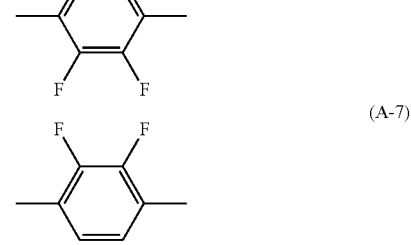
(A-6)

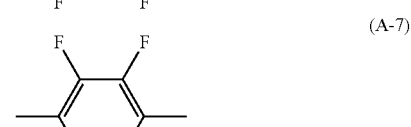
(A-7)

-continued

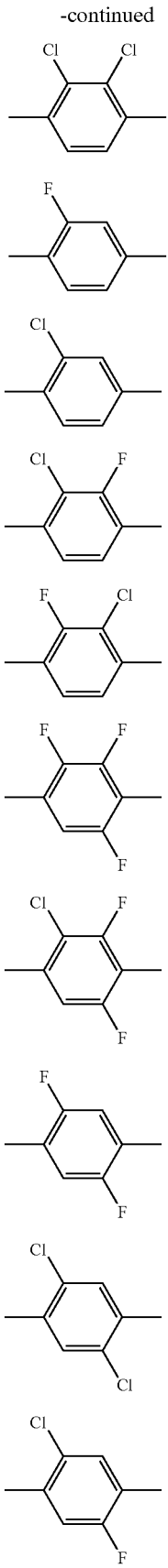

(A-8)
(A-9)
(A-10)
(A-11)
(A-12)
(A-13)
(A-14)
(A-15)
(A-16)
(A-17)

Then, 2-fluoro-1,4-phenylene is not left-right symmetric. In a chemical formula thereof, fluorine includes a case where the fluorine is located on a side of a left-terminal group (leftward: A-9) and a case where the fluorine is located on a side of a right-terminal group (rightward: A-1). Preferred 2-fluoro-1,4-phenylene is rightward (A-1) in order to increase the dielectric anisotropy. The fact described above is also applied to 2,6-difluoro-1,4-phenylene and so forth. More specifically, groups (A-1) to (A-5) are further preferred.

Further preferred examples of 1,4-phenylene in which at least one of hydrogen is replaced by halogen include 2-fluoro-1,4-phenylene, 2,6-difluoro-1,4-phenylene, 2-chloro-6-fluoro-1,4-phenylene, 2,6-dichloro-1,4-phenylene or 2-chloro-1,4-phenylene. Most preferred examples of 1,4-phenylene in which at least one of hydrogen is replaced by halogen include 2-fluoro-1,4-phenylene or 2,6-difluoro-1,4-phenylene.

Further preferred examples of ring $A^1$ or ring $A^2$ include 1,4-cyclohexylene, 1,4-phenylene, 2-fluoro-1,4-phenylene, 2,6-difluoro-1,4-phenylene, tetrahydropyran-2,5-diyl or 1,3-dioxane-2,5-diyl.

In formula (1), bonding groups $Z^1$ and $Z^2$ are independently a single bond or alkylene having 1 to 4 carbons, and in the alkylene, at least one of —$CH_2$— may be replaced by —O— or —COO—, at least one of —$CH_2CH_2$— may be replaced by —CH=CH— or and in the groups, at least one of hydrogen may be replaced by halogen. Preferred examples of $Z^1$ or $Z^2$ include a single bond, —$CH_2CH_2$—, —CH=CH—, —$CF_2O$—, —$CH_2O$— or —COO—, and further preferred examples of $Z^1$ or $Z^2$ include a single bond or —$CF_2O$—. As for a preferred combination of $Z^1$ or $Z^2$, $Z^1$ is a single bond and $Z^2$ is —$CF_2O$—.

In formula (1), $L^1$ and $L^2$ are independently hydrogen or halogen. Preferred halogen is fluorine or chlorine. Further preferred halogen is fluorine. As for a preferred combination of $L^1$ and $L^2$, one of $L^1$ and $L^2$ is hydrogen and the other is fluorine. As for a further preferred combination of $L^1$ and $L^2$, both $L^1$ and $L^2$ are fluorine.

In formula (1), a is 0, 1, 2 or 3. Preferred a is 0, 1 or 2. From a viewpoint of a small viscosity, preferred a is 0 or 1. From a viewpoint of a high maximum temperature or a large dielectric anisotropy, preferred a is 2.

1-2. Physical Properties of Compound (1)

In compound (1), physical properties such as a clearing point, optical anisotropy and dielectric anisotropy can be arbitrarily adjusted by suitably combining kinds of $R^1$, ring $A^1$, ring $A^2$, $Z^1$, $Z^2$, $L^1$ and $L^2$. Compound (1) may also contain an isotope such as $^2H$ (deuterium) and $^{13}C$ in an amount larger than an amount of natural abundance, because no significant difference is in the physical properties of the compound. A main effect of kinds of $R^1$ or the like on the physical properties of compound (1) will be described below.

When left-terminal group $R^1$ has a straight chain, the temperature range of the liquid crystal phase is wide and the viscosity is small. When $R^1$ has a branched chain, the compatibility with other liquid crystal compounds is good. A compound in which $R^1$ is optically active is useful as a chiral dopant. A reverse twisted domain to be generated in the liquid crystal device can be prevented by adding the compound to the composition. A compound in which $R^1$ is not optically active is useful as a component of the composition. When $R^1$ is alkenyl, a preferred configuration depends on a position of the double bond. An alkenyl compound having the preferred configuration has a small viscosity, the high maximum temperature or the wide temperature range of the liquid crystal phase.

When all of ring $A^1$ and ring $A^2$ are 1,4-cyclohexylene, the clearing point is high and the viscosity is small. When at least one of ring $A^1$ and ring $A^2$ is 1,4-phenylene, or 1,4-phenylene in which at least one of hydrogen is replaced by halogen, the optical anisotropy is comparatively large and an orientation order parameter is comparatively large. When all of ring $A^1$ and ring $A^2$ are 1,4-phenylene, 1,4-phenylene in which at least one of hydrogen is replaced by halogen, or a combination thereof, the optical anisotropy is particularly large. When at least one of ring $A^1$ and ring $A^2$ is 1,4-phenylene in which at least one of hydrogen is replaced by halogen, tetrahydropyran-2,5-diyl, pyrimidine-2,5-diyl, pyridine-2,5-diyl, 1,3-dioxane-2,5-diyl or 2,6,7-trioxabicyclo[2.2.2]octane-1,4-diyl, the dielectric anisotropy is large.

When a bonding group $Z^1$ or $Z^2$ is a single bond, —$CH_2CH_2$—, —CH=CH— or —$CF_2O$—, the viscosity is small. When $Z^1$ or $Z^2$ is —CH=CH— or —$CH_2O$—, the temperature range of the liquid crystal phase is wide, and an elastic constant (K) is large. When $Z^1$ or $Z^2$ is —CH=CH— or the optical anisotropy is large. When $Z^1$ or $Z^2$ is —$CF_2O$— or —COO—, the dielectric anisotropy is large. When $Z^1$ or $Z^2$ is a single bond, —$CH_2CH_2$— or —$CH_2O$—, chemical stability is high.

When one of $L^1$ and $L^2$ is fluorine, the dielectric anisotropy is large. When both $L^1$ and $L^2$ are fluorine, the dielectric anisotropy is particularly large.

As described above, a compound having objective physical properties can be obtained by suitably selecting a kind of the ring structure, the terminal group, the bonding group or the like. Accordingly, compound (1) is useful as a component of a liquid crystal composition to be used for a liquid crystal display device having such a mode as PC, TN, STN, ECB, OCB, IPS or VA.

1-3. Preferred Compound

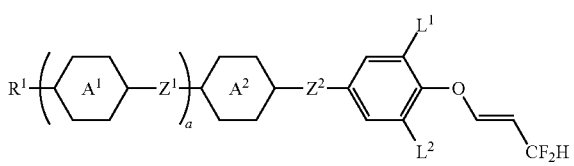
(1)

One of further preferred examples of compound (1) includes a compound represented by formula (1-2):

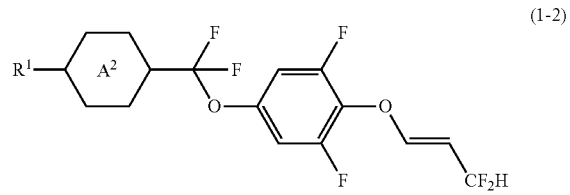
(1-2)

wherein, in formula (1-2), $R^1$ is alkyl having 1 to 10 carbons or alkenyl having 2 to 10 carbons; and ring $A^2$ is 1,4-cyclohexylene, 1,4-phenylene, 1,3-dioxane-2,5-diyl or tetrahydropyran-2,5-diyl.

A most preferred example is a compound in which, in formula (1-2), $R^1$ is alkyl having 1 to 7 carbons or alkenyl having 2 to 8 carbons; and ring $A^2$ is 1,4-cyclohexylene or 1,4-phenylene.

One of further preferred examples of compound (1) includes a compound represented by formula (1-3):

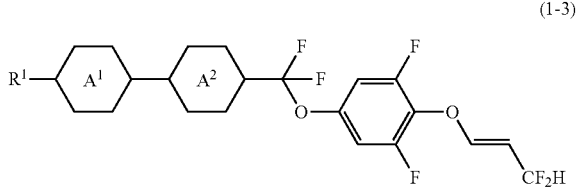
(1-3)

wherein, in formula (1-3), $R^1$ is alkyl having 1 to 10 carbons or alkenyl having 2 to 10 carbons; ring $A^1$ is 1,4-cyclohexylene, 1,4-phenylene, 1,3-dioxane-2,5-diyl or tetrahydropyran-2,5-diyl; and ring $A^2$ is 1,4-cyclohexylene, 1,4-phenylene, 2-fluoro-1,4-phenylene or 2,6-difluoro-1,4-phenylene.

A most preferred example is a compound in which, in formula (1-3), $R^1$ is alkyl having 1 to 7 carbons or alkenyl having 2 to 8 carbons; ring $A^1$ is 1,4-cyclohexylene or 1,4-phenylene; and ring $A^2$ is 1,4-cyclohexylene, 1,4-phenylene or 2,6-difluoro-1,4-phenylene.

One of further preferred examples of compound (1) includes a compound represented by formula (1-4):

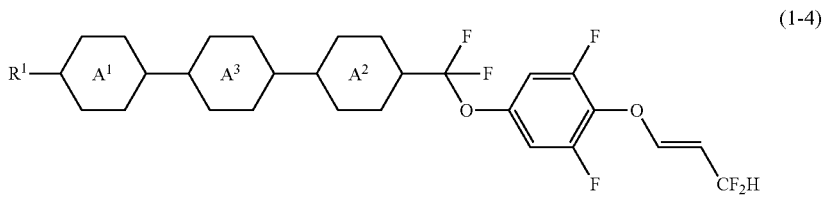
(1-4)

wherein, in formula (1-4), $R^1$ is alkyl having 1 to 10 carbons or alkenyl having 2 to 10 carbons; ring $A^1$ is 1,4-cyclohexylene, 1,4-phenylene, 1,3-dioxane-2,5-diyl or tetrahydropyran-2,5-diyl; and ring $A^2$ and ring $A^3$ are independently 1,4-cyclohexylene, 1,4-phenylene, 2-fluoro-1,4-phenylene or 2,6-difluoro-1,4-phenylene.

A most preferred example is a compound in which, in formula (1-4), $R^1$ is alkyl having 1 to 7 carbons or alkenyl having 2 to 8 carbons; ring $A^1$ is 1,4-cyclohexylene or 1,4-phenylene; and ring $A^2$ and ring $A^3$ are independently 1,4-cyclohexylene, 1,4-phenylene or 2,6-difluoro-1,4-phenylene.

1-4. Synthesis of Compound (1)

A method for synthesizing compound (1) will be described. Compound (1) can be prepared by suitably combining methods in synthetic organic chemistry. Methods for introducing an objective terminal group, ring and bonding group into a starting material are described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.).

1-4-1. Formation of a Bonding Group

An example of a method for forming a bonding group in compound (1) is as described in the scheme below. In the scheme, $MSG^1$ (or $MSG^2$) is a monovalent organic group having at least one ring. The monovalent organic groups represented by a plurality of $MSG^1$ (or $MSG^2$) may be identical or different. Compounds (1A) to (1G) correspond to compound (1) or an intermediate of compound (1).

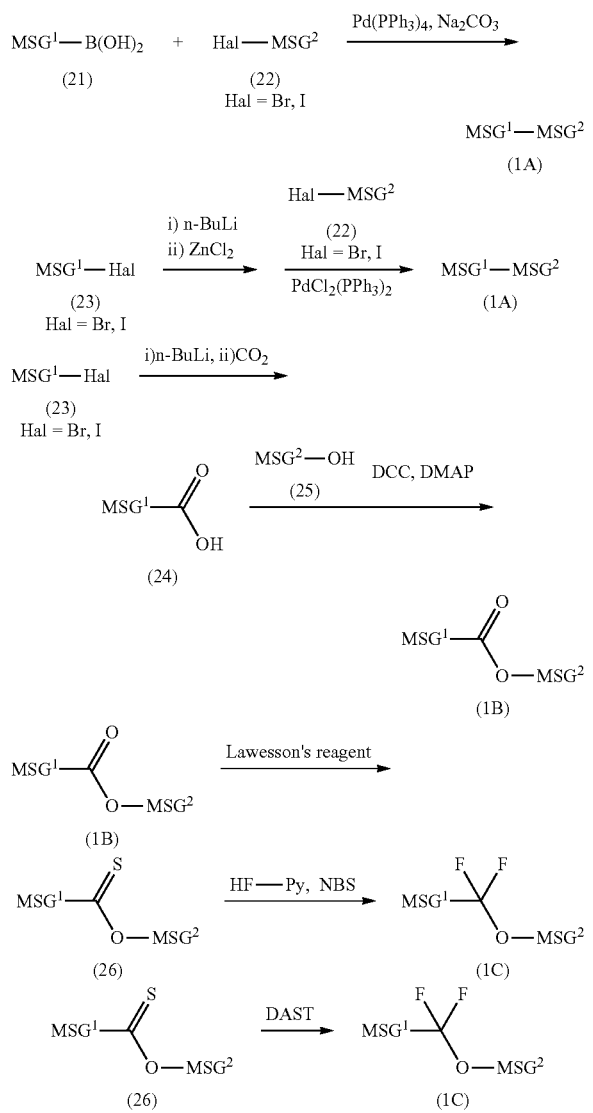

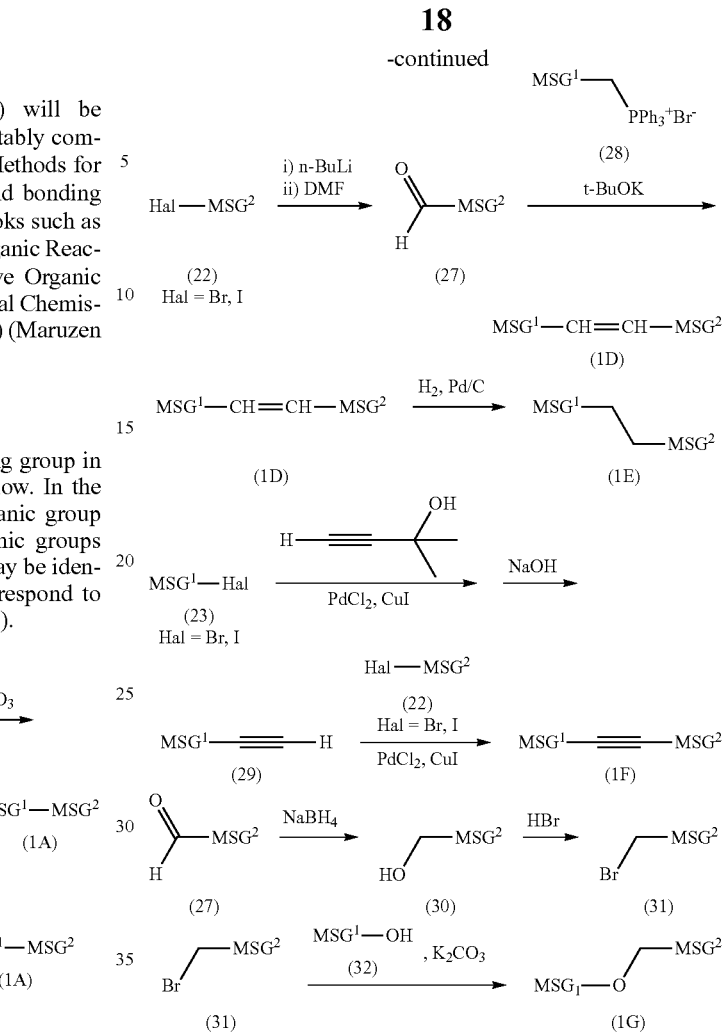

(I) Formation of a Single Bond

Compound (1A) is prepared by allowing arylboronic acid (21) to react, in the presence of carbonate and a catalyst including tetrakis(triphenylphosphine)palladium, with compound (22). Compound (1A) is also prepared by allowing compound (23) to react with n-butyllithium and subsequently with zinc chloride, and further with compound (22) in the presence of a catalyst including dichlorobis(triphenylphosphine)palladium.

(II) Formation of —COO—

Carboxylic acid (24) is obtained by allowing compound (23) to react with n-butyllithium and subsequently with carbon dioxide. Compound (1B) having —COO— is prepared by performing, in the presence of 1,3-dicyclohexylcarbodiimide (DCC) and 4-dimethylaminopyridine (DMAP), dehydration of carboxylic acid (24) and phenol (25) derived from compound (21).

(III) Formation of —$CF_2O$—

Compound (26) is obtained by sulfurizing compound (1B) with a Lawesson's reagent. Compound (1C) having —$CF_2O$— is prepared by fluorinating compound (26) with a hydrogen fluoride-pyridine complex and N-bromosuccinimide (NBS). See M. Kuroboshi et al., Chem. Lett., 1992, 827. Compound (1C) is also prepared by fluorinating compound (26) with (diethylamino)sulfur trifluoride (DAST). See W. H. Bunnelle et al., J. Org. Chem. 1990, 55, 768.

(IV) Formation of —CH═CH—

Aldehyde (27) is obtained by allowing compound (22) to react with n-butyllithium and subsequently with N,N-dimethylformamide (DMF). Compound (1D) is prepared by allowing phosphorus ylide generated by allowing phosphonium salt (28) to react with potassium tert-butoxide to react with aldehyde (27). A cis isomer is generated depending on reaction conditions, and therefore the cis isomer is isomerized into a trans isomer according to a publicly known method, when necessary.

(V) Formation of —CH$_2$CH$_2$—

Compound (1E) is prepared by hydrogenating compound (1D) in the presence of a catalyst including palladium on carbon.

(VI) Formation of —C≡C—

Compound (29) is obtained by allowing compound (23) to react with 2-methyl-3-butyn-2-ol in the presence of a catalyst including dichloropalladium and copper iodide, and then performing deprotection under basic conditions. Compound (1F) is prepared by allowing compound (29) to react with compound (22) in the presence of a catalyst including dichlorobis(triphenylphosphine)palladium and copper halide.

(VII) Formation of —CH$_2$O—

Compound (30) is obtained by reducing compound (27) with sodium borohydride. Compound (31) is obtained by brominating the compound (30) with hydrobromic acid. Compound (1G) is prepared by allowing compound (31) to react with compound (32) in the presence of potassium carbonate.

1-4-2. Formation of Ring A$^1$ and Ring A$^2$

With regard to a ring such as 1,4-cyclohexylene, 1,4-phenylene, 2-fluoro-1,4-phenylene, 2,6-difluoro-1,4-phenylene, tetrahydropyran-2,5-diyl, 1,3-dioxane-2,5-diyl, pyrimidine-2,5-diyl, pyridine-2,5-diyl and 2,6,7-trioxabicyclo[2.2.2]octane-1,4-diyl, a starting material is commercially available or a synthetic process is well known.

1-4-3. Synthesis Examples

An example of a method for preparing compound (1) is as described below. According to a method described in JP 2007-277127 A, compound (42) is prepared. Compound (44) is obtained by heating a mixture of compound (42), MnO$_2$ (manganese dioxide), propargyl alcohol and triethylamine (TEA) at 50° C. for 14 hours in a toluene solvent. Compound (1) is obtained by heating a mixture of compound (44), 1,1,2,2-tetrafluoroethyl-N,N-dimethylamine (TFEDMA) and a hydrogen fluoride-pyridine complex (HF-Py) at 70° C. for 65 hours in a 1,2-dichloroethane solvent. In the compounds, R$^1$, ring A$^1$, ring A$^2$, Z$^1$, Z$^2$, L$^1$, L$^2$ and a are defined in a manner identical with the definitions in item 1 described above.

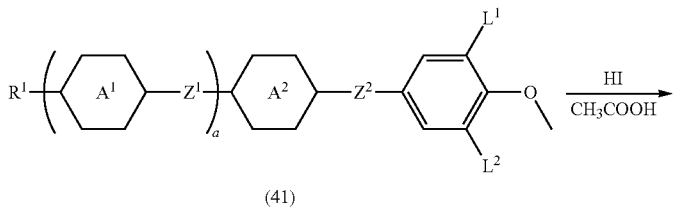

(41)

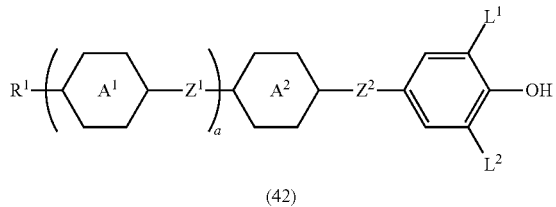

(42)

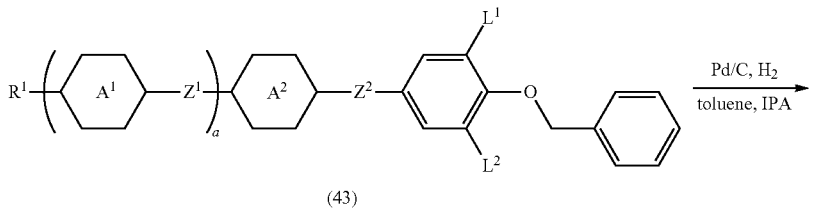

(43)

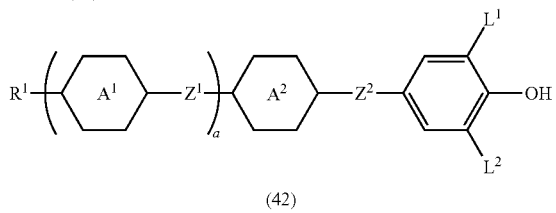

(42)

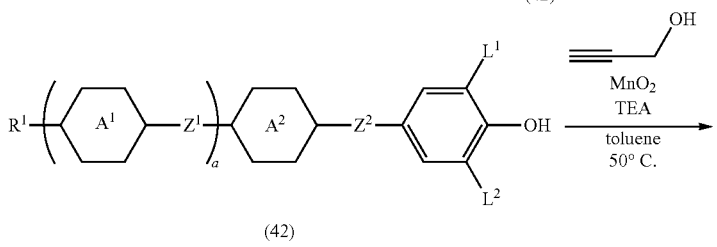

(42)

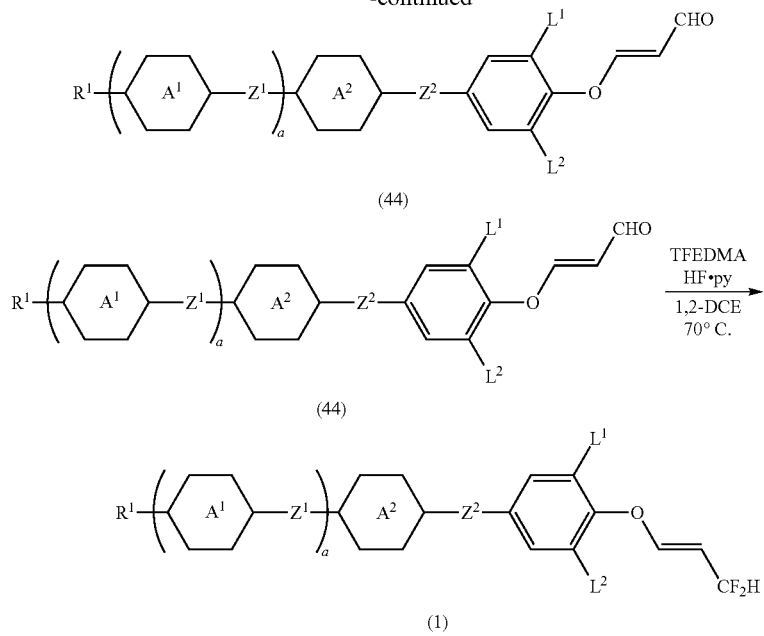

(44)

(44)

(1)

2. Composition (1)

Liquid crystal composition (1) of the invention will be described. Composition (1) contains at least one compound (1) as component A. Composition (1) may contain two or more compounds (1). A component of the liquid crystal compound may be compound (1) only. In order to develop excellent physical properties, composition (1) preferably contains at least one of compounds (1) in the range of approximately 1% by weight to approximately 99% by weight. In a composition having a positive dielectric anisotropy, a preferred content of compound (1) is in the range of approximately 5% by weight to approximately 60% by weight. In a composition having a negative dielectric anisotropy, a preferred content of compound (1) is approximately 30% by weight or less. Composition (1) may also contain compound (1) and various liquid crystal compounds that are not described herein.

A preferred composition contains a compound selected from components B, C, D and E shown below. When composition (1) is prepared, components can be selected, for example, by taking dielectric anisotropy of compound (1) into consideration. When a composition having a positive dielectric anisotropy is prepared for a mode such as TFT, IPS and FFS, main components include components A, B and E. When a composition having a positive dielectric anisotropy is prepared for a mode such as STN and TN, main components include components A, C and E. When a composition having a negative dielectric anisotropy is prepared for a mode such as VA and PSA, main components include components D and E, and component A is added for the purpose of adjusting a voltage-transmittance curve of a device. A composition prepared by suitably selecting components has a high maximum temperature, a low minimum temperature, a small viscosity, a suitable optical anisotropy, a large dielectric anisotropy and a suitable elastic constant.

Component B includes compounds (2) to (4). Component C includes compound (5). Component D includes compounds (6) to (12). Component E includes compounds (13) to (15). The components will be described in the order.

Component B includes a compound having a halogen-containing group or a fluorine-containing group at a right terminal. Specific preferred examples of component B include compounds (2-1) to (2-16), compounds (3-1) to (3-113) or compounds (4-1) to (4-57). In the compounds, $R^{11}$ and $X^{11}$ are defined in a manner identical with the definitions in item 9 described above.

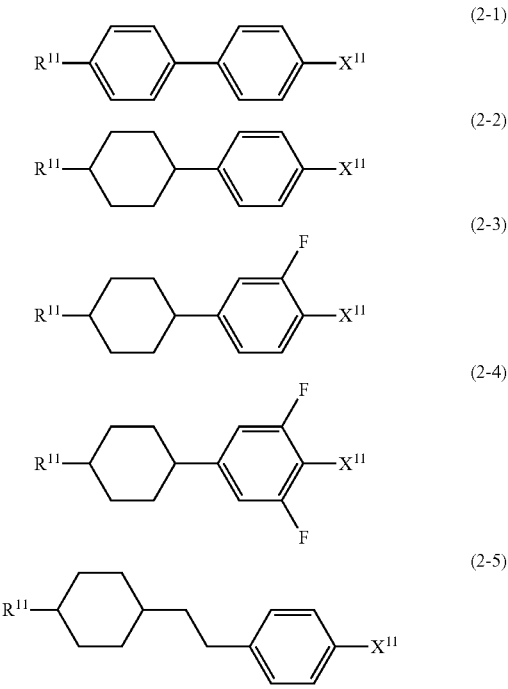

-continued (3-10)
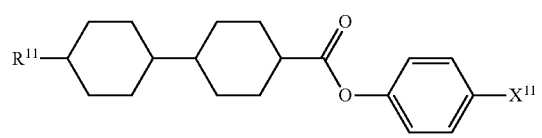
(3-11)
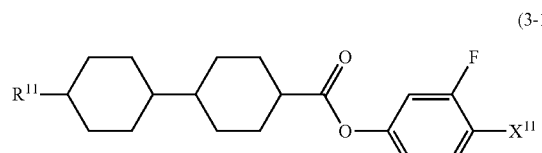
(3-12)
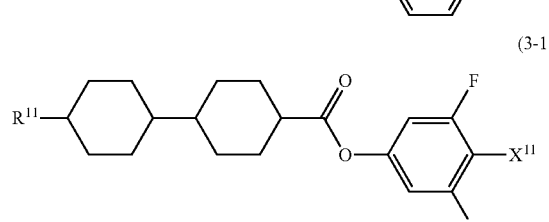
(3-13)
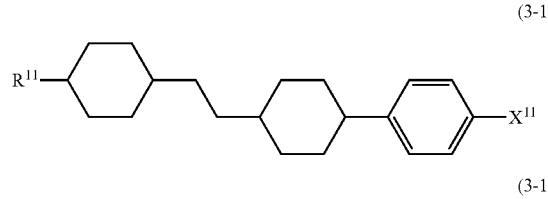
(3-14)
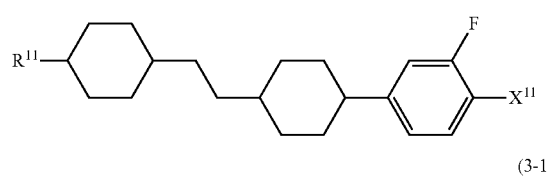
(3-15)
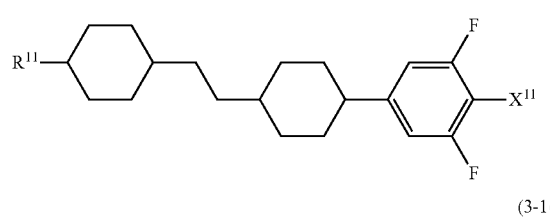
(3-16)
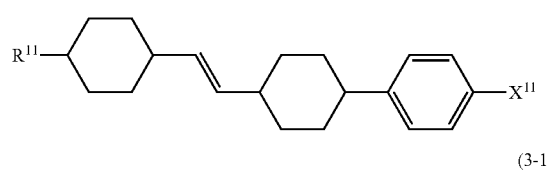
(3-17)
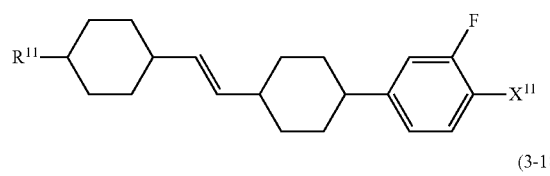
(3-18)
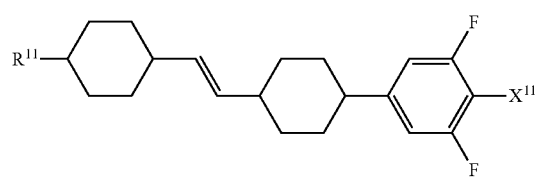
(3-19)
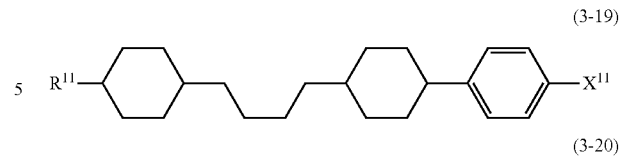
(3-20)
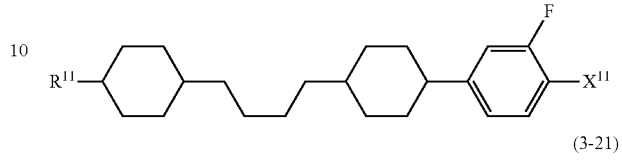
(3-21)
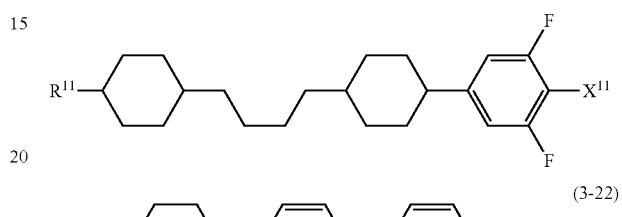
(3-22)
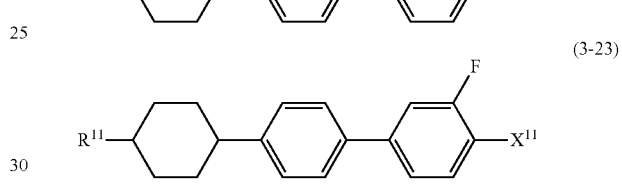
(3-23)
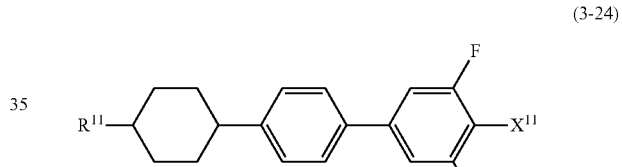
(3-24)
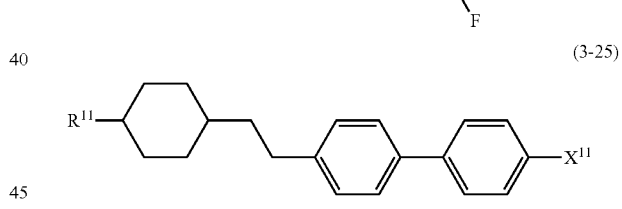
(3-25)
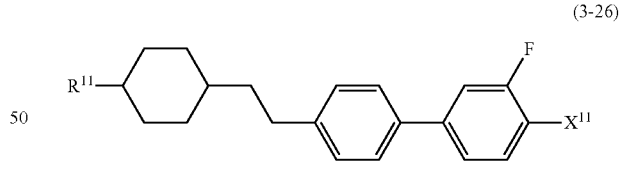
(3-26)
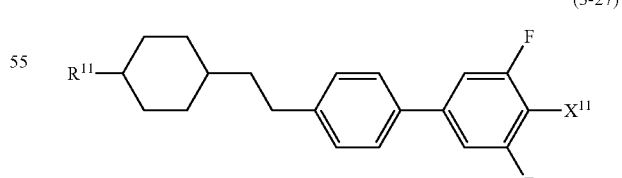
(3-27)
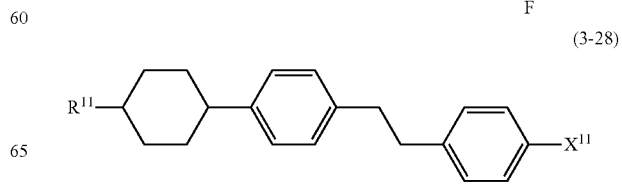
(3-28)

(3-29)
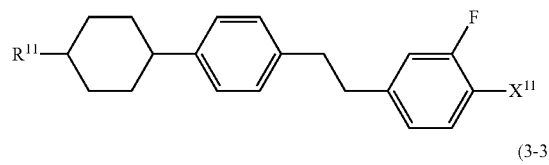
(3-30)
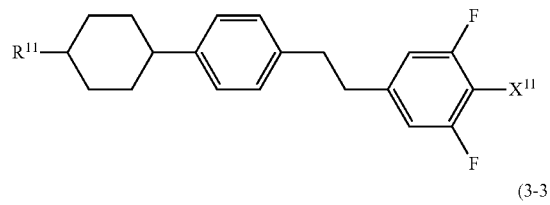
(3-31)
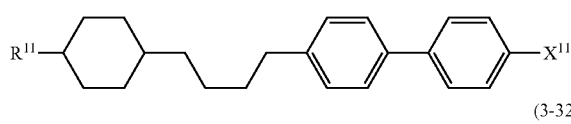
(3-32)
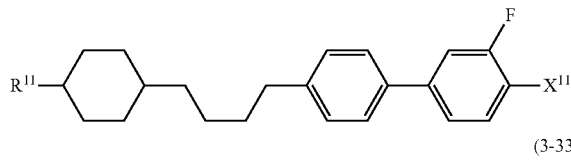
(3-33)
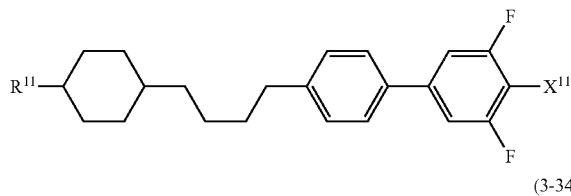
(3-34)
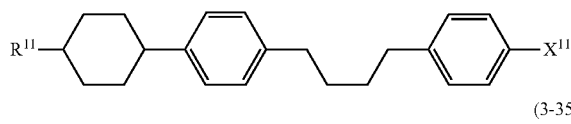
(3-35)
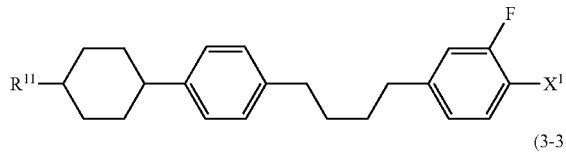
(3-36)
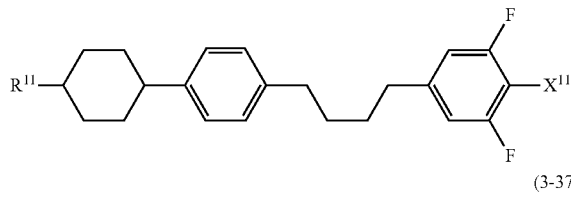
(3-37)
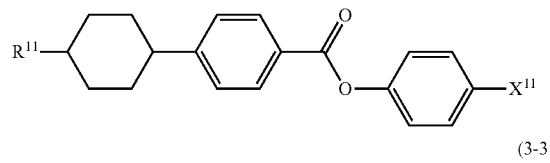
(3-38)
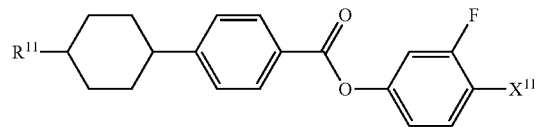
(3-39)
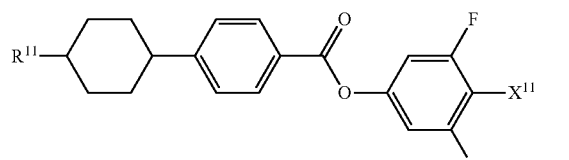
(3-40)
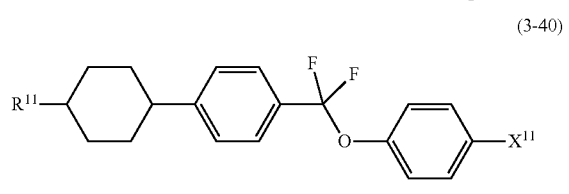
(3-41)
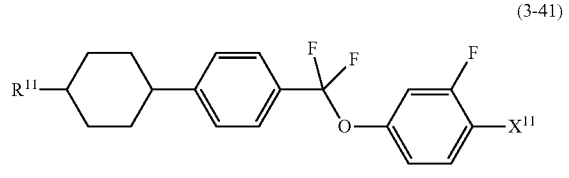
(3-42)
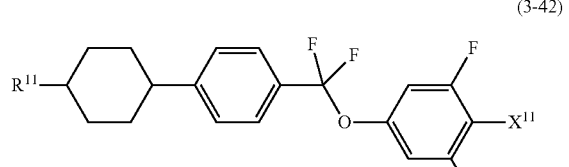
(3-43)
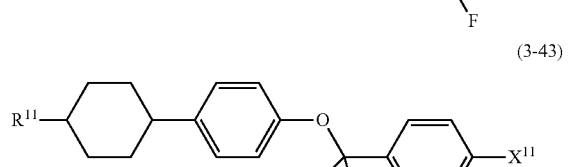
(3-44)
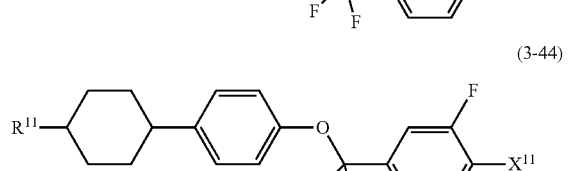
(3-45)
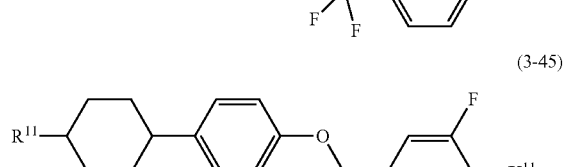
(3-46)
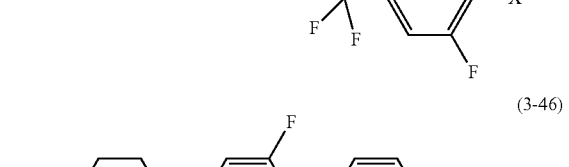
(3-47)
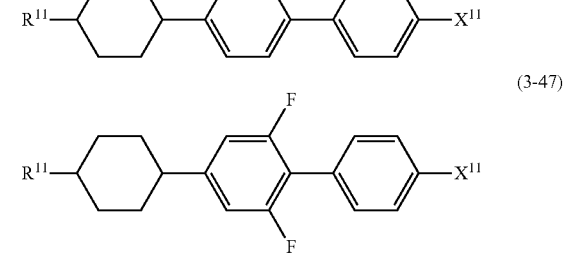

(3-48) 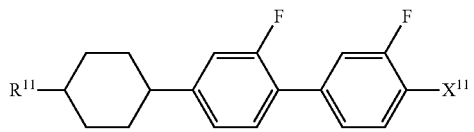
(3-49) 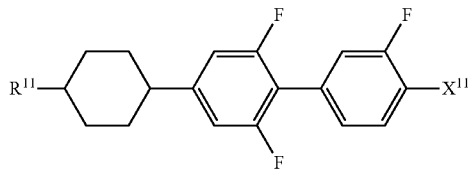
(3-50) 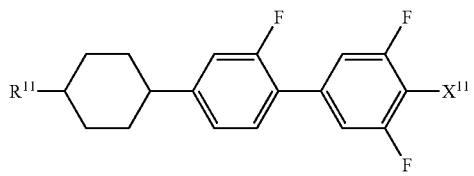
(3-51) 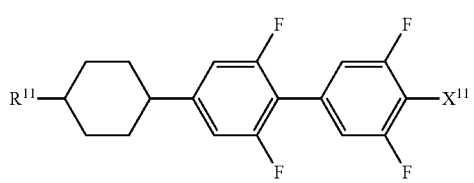
(3-52) 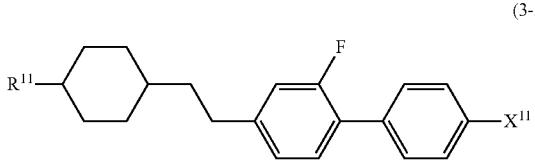
(3-53) 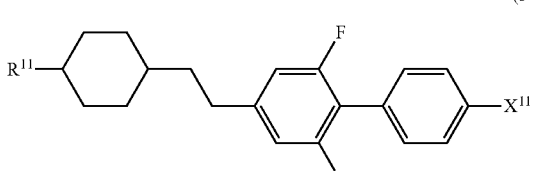
(3-54) 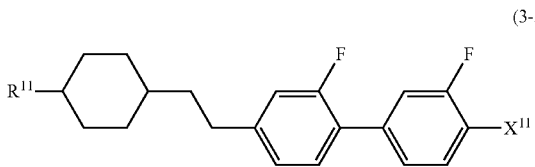
(3-55) 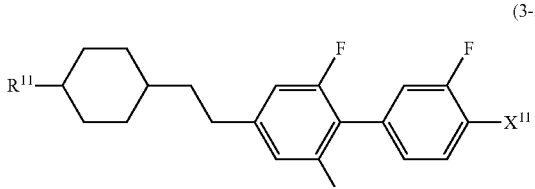
(3-56) 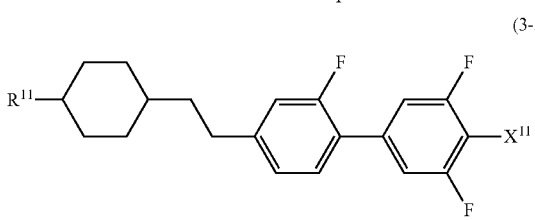
(3-57) 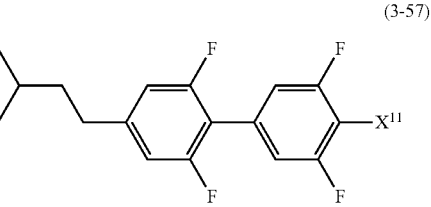
(3-58) 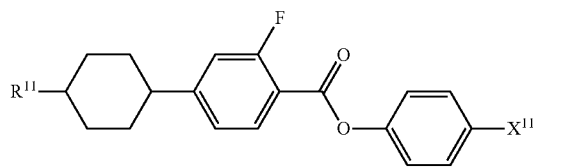
(3-59) 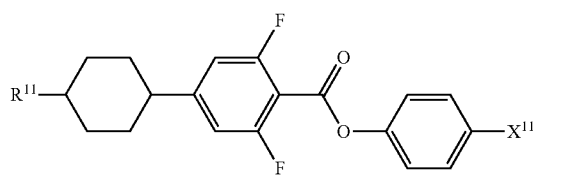
(3-60) 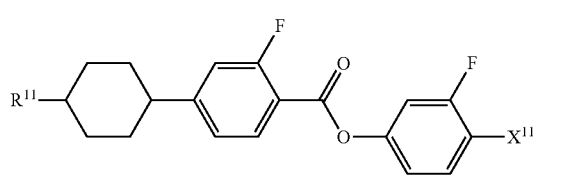
(3-61) 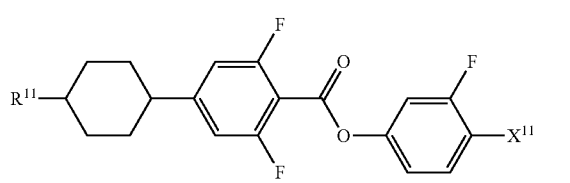
(3-62) 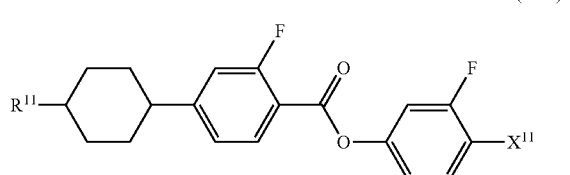
(3-63) 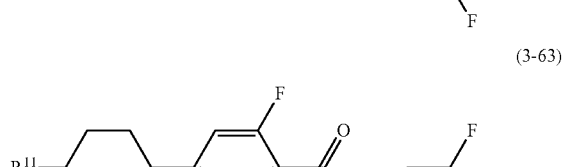
(3-64) 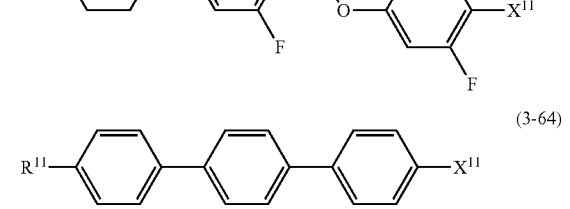

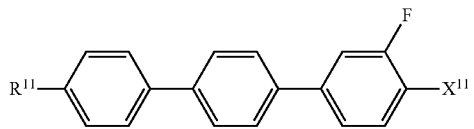 (3-65)
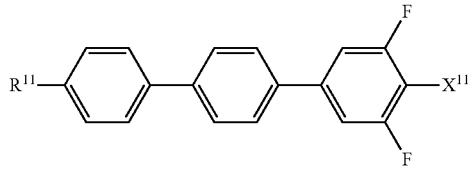 (3-66)
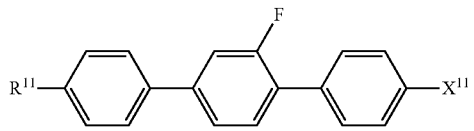 (3-67)
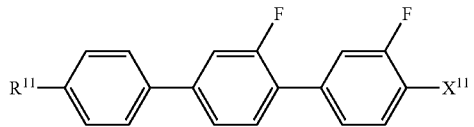 (3-68)
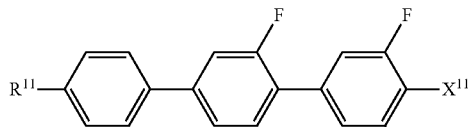 (3-69)
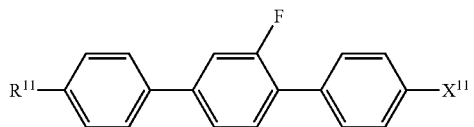 (3-70)
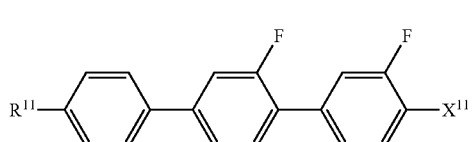 (3-71)
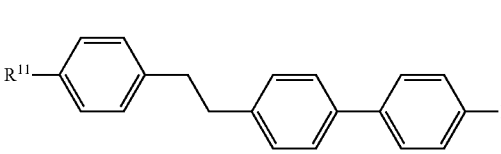 (3-72)
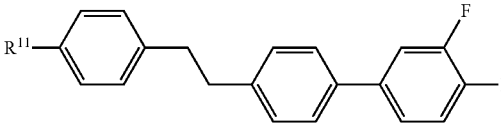 (3-73)
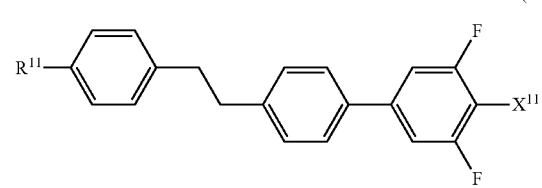 (3-74)
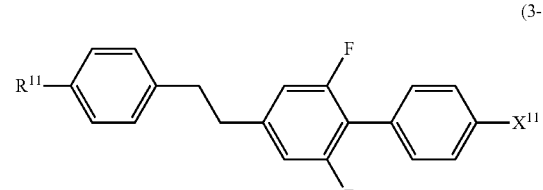 (3-75)
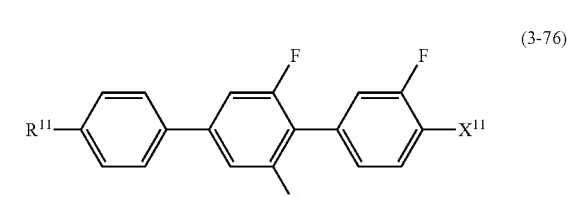 (3-76)
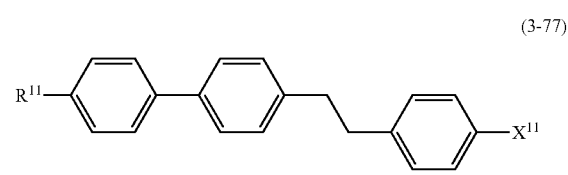 (3-77)
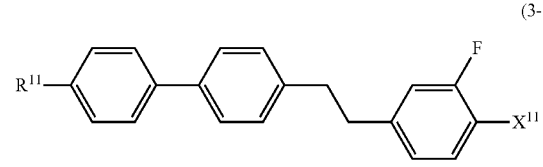 (3-78)
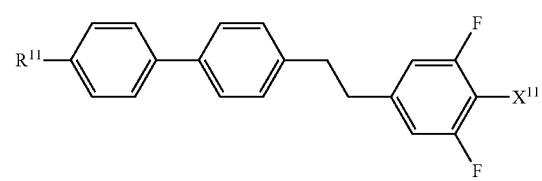 (3-79)
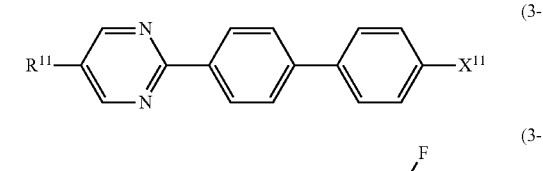 (3-80)
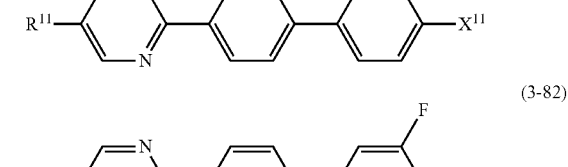 (3-81)
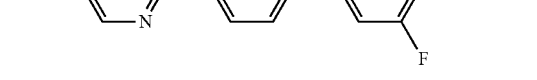 (3-82)

(3-83) 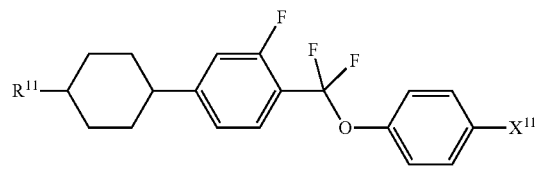
(3-84) 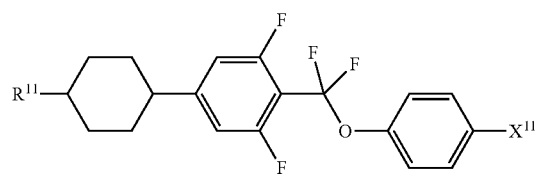
(3-85) 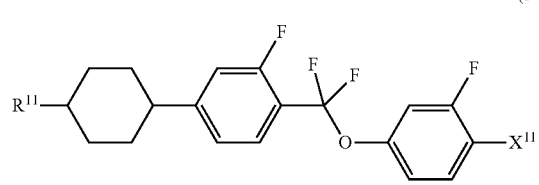
(3-86) 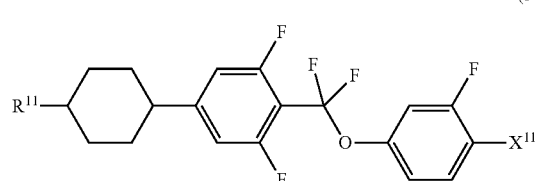
(3-87) 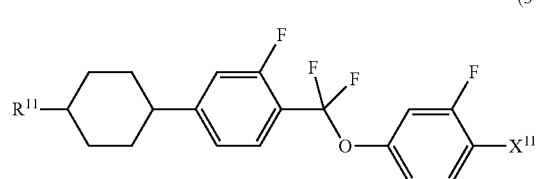
(3-88) 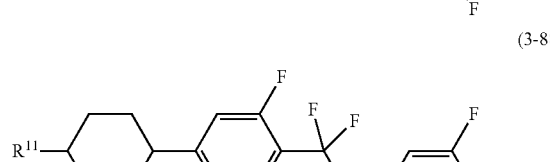
(3-89) 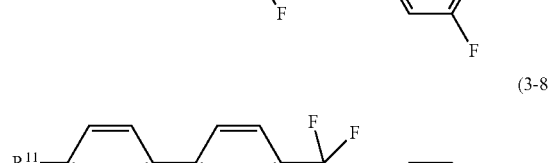
(3-90) 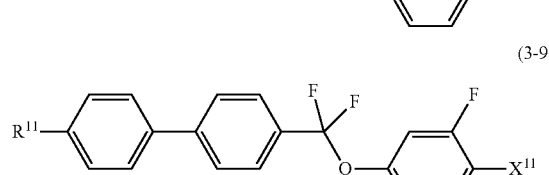
(3-91) 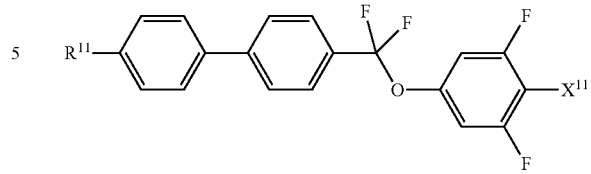
(3-92) 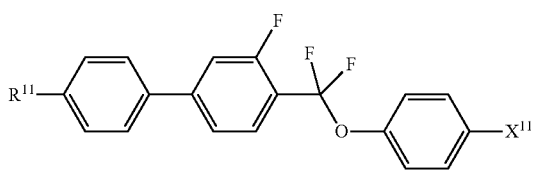
(3-93) 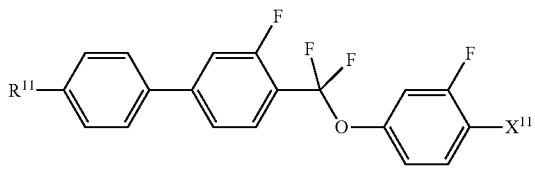
(3-94) 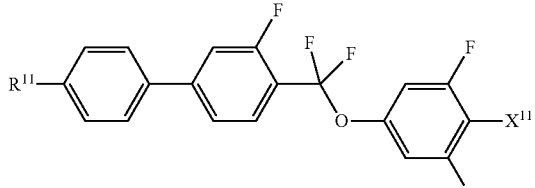
(3-95) 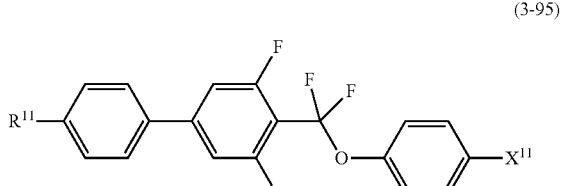
(3-96) 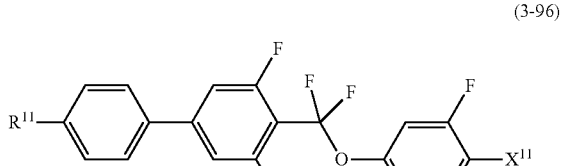
(3-97) 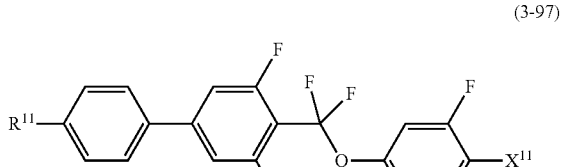
(3-98) 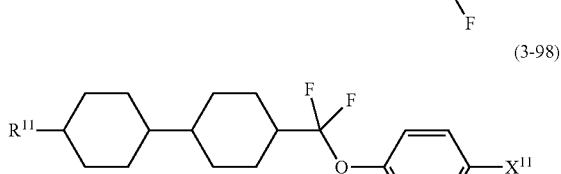

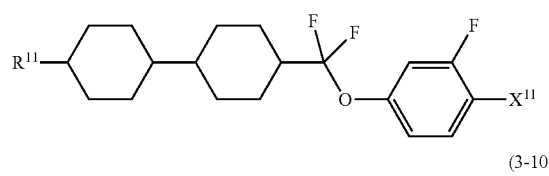 (3-99)
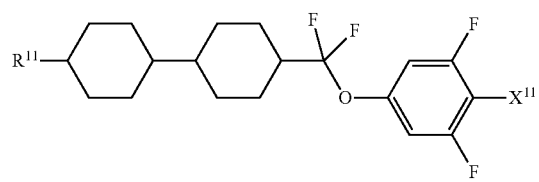 (3-100)
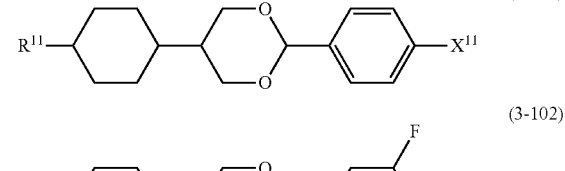 (3-101)
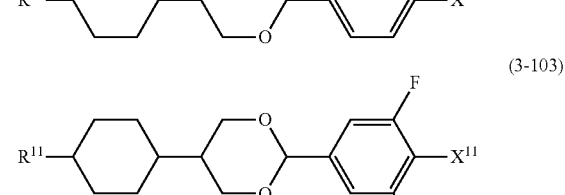 (3-102)
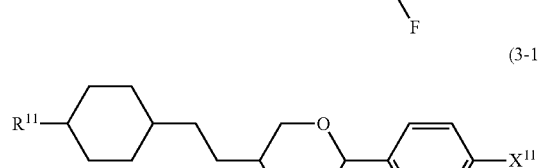 (3-103)
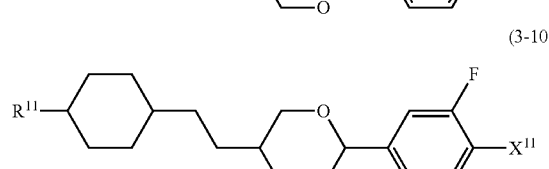 (3-104)
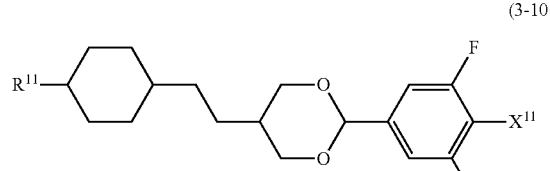 (3-105)
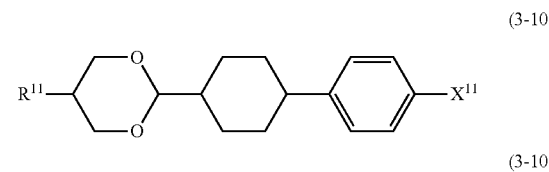 (3-106)
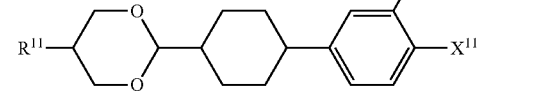 (3-107)
 (3-108)
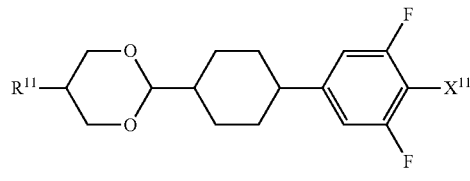 (3-109)
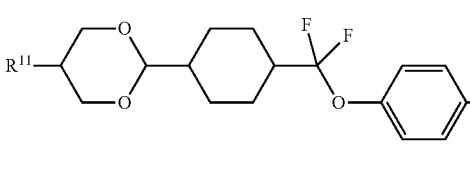 (3-110)
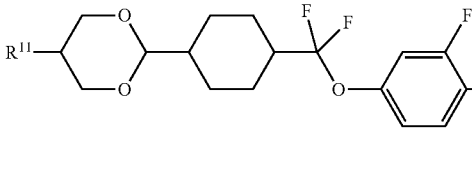 (3-111)
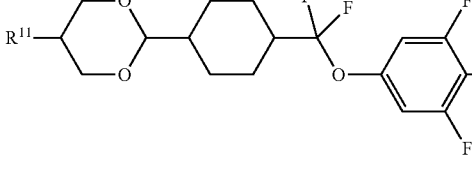 (3-112)
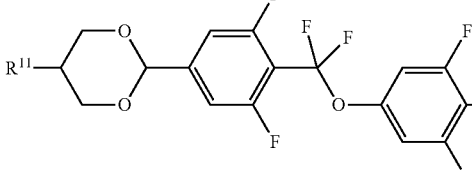 (3-113)
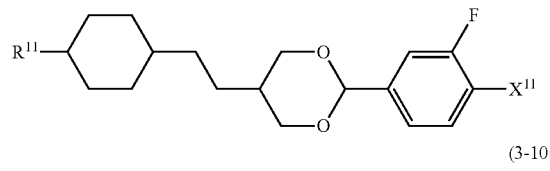 (4-1)
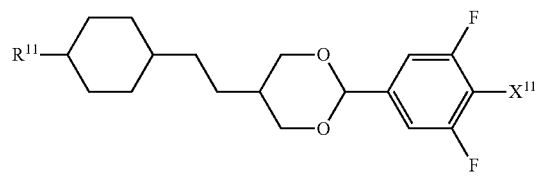 (4-2)
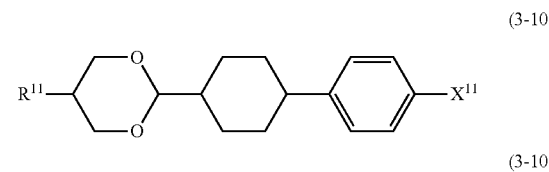 (4-3)
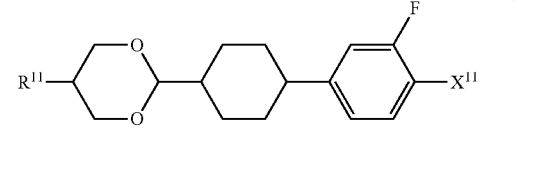 (4-4)

(4-5) 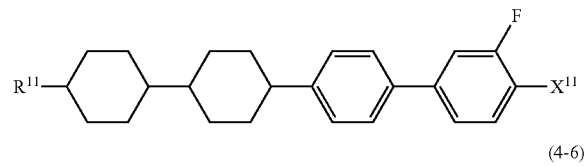
(4-6) 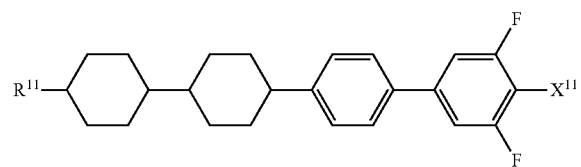
(4-7) 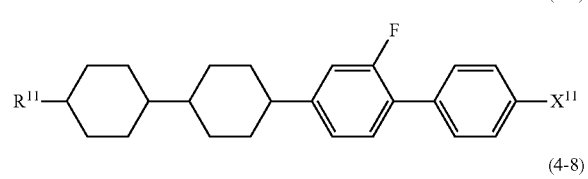
(4-8) 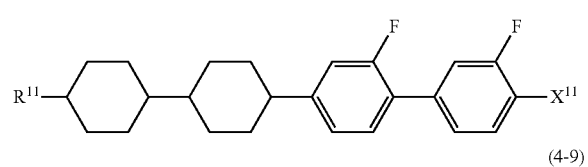
(4-9) 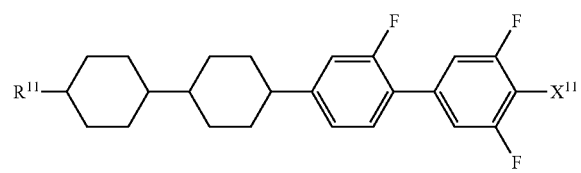
(4-10) 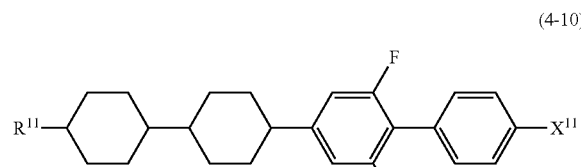
(4-11) 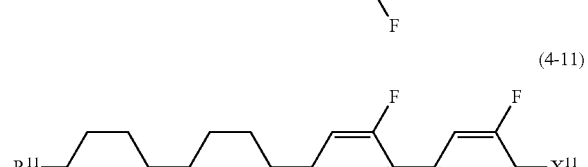
(4-12) 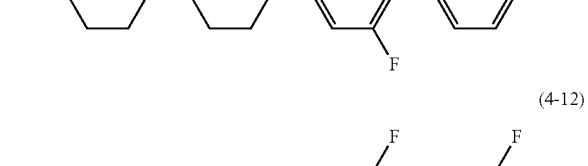
(4-13) 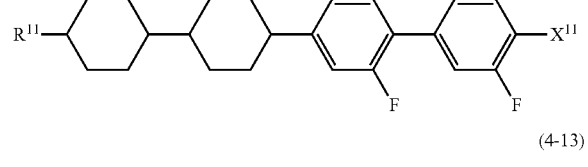
(4-14) 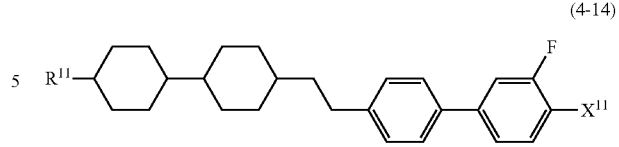
(4-15) 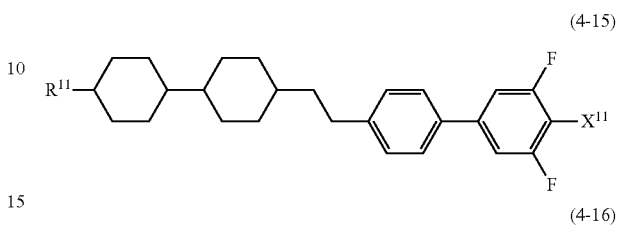
(4-16) 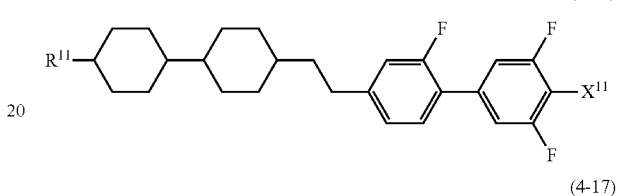
(4-17) 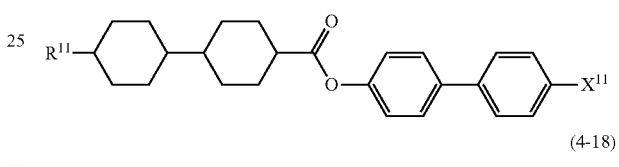
(4-18) 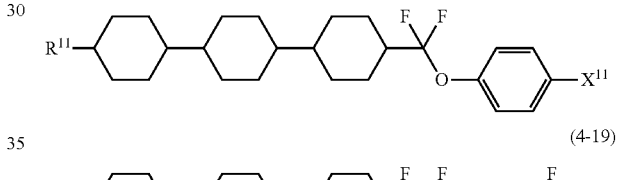
(4-19) 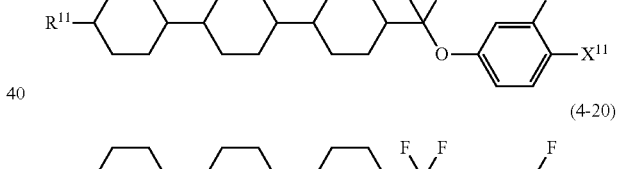
(4-20) 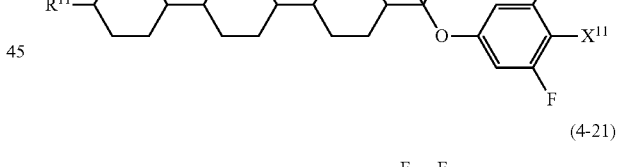
(4-21) 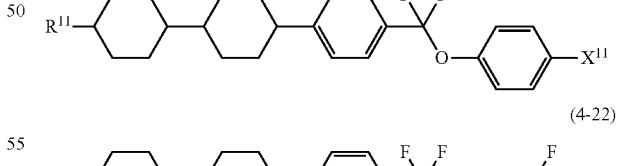
(4-22) 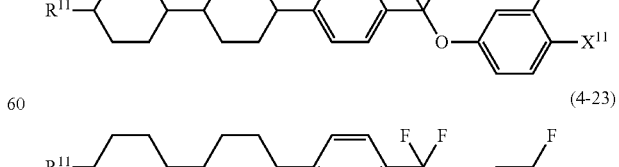
(4-23) 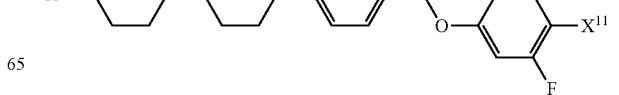

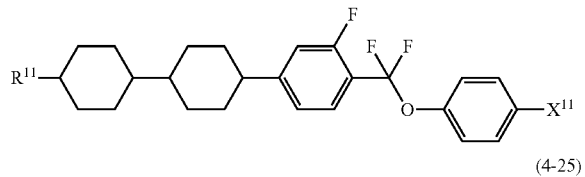
(4-24)
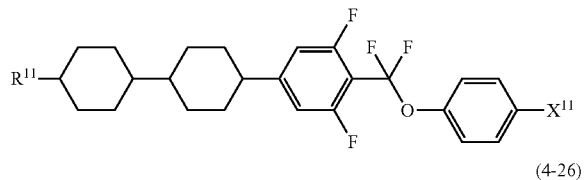
(4-25)
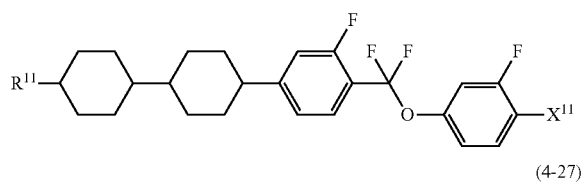
(4-26)
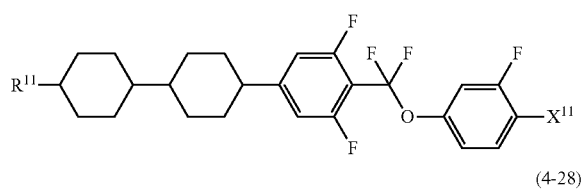
(4-27)
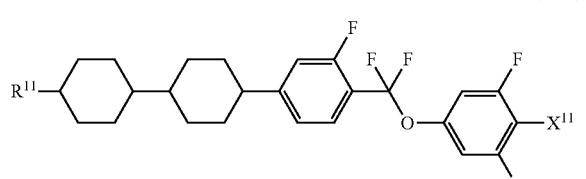
(4-28)
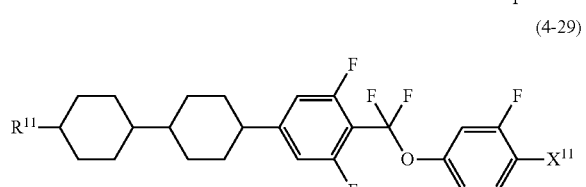
(4-29)
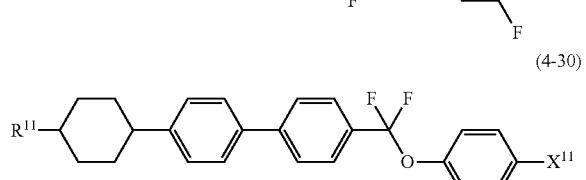
(4-30)
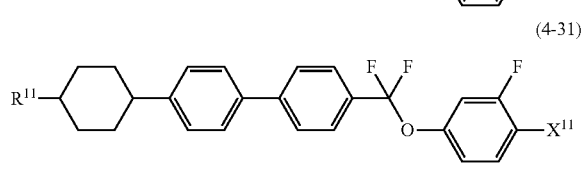
(4-31)
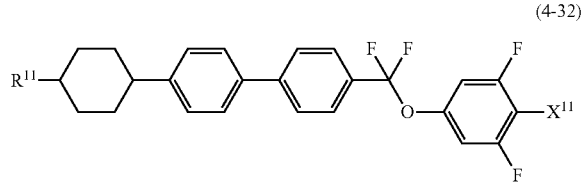
(4-32)
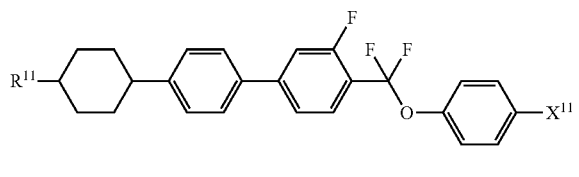
(4-33)
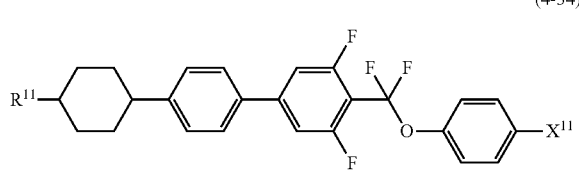
(4-34)
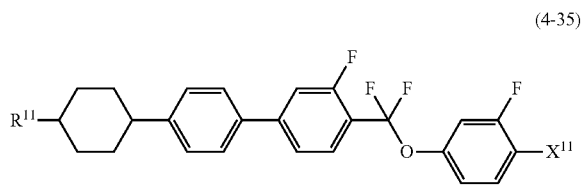
(4-35)
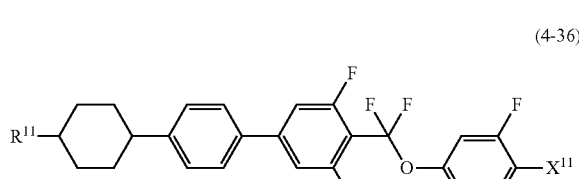
(4-36)
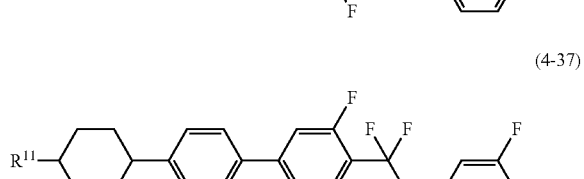
(4-37)
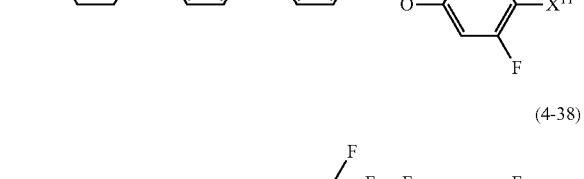
(4-38)
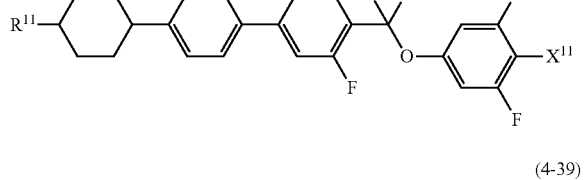
(4-39)
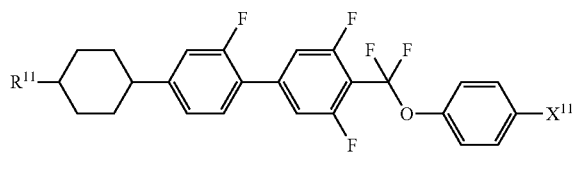
(4-40)
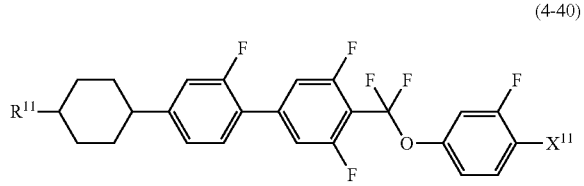

(4-41)
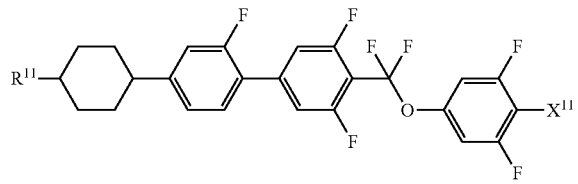
(4-42)
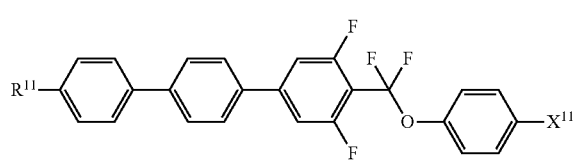
(4-43)
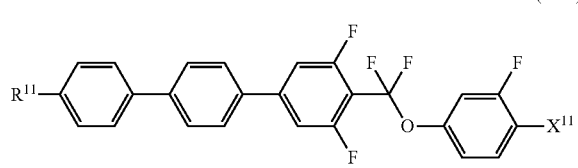
(4-44)
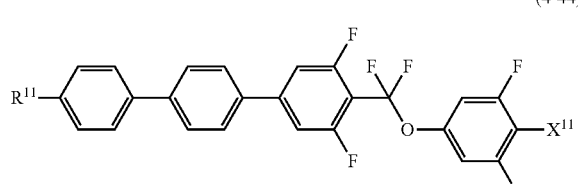
(4-45)
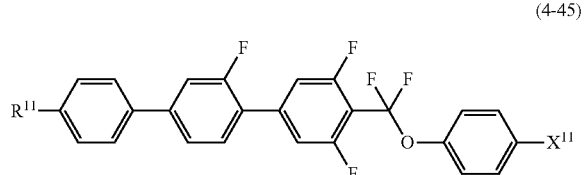
(4-46)
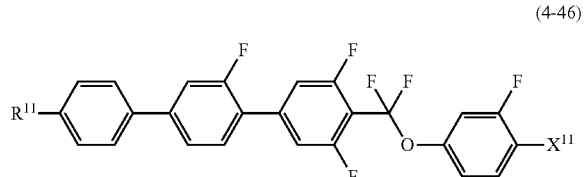
(4-47)
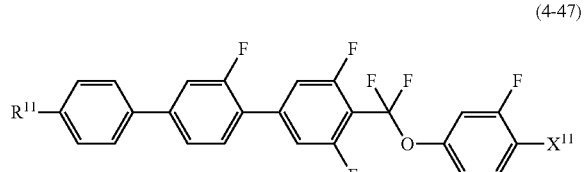
(4-48)
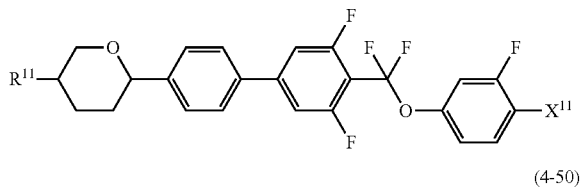
(4-49)
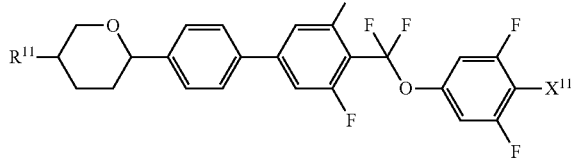
(4-50)
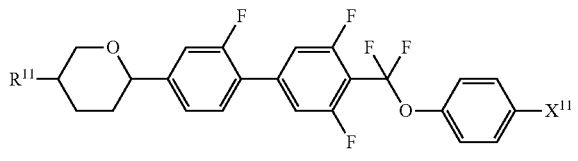
(4-51)
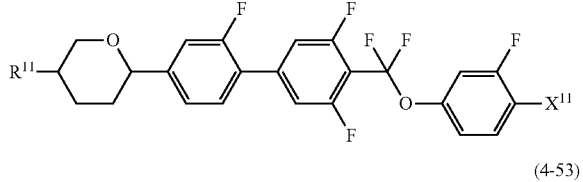
(4-52)
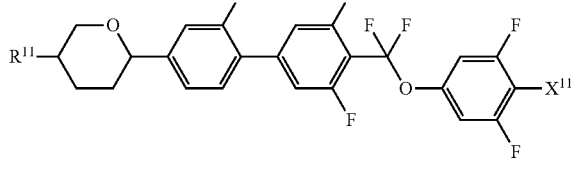
(4-53)
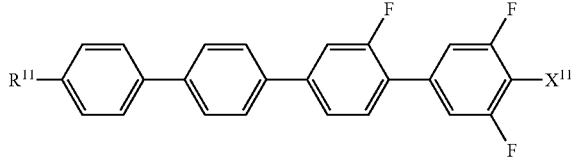
(4-54)
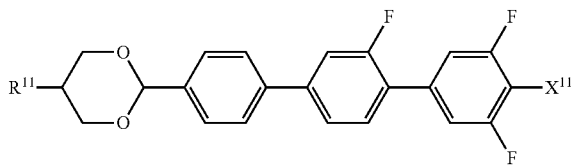
(4-55)
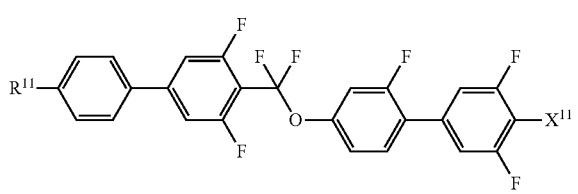
(4-56)

(4-57)

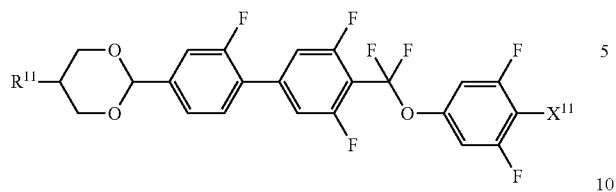

Component B has a positive dielectric anisotropy and a superb stability to heat, light or the like, and therefore is used when the composition for a mode such as TFT, IPS and FFS is prepared. A content of component B is suitably, based on a weight of the composition, in the range of approximately 1% by weight to approximately 99% by weight, preferably, in the range of approximately 10% by weight to approximately 97% by weight, and further preferably, in the range of approximately 40% by weight to approximately 95% by weight. Further addition of compounds (13) to (15) (component E) allows adjustment of viscosity of the composition.

Component C includes compound (5) in which a right-terminal group is or —C≡N or —C≡C—C≡N. Specific preferred examples of component C include compounds (5-1) to (5-64). In the compounds (component C), $R^{12}$ and $X^{12}$ are defined in a manner identical with the definitions in item 10 described above.

(5-1)

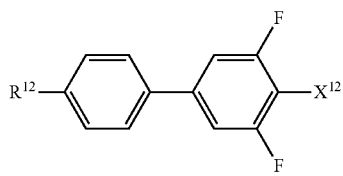

(5-2)

(5-3)

(5-4)

(5-5)

(5-6)

(5-7)

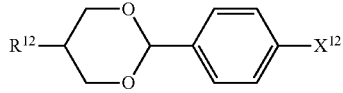

(5-8)

(5-9)

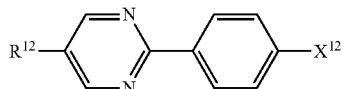

(5-10)

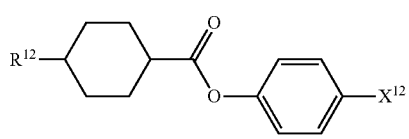

(5-11)

(5-12)

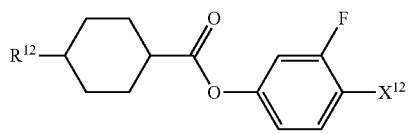

(5-13)

(5-14)

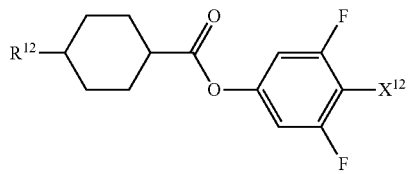

(5-15)

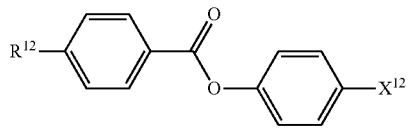

(5-16)

(5-17)

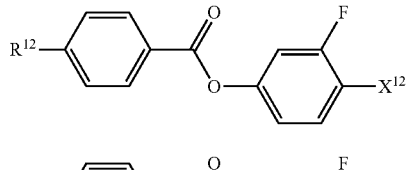

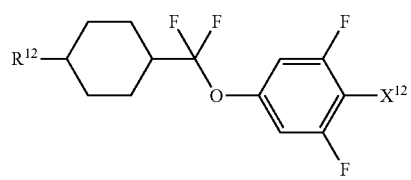 (5-18)
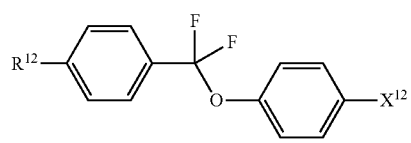 (5-19)
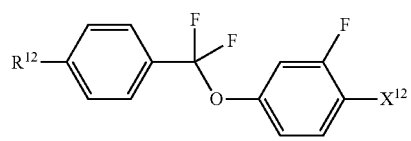 (5-20)
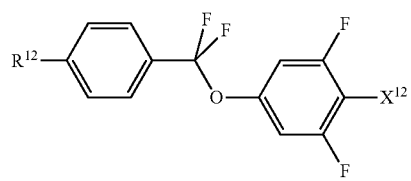 (5-21)
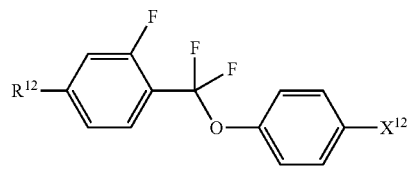 (5-22)
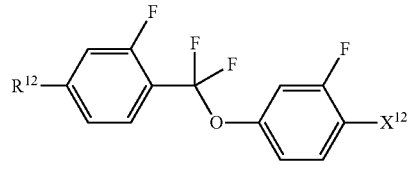 (5-23)
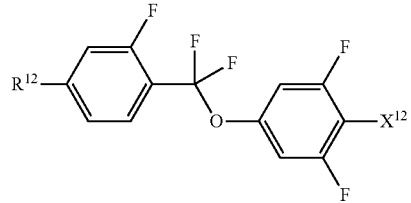 (5-24)
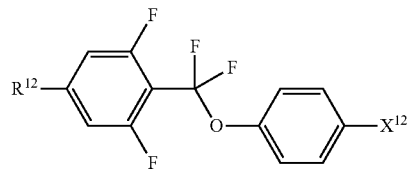 (5-25)
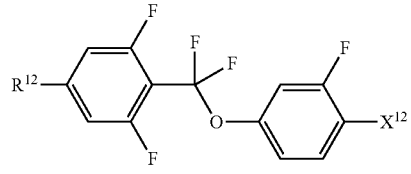 (5-26)
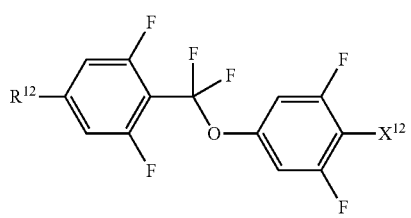 (5-27)
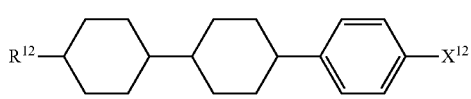 (5-28)
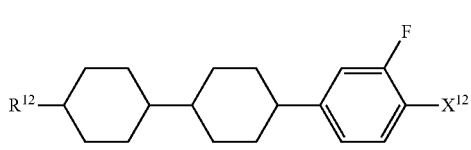 (5-29)
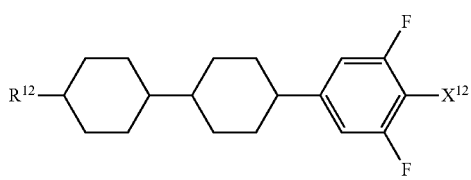 (5-30)
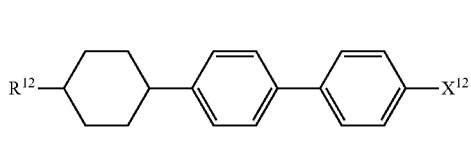 (5-31)
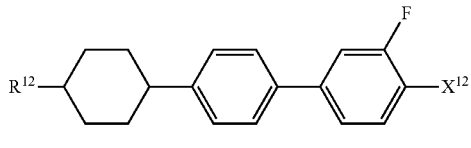 (5-32)
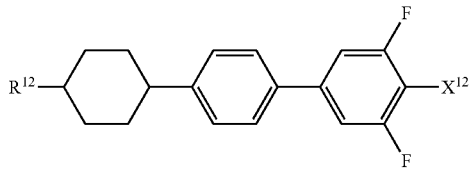 (5-33)
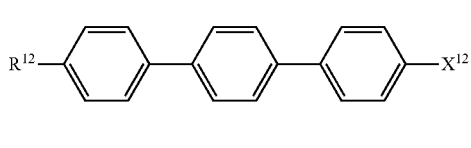 (5-34)
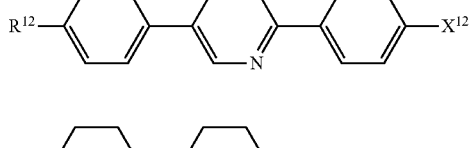 (5-35)
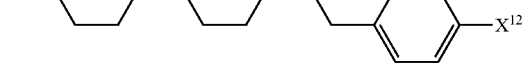 (5-36)

(5-37)
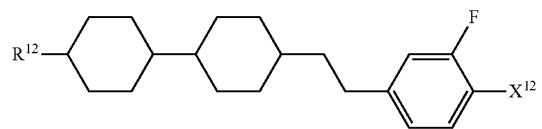
(5-38)
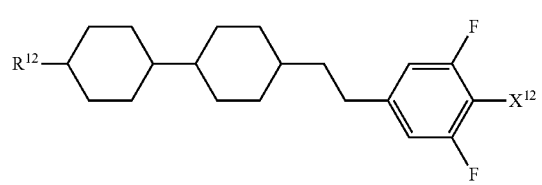
(5-39)
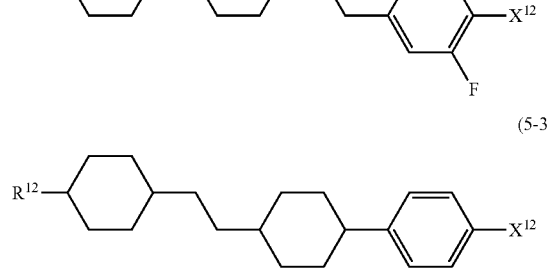
(5-40)
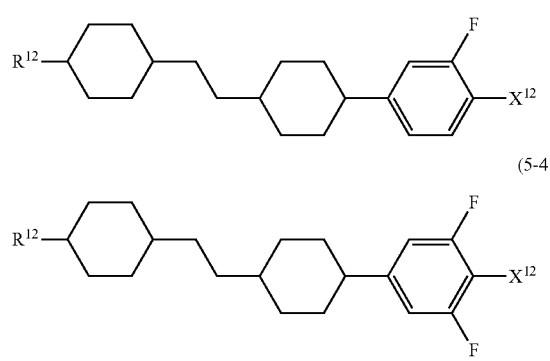
(5-41)
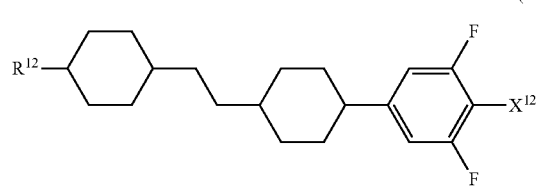
(5-42)
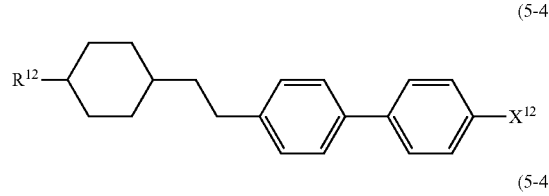
(5-43)
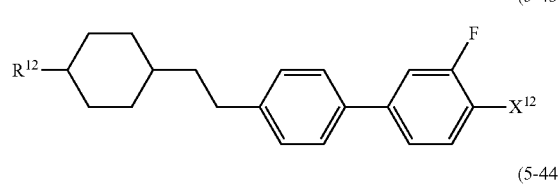
(5-44)
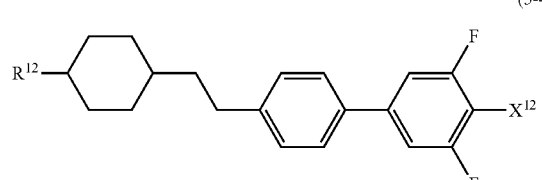
(5-45)
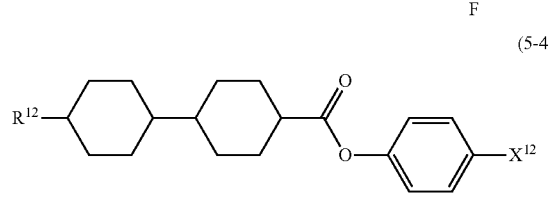
(5-46)
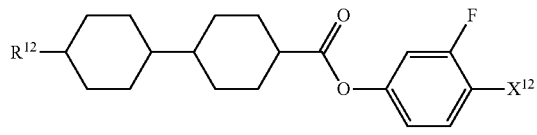
(5-47)
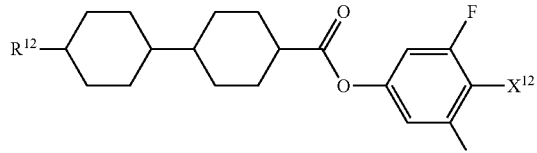
(5-48)
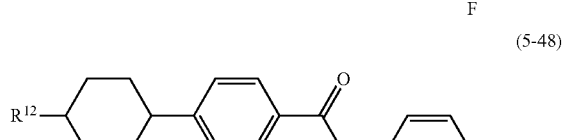
(5-49)
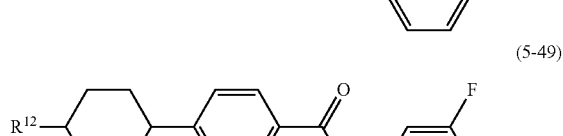
(5-50)
(5-51)
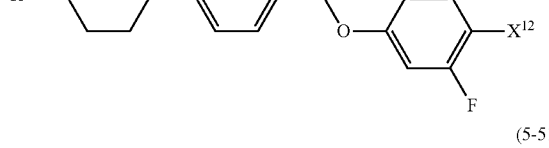
(5-52)
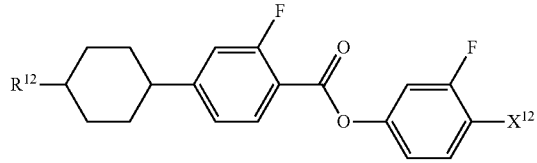
(5-53)
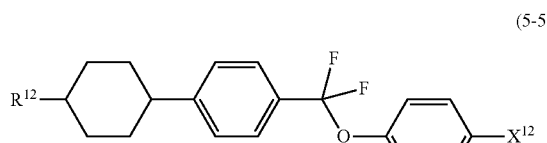
(5-54)
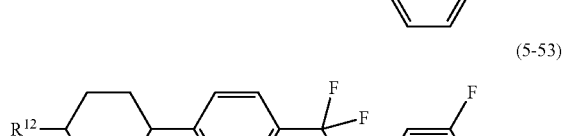

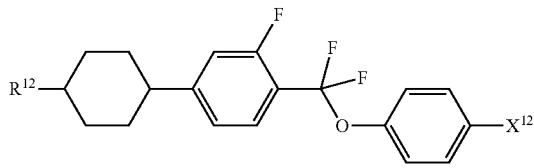
(5-55)

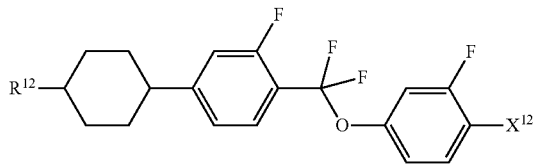
(5-56)

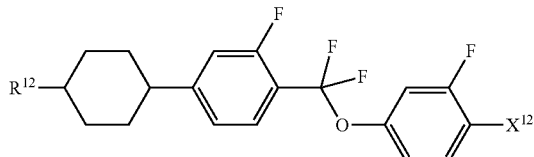
(5-57)

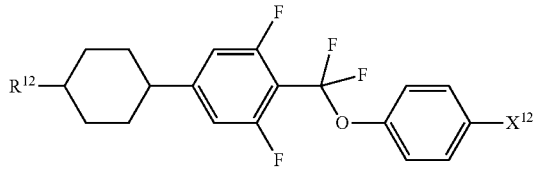
(5-58)

(5-59)

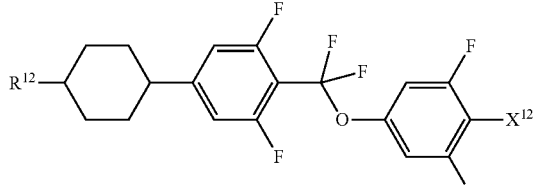
(5-60)

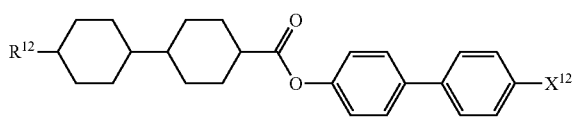
(5-61)

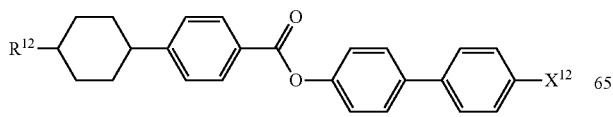
(5-62)

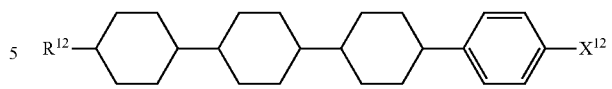
(5-63)

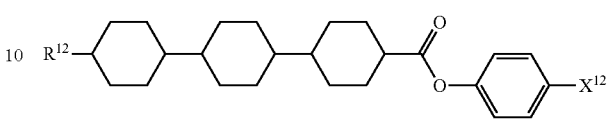
(5-64)

Component C has a large value of positive dielectric anisotropy, and therefore is mainly used for preparing a composition for the STN mode, the TN mode or the PSA mode. Dielectric anisotropy of the composition can be increased by adding component C. Component C is effective in extending a temperature range of the liquid crystal phase, adjusting the viscosity or adjusting the optical anisotropy. Component C is also useful for adjusting the voltage-transmittance curve of the device.

When a composition for the STN mode or the TN mode is prepared, a content of component C is suitably, based on the weight of the composition, in the range of approximately 1% by weight to approximately 99% by weight, preferably, in the range of approximately 10% by weight to approximately 97% by weight, and further preferably, in the range of approximately 40% by weight to approximately 95% by weight. In the composition, the temperature range of the liquid crystal phase, the viscosity, the optical anisotropy, the dielectric anisotropy and so forth can be adjusted by adding component E.

Component D includes compounds (6) to (12). The compounds have a benzene ring lateral positions of which are replaced by two of halogen, such as 2,3-difluoro-1,4-phenylene. Specific preferred examples of component D include compounds (6-1) to (6-8), compounds (7-1) to (7-17), compound (8-1), compounds (9-1) to (9-3), compounds (10-1) to (10-11), compounds (11-1) to (11-3) or compounds (12-1) to (12-3). In the compounds (component D), $R^{13}$, $R^{14}$ and $R^{15}$ are defined in a manner identical with the definitions in item 11 described above.

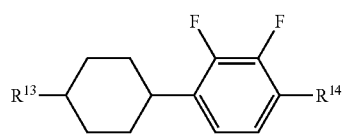
(6-1)

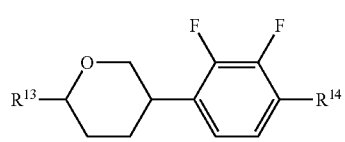
(6-2)

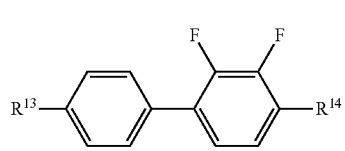
(6-3)

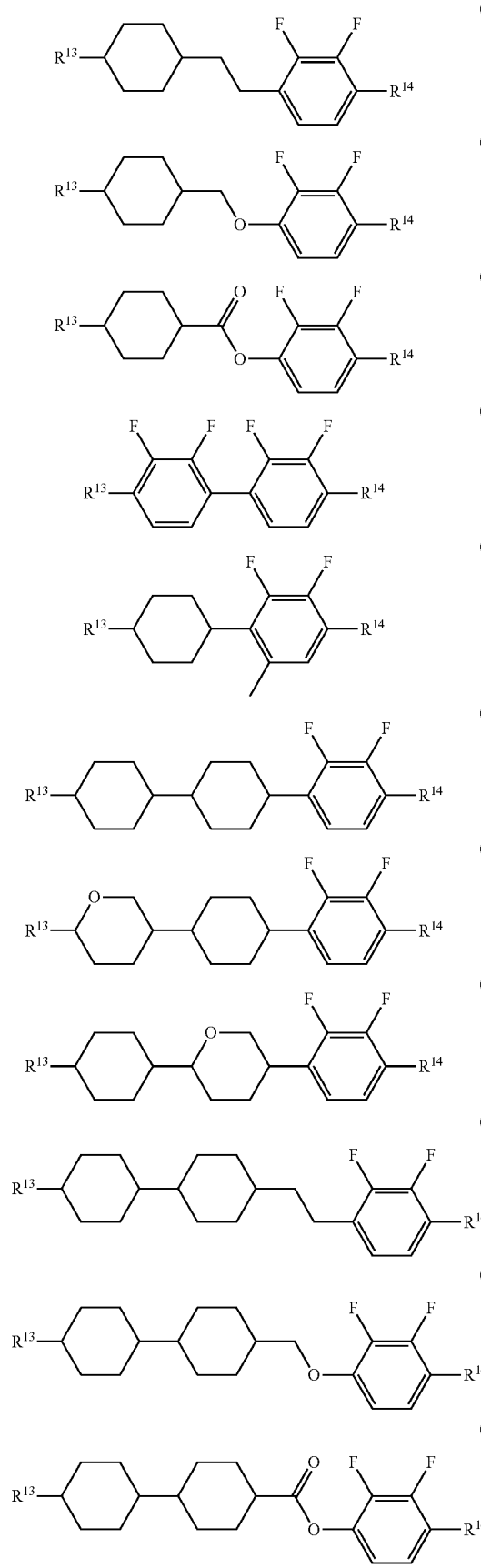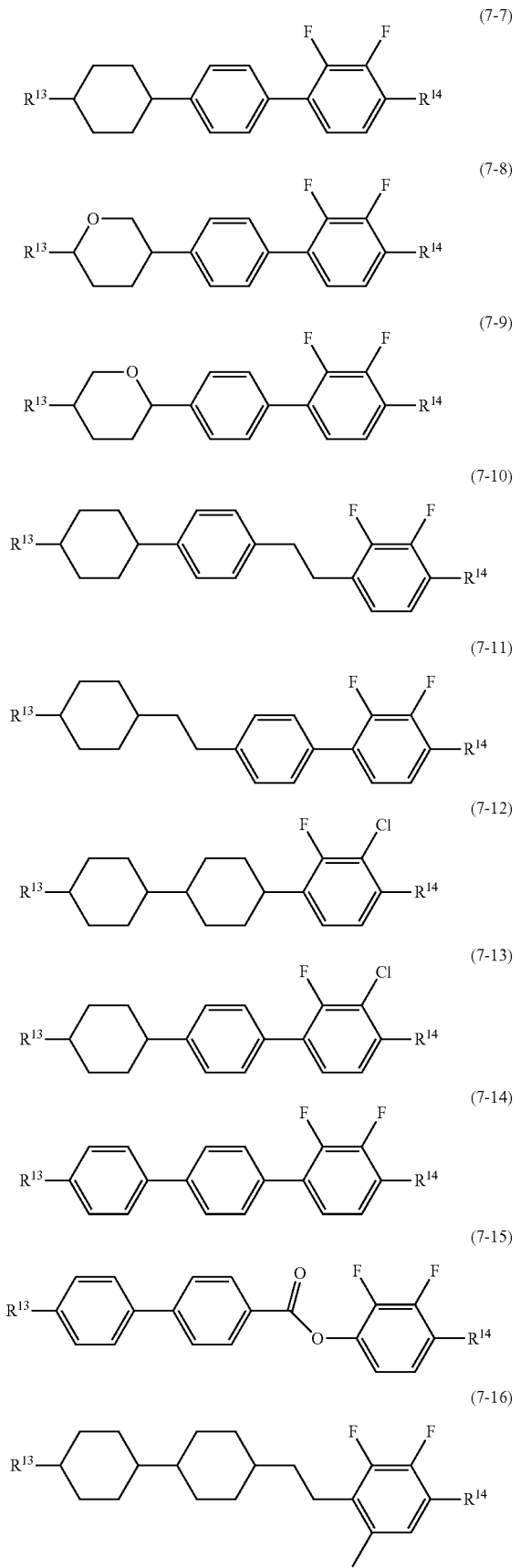

(7-17)
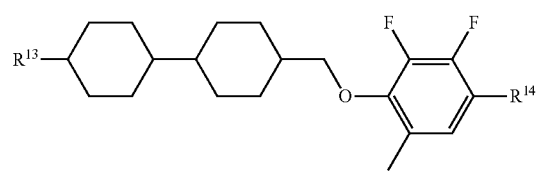
(8-1)
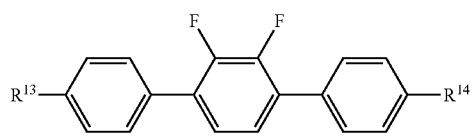
(9-1)
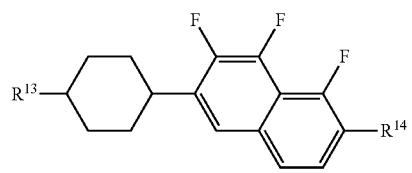
(9-2)
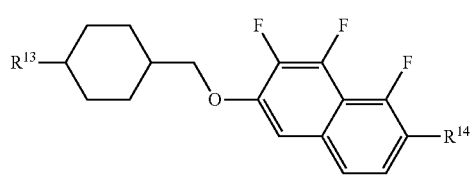
(9-3)
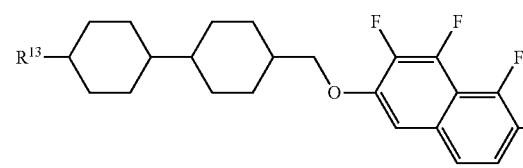
(10-1)
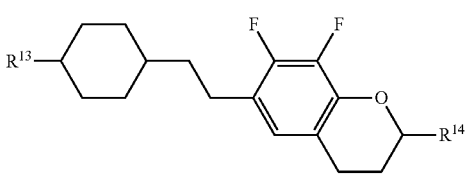
(10-2)
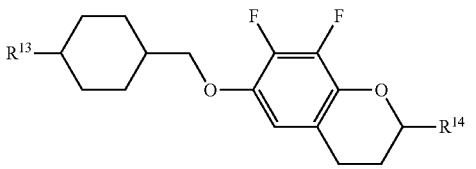
(10-3)
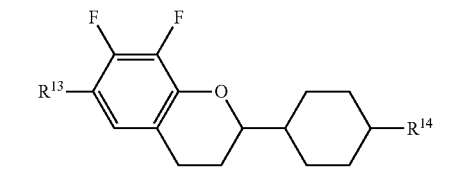
(10-4)
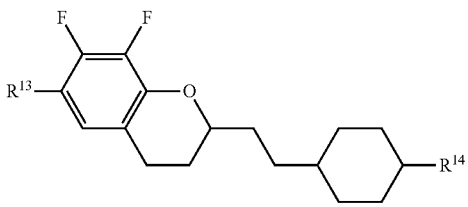
(10-5)
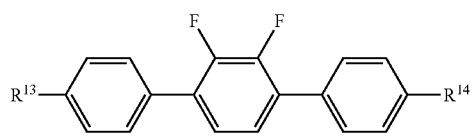
(10-6)
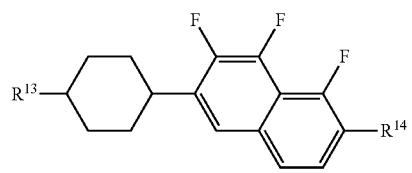
(10-7)
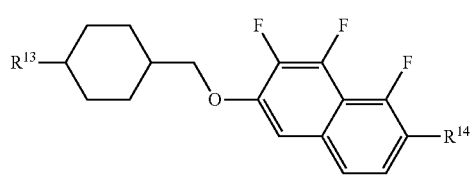
(10-8)
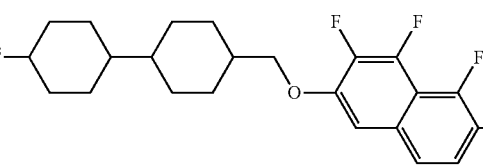
(10-9)
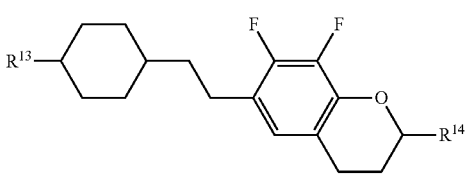
(10-10)
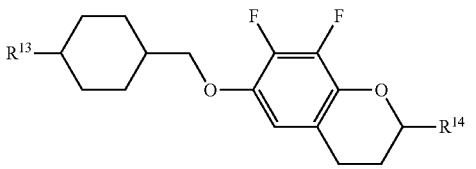
(10-11)
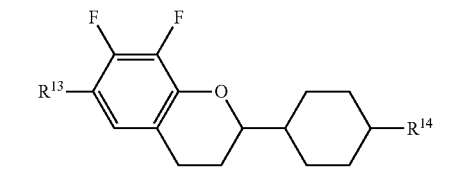

-continued

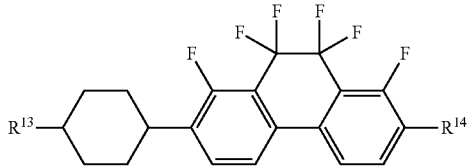
(11-1)

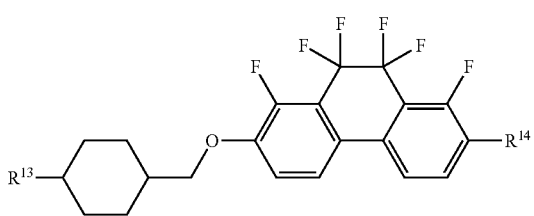
(11-2)

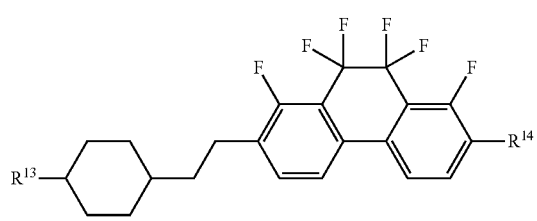
(11-3)

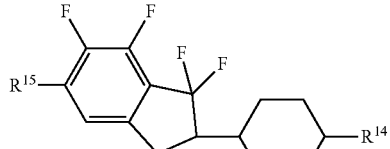
(12-1)

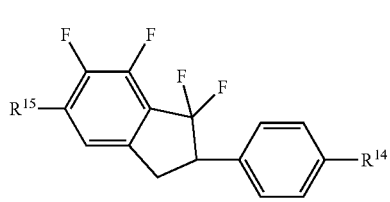
(12-2)

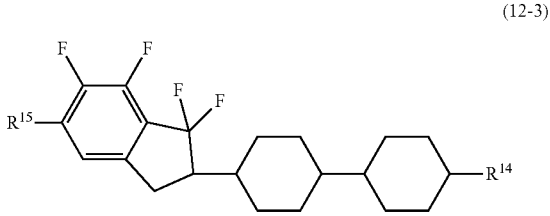
(12-3)

Component D includes a compound having a negative dielectric anisotropy. Component D is mainly used for preparing a composition for the VA mode or the PSA mode. Among types of component D, compound (6) is a bicyclic compound, and therefore is effective mainly in adjusting the viscosity, adjusting the optical anisotropy or adjusting the dielectric anisotropy. Compounds (7) and (8) are a tricyclic compound, and therefore are effective in increasing the maximum temperature, increasing the optical anisotropy or increasing the dielectric anisotropy. Compounds (9) to (12) are effective in increasing the dielectric anisotropy.

When a composition for the VA mode or the PSA mode is prepared, a content of component D is, based on the weight of the composition, preferably, approximately 40% by weight or more, and further preferably, in the range of approximately 50% by weight to approximately 95% by weight. When component D is added to a composition having a positive dielectric anisotropy, a content of component D is preferably approximately 30% by weight or less based on the weight of the composition. Addition of component D allows adjustment of the voltage-transmittance curve of the device of the composition.

Component E includes a compound in which two terminal groups are alkyl or the like. Specific preferred examples of component E include compounds (13-1) to (13-11), compounds (14-1) to (14-19) or compounds (15-1) to (15-7). In the compounds (component E), $R^{16}$ and $R^{17}$ are defined in a manner identical with the definitions in item 12 described above.

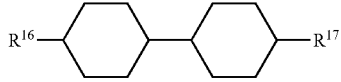
(13-1)

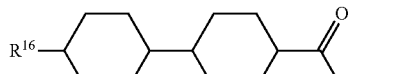
(13-2)

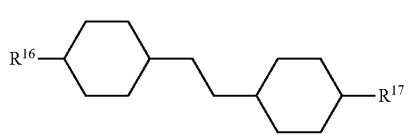
(13-3)

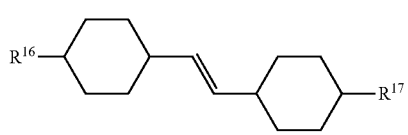
(13-4)

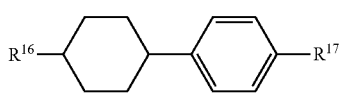
(13-5)

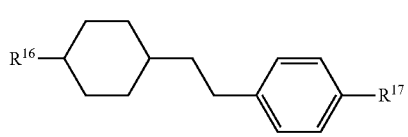
(13-6)

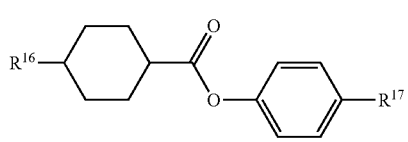
(13-7)

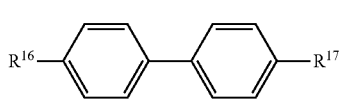
(13-8)

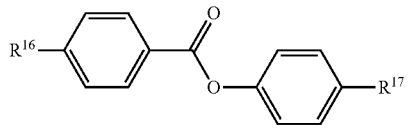
(13-9)

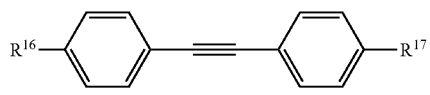
(13-10)

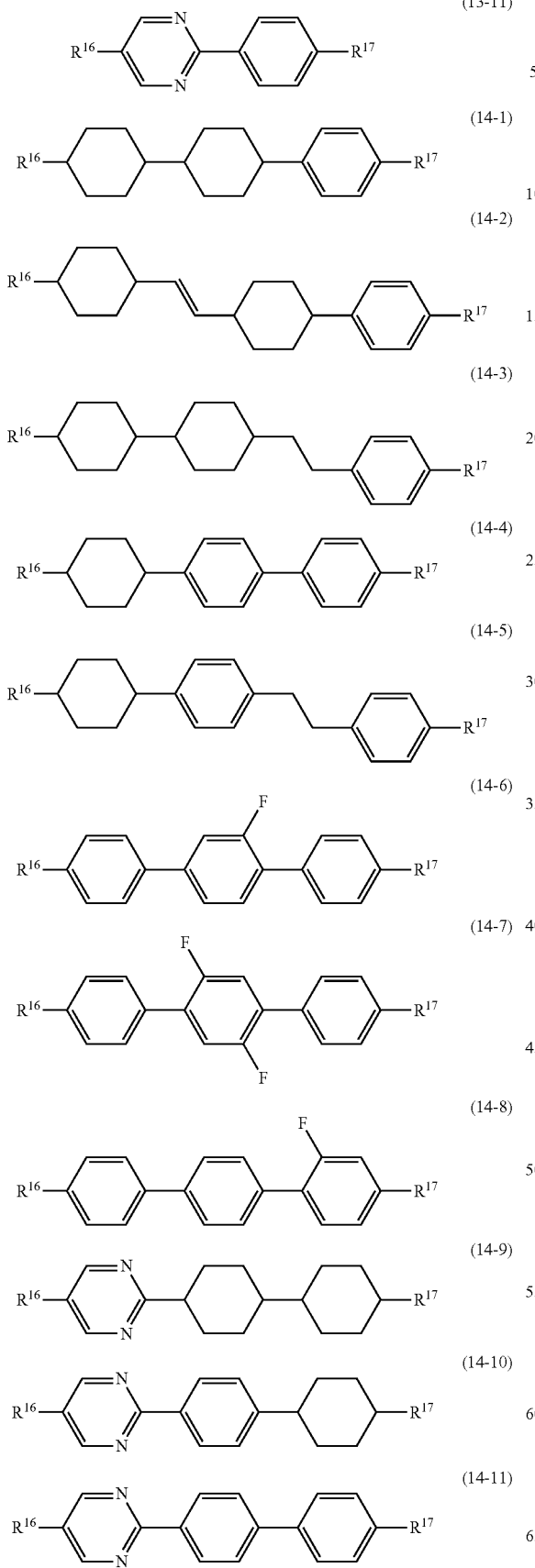
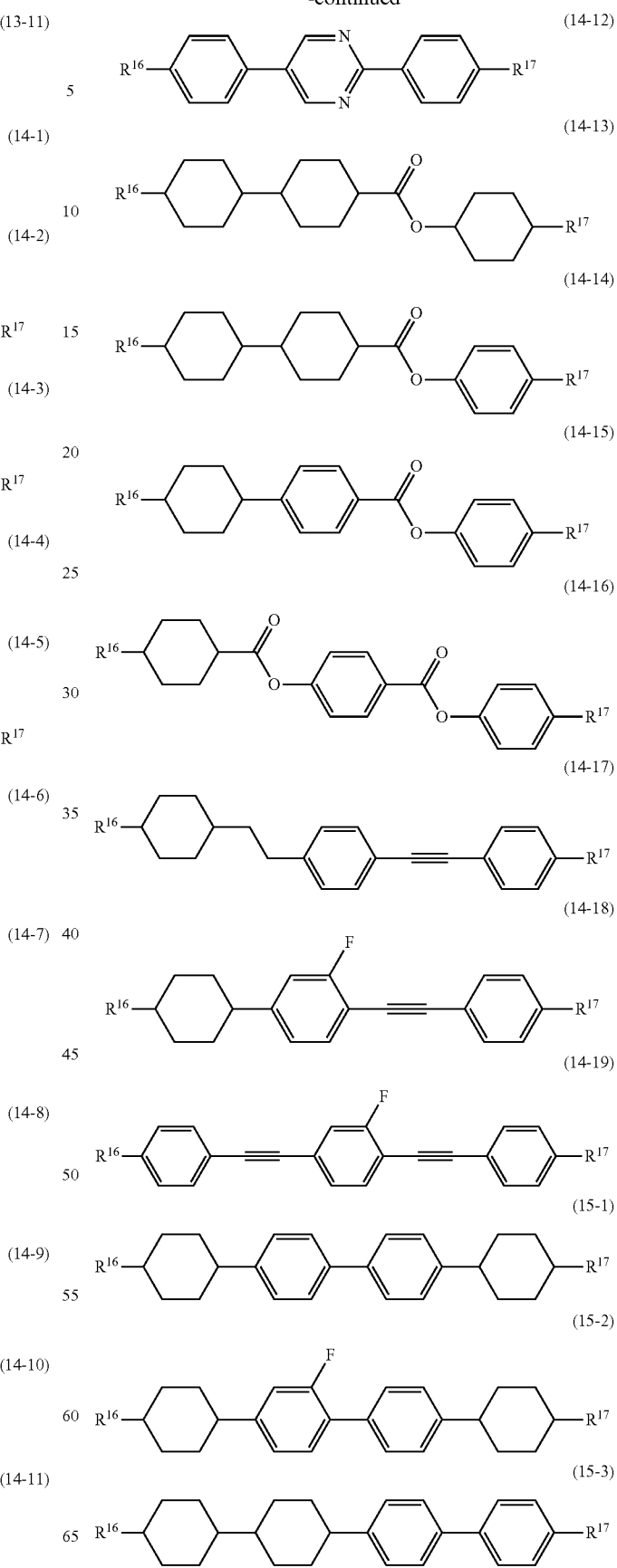

-continued

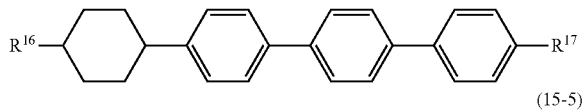
(15-4)

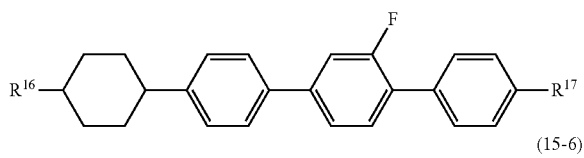
(15-5)

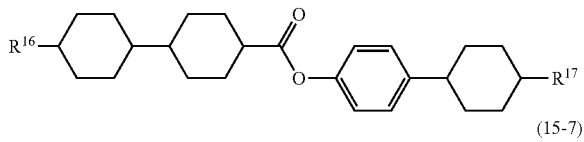
(15-6)

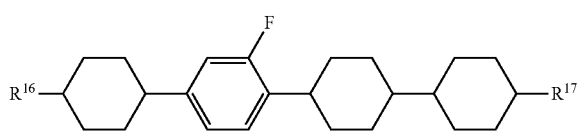
(15-7)

Component E has a small absolute value of dielectric anisotropy, and therefore is a compound close to neutrality. Compound (13) is effective mainly in adjusting the viscosity or adjusting the optical anisotropy. Compounds (14) and (15) are effective in extending a temperature range of a nematic phase by increasing the maximum temperature or effective in adjusting the optical anisotropy.

If a content of component E is increased, the dielectric anisotropy of the composition is decreased, but the viscosity is decreased. Then, the content is desirably as large as possible, as long as the composition meets a desired value of threshold voltage of the device. Therefore, when the composition is prepared, the content of component E is, based on the weight of the composition, preferably, approximately 30% by weight or more, and further preferably, approximately 40% by weight or more.

Preparation of composition (1) is performed by a method for dissolving required components at a high temperature, or the like. According to an application, an additive may be added to the composition. Examples of the additives include an optically active compound, a polymerizable compound, a polymerization initiator, an antioxidant, an ultraviolet light absorber, a light stabilizer, a heat stabilizer, a defoaming agent and a coloring matter. Such additives are well known to those skilled in the art, and described in literature.

Composition (1) may further contain at least one optically active compound. The optically active compound is effective in inducing a helical structure in liquid crystal molecules to give a required twist angle, thereby preventing a reverse twist. Specific preferred examples of the optically active compound include compounds (Op-1) to (Op-18) described below.

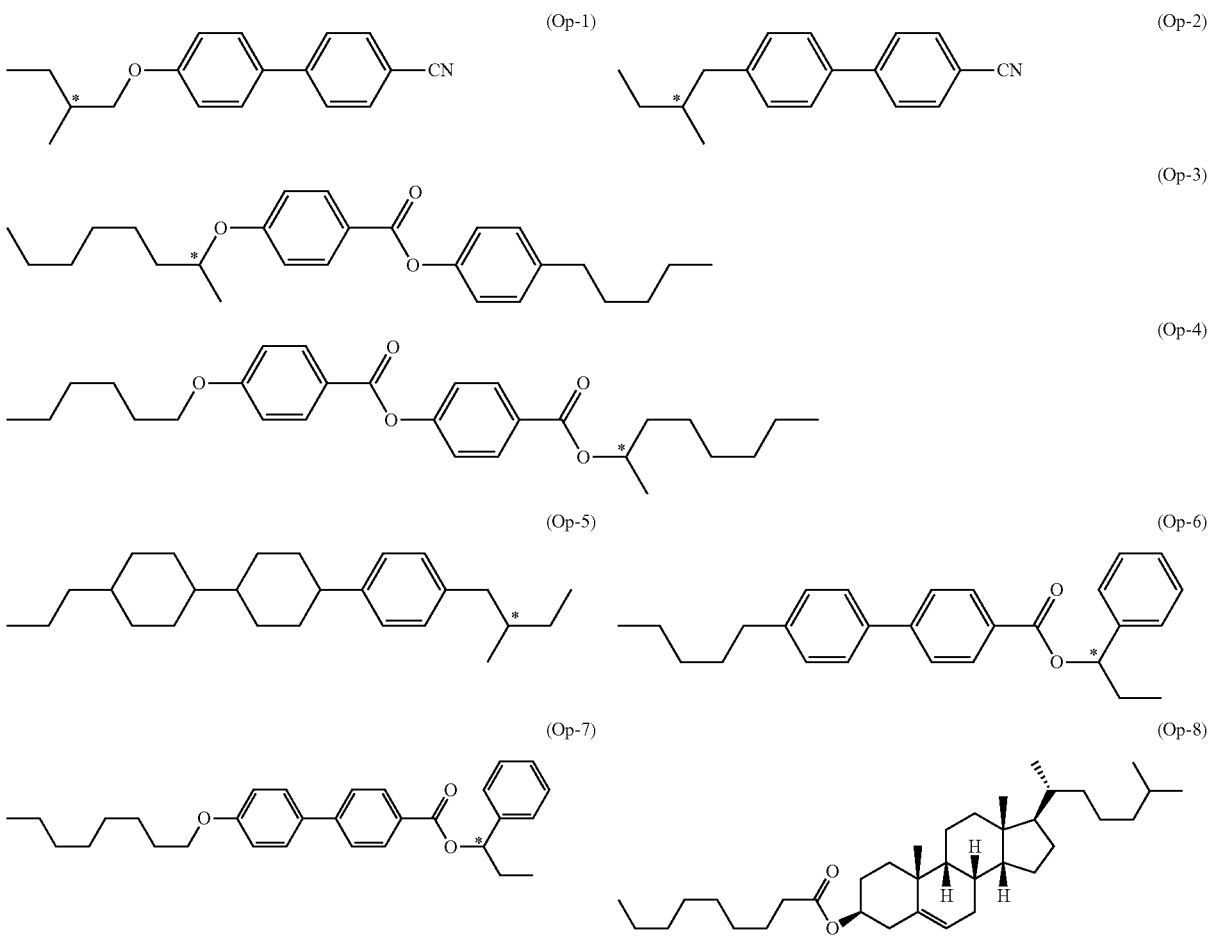

-continued
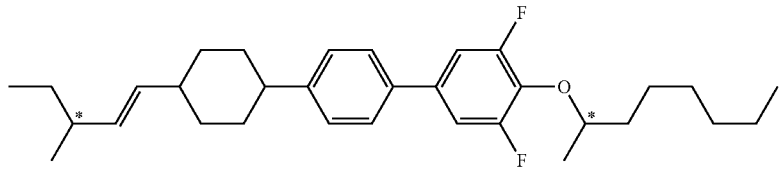
(Op-9)
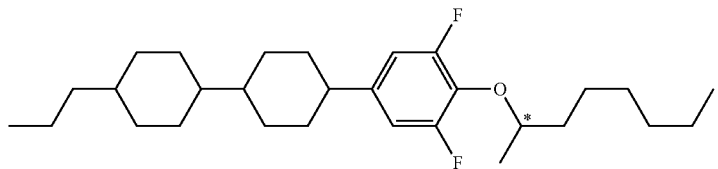
(Op-10)
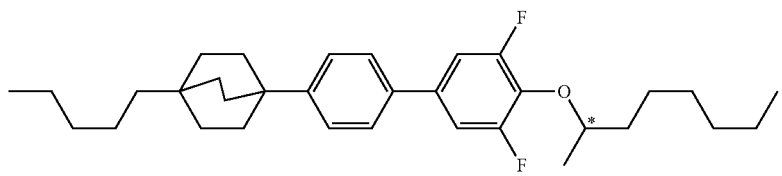
(Op-11)
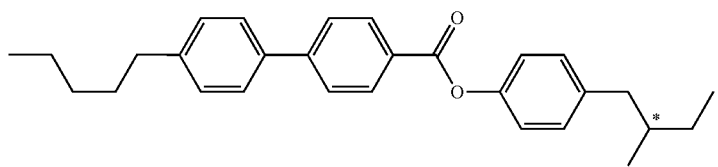
(Op-12)
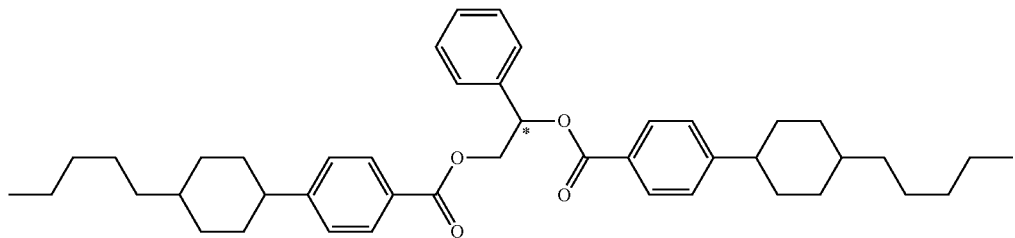
(Op-13)
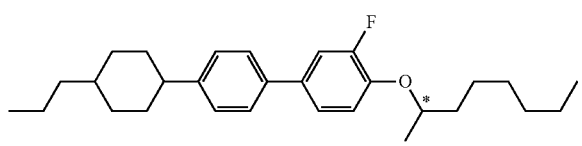
(Op-14)
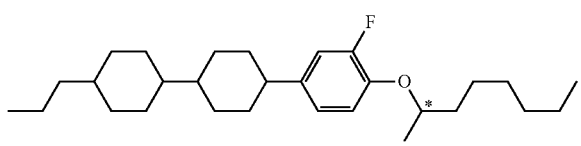
(Op-15)
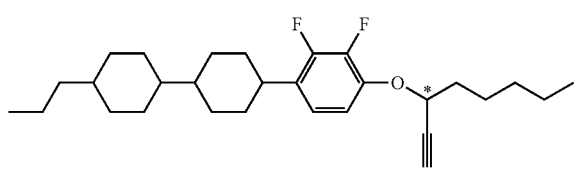
(Op-16)
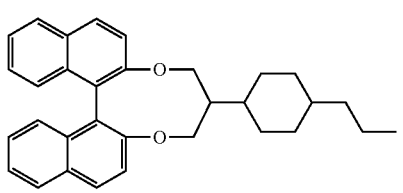
(Op-17)

-continued

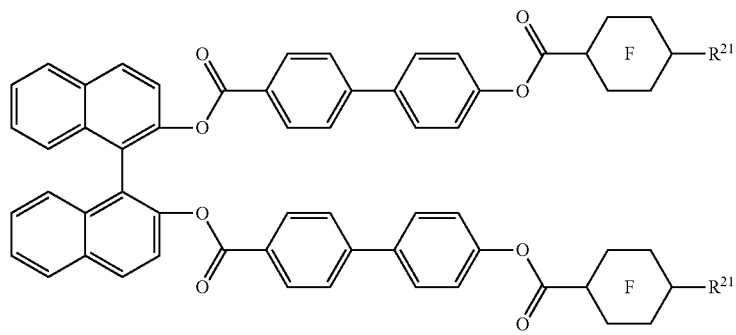
(Op-18)

wherein, in compound (Op-18), ring F is 1,4-cyclohexylene or 1,4-phenylene, and $R^{21}$ is alkyl having 1 to 10 carbons.

In composition (1), a helical pitch is adjusted by adding such an optically active compound. The helical pitch is preferably adjusted in the range of approximately 40 micrometers to approximately 200 micrometers in a composition for the TFT mode and the TN mode. In a composition for the STN mode, the helical pitch is preferably adjusted in the range of approximately 6 micrometers to approximately 20 micrometers. In the case of a composition for the BTN mode, the helical pitch is preferably adjusted in the range of approximately 1.5 micrometers to approximately 4 micrometers. For the purpose of adjusting temperature dependence of the helical pitch, two or more optically active compounds may be added.

Composition (1) can also be used for the PSA mode by adding a polymerizable compound. Specific examples of the polymerizable compound include an acrylate, a methacrylate, a vinyl compound, a vinyloxy compound, a propenyl ether, an epoxy compound (oxirane, oxetane) and a vinyl ketone. The polymerizable compound is polymerized by irradiation with ultraviolet light or the like. An initiator such as a photopolymerization initiator may be added. Suitable conditions for the polymerization, a suitable type of the initiator, and a suitable amount thereof are known to those skilled in the art, and are describe in literature. Specific preferred examples of the polymerizable compound include compounds (M-1) to (M-12).

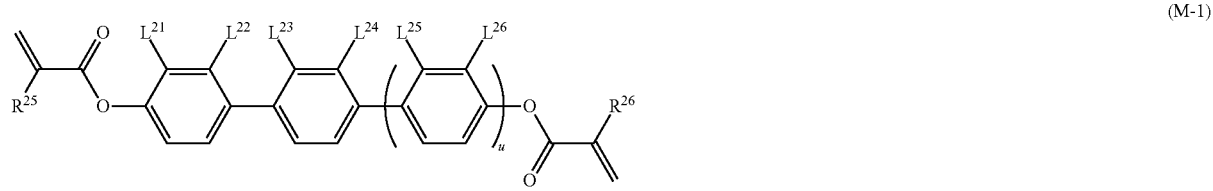
(M-1)

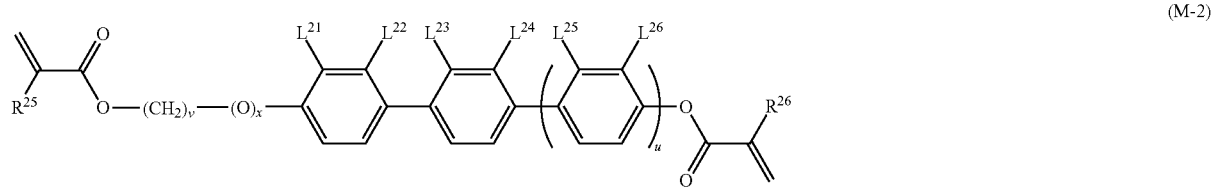
(M-2)

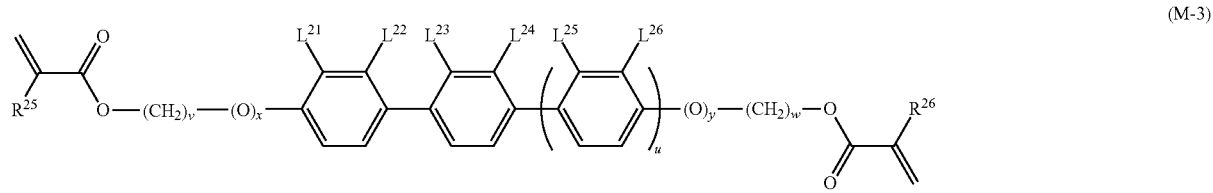
(M-3)

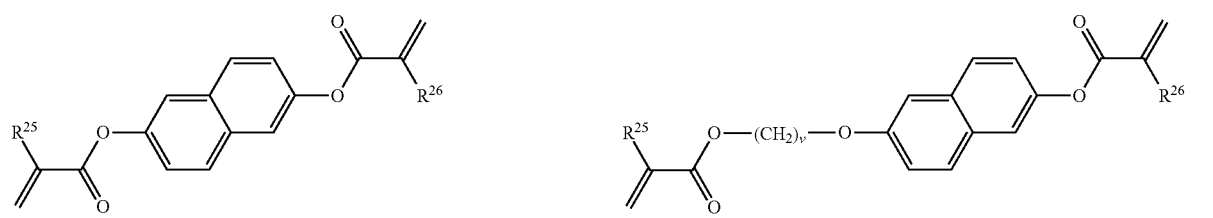
(M-4)           (M-5)

-continued

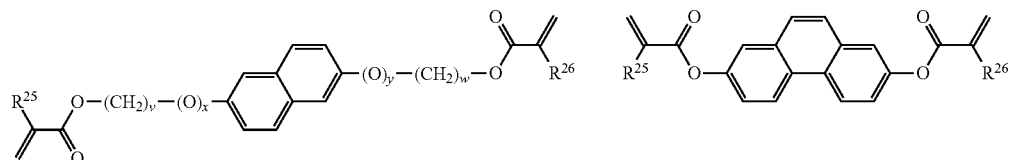
(M-6)

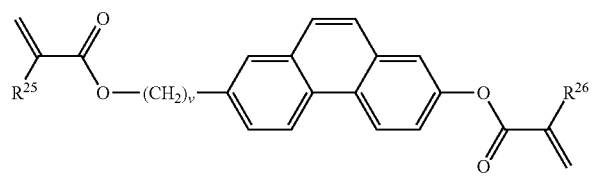
(M-7)

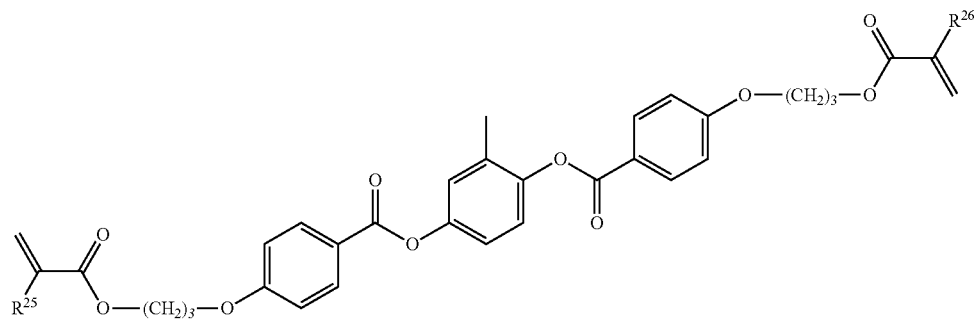
(M-8)

(M-9)

(M-10)

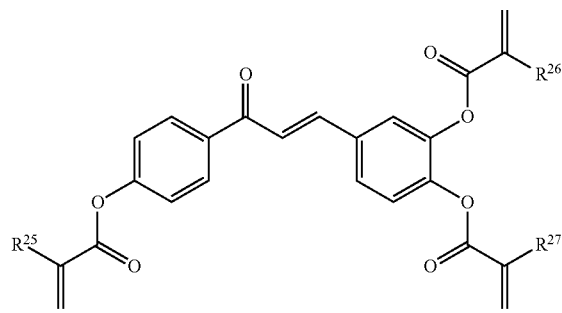

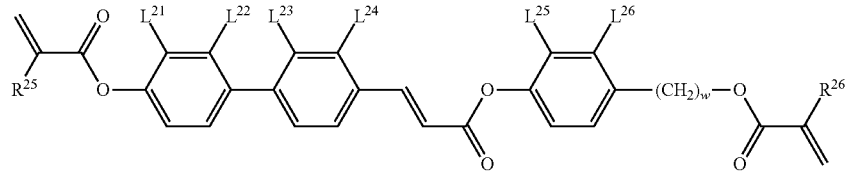
(M-11)

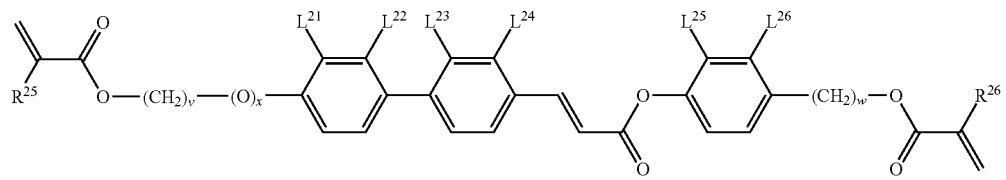
(M-12)

In compounds (M-1) to (M-12), $R^{25}$, $R^{26}$ and $R^{27}$ are independently hydrogen or methyl; u, x and y are independently 0 or 1; v and w are independently an integer from 1 to 10; $L^{21}$, $L^{22}$, $L^{23}$, $L^{24}$, $L^{25}$ and $L^{26}$ are independently hydrogen or fluorine.

The antioxidant is effective for maintaining a large voltage holding ratio. Specific preferred examples of the antioxidant include compounds (AO-1) or (AO-2) as described below, IRGANOX 415, IRGANOX 565, IRGANOX 1010, IRGANOX 1035, IRGANOX 3114 or IRGANOX 1098 (trade names: BASF SE). The ultraviolet light absorber is effective for preventing a decrease in the maximum temperature. Preferred examples of the ultraviolet light absorber include a benzophenone derivative, a benzoate derivative and a triazole derivative. Specific examples include compounds (AO-3) or (AO-4) described below, TINUVIN 329, TINUVIN P, TINUVIN 326, TINUVIN 234, TINUVIN 213, TINUVIN 400, TINUVIN 328, TINUVIN 99-2 (trade names: BASF SE) or 1,4-diazabicyclo[2.2.2]octane (DABCO). A light stabilizer such as an amine having steric hindrance is preferred for maintaining a large voltage holding ratio. Specific preferred examples of the light stabilizer include compounds (AO-5) or (AO-6) described below, TINUVIN 144, TINUVIN 765 or TINUVIN 770DF (trade names: BASF SE). A heat stabilizer is also effective in maintaining a large voltage holding ratio. Preferred examples include IRGAFOS 168 (trade name: BASF SE). The defoaming agent is effective in preventing foam formation. Preferred examples of the defoaming agent include dimethyl silicone oil and methyl phenyl silicone oil.

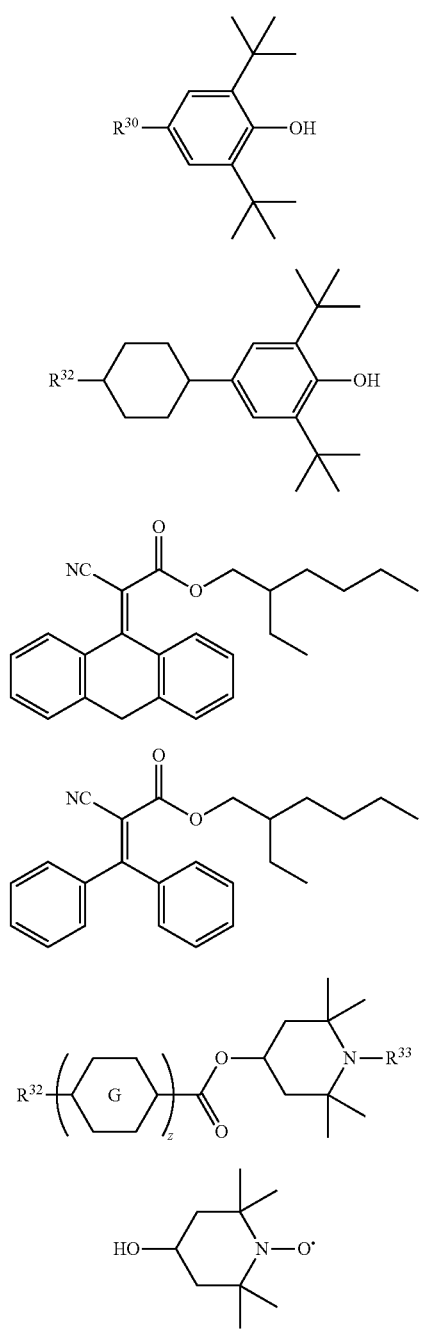

In compound (AO-1), $R^{30}$ is alkyl having 1 to 20 carbons, alkoxy having 1 to 20 carbons, —COOR$^{31}$ or —CH$_2$CH$_2$COOR$^{31}$, and R$^{31}$ is alkyl having 1 to 20 carbons. In compound (AO-2), $R^{32}$ is alkyl having 1 to 20 carbons. In compound (AO-5), $R^{32}$ is alkyl having 1 to 20 carbons; $R^{33}$ is hydrogen, methyl or O. (oxygen radical); ring G is 1,4-cyclohexylene or 1,4-phenylene; and z is 1, 2 or 3.

Composition (1) can also be used for a guest host (GH) mode by addition of a dichroic dye such as a merocyanine type, a stylyl type, an azo type, an azomethine type, an azoxy type, a quinophthalone type, an anthraquinone type and a tetrazine type.

3. Liquid Crystal Display Device

Composition (1) can be used for a liquid crystal display device having an operating mode such as the PC mode, the TN mode, the STN mode, the OCB mode and the PSA mode, and driven by an active matrix (AM mode). Composition (1) can also be used for a liquid crystal display device having an operating mode such as the PC mode, the TN mode, the STN mode, the OCB mode, the VA mode and the IPS mode, and driven by a passive matrix (PM) mode. The AM mode device and the PM mode device can be applied to any of a reflective type, a transmissive type and transflective type.

Composition (1) can also be used for a nematic curvilinear aligned phase (NCAP) device prepared by microencapsulating a nematic liquid crystal, a polymer dispersed liquid crystal display device (PDLCD) device in which a three-dimensional network polymer is formed in the liquid crystal, and a polymer network liquid crystal display device (PNLCD).

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention will be described in greater detail by way of Examples. However, the invention is not limited by the Examples.

1-1. Example of Compound (1)

Compound (1) was prepared according to procedures described below. The prepared compound was identified by a method such as an NMR analysis. Physical properties of the compound were measured by methods described below.

NMR Analysis

For measurement, DRX-500 made by Bruker BioSpin Corporation was used. In $^1$H-NMR measurement, a sample was dissolved in a deuterated solvent such as CDCl$_3$, and measurement was carried out under conditions of room temperature, 500 MHz and 16 times of accumulation. Tetramethylsilane was used as an internal standard. $^{19}$F-NMR measurement was carried out using CFCl$_3$ as an internal standard and under conditions of 24 times of accumulation. In the explanation of nuclear magnetic resonance spectra, symbols s, d, t, q, quin, sex, m and br stand for a singlet, a doublet, a triplet, a quartet, a quintet, a sextet, a multiplet and being broad, respectively.

Sample for Measurement

When phase structure and transition temperature were measured, a liquid crystal compound itself was used as a sample. When physical properties such as a maximum temperature of a nematic phase, viscosity, optical anisotropy and dielectric anisotropy were measured, a composition prepared by mixing the compound with a base liquid crystal was used as a sample.

When a sample in which the compound was mixed with the base liquid crystal was used, measurement was carried out as described below. A sample was prepared by mixing 15% by weight of compound and 85% by weight of base liquid crystal. Then, extrapolated values were calculated from measured values of the sample according to an extrapolation method represented by an equation below, and the extrapolated values were described. {Extrapolated value}={100×(measured value of a sample)−(% by weight of base liquid crystal)×(measured value of the base liquid crystal)}/(% by weight of the compound).

When crystals (or a smectic phase) precipitated at 25° C. even at the ratio of the compound to the base liquid crystal, a ratio of the compound to the base liquid crystal is changed in the order of (10% by weight:90% by weight), (5% by weight: 95% by weight) and (1% by weight:99% by weight), and physical properties of the sample were measured at a ratio at which no crystals (or no smectic phase) precipitated at 25° C. In addition, unless otherwise noted, the ratio of the compound to the base liquid crystal was 15% by weight:85% by weight.

As the base liquid crystal, base liquid crystal (i) described below was used. Ratios of components of base liquid crystal (i) are expressed in terms of % by weight.

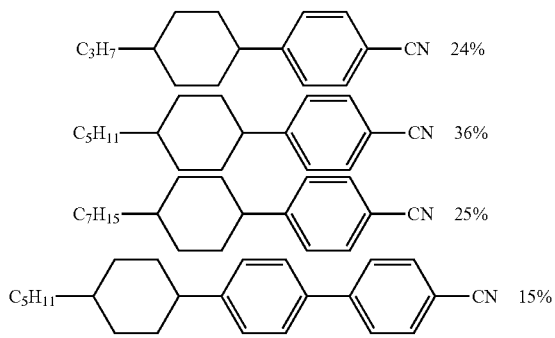

Measurement Methods

Physical properties were measured according to methods described below. Most of the methods are applied as described in the Standard of the Japan Electronics and Information Technology Industries Association (hereinafter, abbreviated as JEITA) (JEITA ED-2521B) discussed and established by JEITA, or as modified thereon. No TFT was attached to a TN device used for measurement.

(1) Phase Structure

A sample was placed on a hot plate of a melting point apparatus (FP-52 Hot Stage made by Mettler-Toledo International Inc.) equipped with a polarizing microscope, and a state of phase and a change thereof were observed with the polarizing microscope while the sample was heated at a rate of 3° C. per minute, and a kind of the phase was specified.

(2) Transition Temperature (° C.)

Measurement was carried out using a differential scanning calorimeter, Diamond DSC System, made by PerkinElmer, Inc., or a high-sensitivity differential scanning calorimeter, X-DSC7000, made by SII NanoTechnology Inc. A sample was heated and then cooled at a rate of 3° C. per minute, and a starting point of an endothermic peak or an exothermic peak caused by a phase change of the sample was determined by extrapolation, and thus a transition temperature was determined Temperature at which a compound undergoes transition from a solid to a liquid crystal phase such as a smectic phase and a nematic phase may be occasionally abbreviated as "minimum temperature of the liquid crystal phase". Temperature at which a compound undergoes transition from a liquid crystal phase to an isotropic liquid may be occasionally abbreviated as "clearing point".

Crystals were expressed as C. When kinds of the crystals were distinguishable, each of the crystals was expressed as $C_1$ or $C_2$. A smectic phase or a nematic phase was expressed as S or N. When smectic A phase, smectic B phase, smectic C phase or smectic F phase was distinguishable among the smectic phases, the phases were expressed as $S_A$, $S_B$, $S_C$ or $S_F$, respectively. A liquid (isotropic) was expressed as I. A transition temperature was expressed, for example, as "C 50.0N 100.0 I." The expression indicates that a transition temperature from a crystal to a nematic phase is 50.0° C., and a transition temperature from the nematic phase to a liquid is 100.0° C.

(3) Compatibility at a Low Temperature

Samples in which the base liquid crystal and the compound were mixed for the compound to be 20% by weight, 15% by weight, 10% by weight, 5% by weight, 3% by weight and 1% by weight were prepared, and placed in glass vials. After the glass vials were kept in freezers at −10° C. or −20° C. for a predetermined period of time, whether or not crystals or a smectic phase precipitated was observed.

(4) Maximum Temperature of a Nematic Phase ($T_{NI}$ or NI; ° C.)

A sample was placed on a hot plate in a melting point apparatus equipped with a polarizing microscope and was heated at a rate of 1° C. per minute. Temperature was measured when part of the sample began to change from a nematic phase to an isotropic liquid. When the sample was a mixture of a compound and a base liquid crystal, the maximum temperature was expressed using a symbol $T_{NI}$. When the sample was a mixture of a compound and component B or the like, the maximum temperature was expressed using a symbol NI.

(5) Minimum Temperature of a Nematic Phase ($T_c$; ° C.)

Samples each having a nematic phase were kept in freezers at temperatures of 0° C., −10° C., −20° C., −30° C. and −40° C. for 10 days, and then liquid crystal phases were observed. For example, when a sample maintained the nematic phase at −20° C. and changed to crystals or a smectic phase at −30° C., $T_c$ was expressed as $T_c \leq -20°$ C.

(6) Viscosity (Bulk Viscosity; η; Measured at 20° C.; mPa·s)

A cone-plate (E-type) rotational viscometer made by Tokyo Keiki Inc. was used for measurement.

(7) Viscosity (Rotational Viscosity; γ1; Measured at 25° C.; mPa·s)

Measurement was carried out according to a method described in M. Imai et al., Molecular Crystals and Liquid Crystals, Vol. 259, 37 (1995). A sample was put in a TN device in which a twist angle was 0 degrees and a distance (cell gap) between two glass substrates was 5 micrometers. Voltage was applied stepwise to the device in the range of 16 V to 19.5 V at an increment of 0.5 V. After a period of 0.2 second with no voltage, application was repeated under the conditions of only one rectangular wave (rectangular pulse; 0.2 second) and no voltage (2 seconds). A peak current and a peak time of a transient current generated by the applied voltage were measured. A value of rotational viscosity was obtained from the measured values and calculation equation (8) on page 40 of the paper presented by M. Imai et al. A value of dielectric anisotropy required for the calculation was determined using the device by which the rotational viscosity was measured and by a method described below.

(8) Optical Anisotropy (Refractive Index Anisotropy; Measured at 25° C.; Δn)

Measurement was carried out by an Abbe refractometer with a polarizing plate mounted on an ocular by using light at a wavelength of 589 nanometers. A surface of a main prism was rubbed in one direction, and then a sample was added dropwise onto the main prism. A refractive index (nil) was measured when the direction of polarized light was parallel to the direction of rubbing. A refractive index (n1) was measured when the direction of polarized light was perpendicular to the direction of rubbing. A value of optical anisotropy (Δn) was calculated from an equation: Δn=n∥−n⊥.

(9) Dielectric Anisotropy (Δ∈; Measured at 25° C.)

A sample was put in a TN device in which a distance (cell gap) between two glass substrates was 9 micrometers and a twist angle was 80 degrees. Sine waves (10 V, 1 kHz) were applied to the device, and after 2 seconds, a dielectric constant (∈∥) in the major axis direction of liquid crystal molecules was measured. Sine waves (0.5 V, 1 kHz) were applied to the device, and after 2 seconds, a dielectric constant (∈⊥) in the minor axis direction of the liquid crystal molecules was measured. A value of dielectric anisotropy was calculated from an equation: Δ∈=∈∥−∈⊥.

(10) Elastic Constant (K; Measured at 25° C.; pN)

HP4284A LCR Meter made by Yokogawa-Hewlett-Packard Co. was used for measurement. A sample was put in a horizontal alignment device in which a distance (cell gap) between two glass substrates was 20 micrometers. An electric charge from 0 V to 20 V was applied to the device, and electrostatic capacity and applied voltage were measured. The measured values of electrostatic capacity (C) and applied voltage (V) were fitted to equation (2.98) and equation (2.101) on page 75 of "Liquid Crystal Device Handbook" (Ekisho Debaisu Handobukku in Japanese; The Nikkan Kogyo Shimbun, Ltd.) and the values of $K_{11}$ and $K_{33}$ were obtained from equation (2.99). Next, $K_{22}$ was calculated using the previously determined values of $K_{11}$ and $K_{33}$ in formula (3.18) on page 171. An elastic constant K was represented by a mean value of the thus determined $K_{11}$, $K_{22}$ and $K_{33}$.

(11) Threshold Voltage (Vth; Measured at 25° C.; V)

An LCD-5100 luminance meter made by Otsuka Electronics Co., Ltd. was used for measurement. A light source was a halogen lamp. A sample was put in a normally white mode TN device in which a distance (cell gap) between two glass substrates was approximately 0.45/Δn (μm) and a twist angle was 80 degrees. Voltage (32 Hz, rectangular waves) to be applied to the device was stepwise increased from 0 V to 10 V at an increment of 0.02 V. On the occasion, the device was irradiated with light from a direction perpendicular to the device, and an amount of light transmitted through the device was measured. A voltage-transmittance curve was prepared, in which the maximum value of the amount of light corresponded to 100% transmittance and the minimum value of the amount of light corresponded to 0% transmittance. A threshold voltage was represented in terms of a voltage at 90% transmittance.

(12) Voltage Holding Ratio (VHR-1; Measured at 25° C.; %)

A TN device used for measurement had a polyimide alignment film and a distance (cell gap) between two glass substrates was 5 micrometers. A sample was put in the device, and then the device was sealed with an ultraviolet-curable adhesive. The device was charged by applying a pulse voltage (60 microseconds at 5 V) at 25° C. A decaying voltage was measured for 16.7 milliseconds with a high-speed voltmeter, and area A between a voltage curve and a horizontal axis in a unit cycle was obtained. Area B was an area without decay. A voltage holding ratio was represented in terms of a percentage of area A to area B.

(13) Voltage Holding Ratio (VHR-2; Measured at 80° C.; %)

A voltage holding ratio (VHR-2) was determined in a manner similar to determination of VHR-1 except that measurement was carried out at 80° C.

Raw Material

Solmix A-11 (trade name) is a mixture of ethanol (85.5%), methanol (13.4%) and isopropanol (1.1%), and was purchased from Japan Alcohol Trading Company, Ltd.

Example 1

Synthesis of (E)-4-((3,5-difluoro-4-((3,3-difluoro-1-propene-1-yl)oxy)phenoxy)difluoromethyl)-4'-propyl-1,1'-bi(cyclohexane) (No. 38)

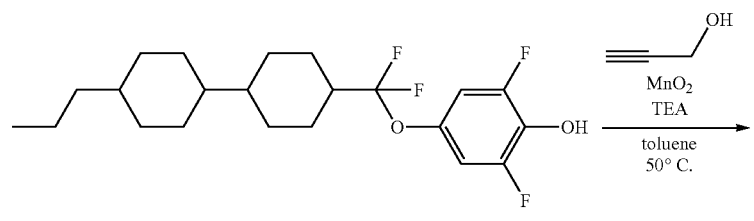

(T-1)

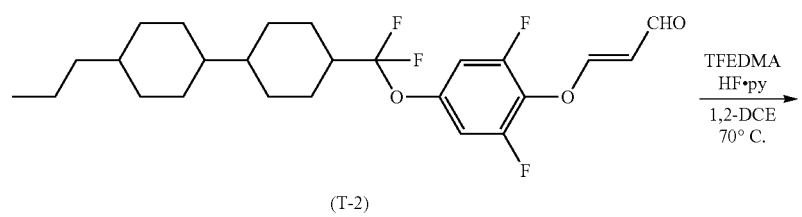

(T-2)

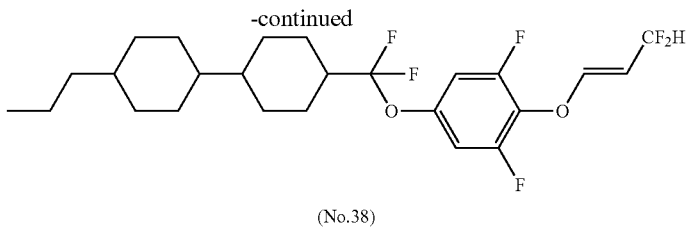

(No. 38)

In toluene, 4-(difluoro(4'-propyl-[1,1'-bi(cyclohexane)]-4-yl)methoxy)-2,6-difluorophenol (T-1, 4.02 g, 10 mmol) prepared according to a publicly known method, propargyl alcohol (2.96 mL, 50 mmol), triethylamine (4.16 g, 30 mmol) and manganese dioxide (17.4 g, 200 mmol) were stirred at 50° C. for 14 hours. The resultant reaction suspension was allowed to cool to room temperature, and then subjected to Celite filtration, a manganese residue was washed with acetone (120 mL), and thus the resulting filtrate was concentrated. The resulting concentrated residue was dissolved into hexane, and cooled to −78° C., and a resulting deposit was sucked and taken by filtration and dried under reduced pressure to give (T-2) (4.57 g, 10 mmol) as a pale yellow solid. (T-2) contained an enal intermediate corresponding to 4.32 g (9.45 mmol, 95%) and 3-propargyloxy-2-propene-1-al corresponding to 0.25 g (0.55 mmol) (calculated from $^1$H-NMR). The resulting pale yellow solid (4.57 g) was dissolved in 1,2-dichloroethane (20 ml), 1,1,2,2-tetrafluoroethyl-N,N-dimethylamine (3.51 ml, 30 mmol) and a 70% hydrogen fluoride-pyridine complex (390 mL, 15 mmol) were added thereto, and the resulting mixture was heated at 70° C. for 65 hours. After completion of the reaction, the reaction mixture allowed to cool to room temperature was poured into a saturated aqueous solution of sodium hydrogencarbonate (300 mL), and extracted with chloroform (240 mL×2). Combined organic layers were dried over anhydrous magnesium sulfate, the resulting residue concentrated under reduced pressure was purified by silica gel column chromatography (elution solvent: hexane), and then the resulting white solid (2.38 g) was dissolved into hexane at room temperature and cooled to −78° C., and a precipitated crystal was sucked and taken by filtration, and then dried under reduced pressure to give 2.29 g (4.78 mmol, two steps, 47.8%) of a target compound (No. 38).

$^1$H-NMR (CDCl$_3$; δ ppm): 9.50 (1H, d, J=7.8 Hz), 7.51 (1H, d, J=12.4 Hz), 6.89 (2H, d, J=8.4 Hz), 5.70 (1H, dd, J=7.8 Hz, 12.5 Hz), 2.03-1.97 (3H, m), 1.88-1.84 (2H, m), 1.77-1.70 (4H, m), 1.35-1.26 (4H, m), 1.16-1.13 (3H, m), 1.11-1.03 (6H, m), 1.01-0.84 (5H, m).

Physical properties of compound No. 38 were as described below.

Phase transition temperature: C 42.2 N 120.6 I.

Maximum temperature (NI)=83.7° C.; dielectric anisotropy (Δ∈)=19.3; optical anisotropy (Δn)=0.084.

Example 2

Synthesis of (Z)-4-((3,5-difluoro-4-((3,3-difluoro-1-propene-1-yl)oxy)phenoxy)difluoromethyl)-4'-propyl-1,1'-bi(cyclohexane)

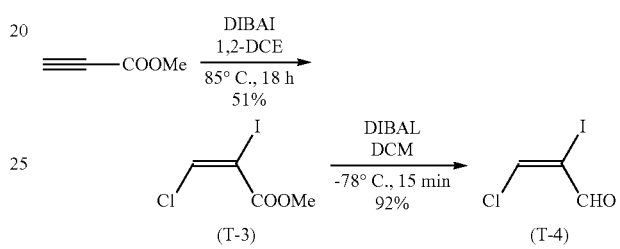

First Step

Tetrabutylammonium iodide (25 g, 67.7 mmol) was dissolved into 1,2-Dichloroethane (40 ml) and then Methyl propiolate (5.0 ml, 59.8 mmol) was added under argon atmosphere. Subsequently, the mixture was heated to 85° C. for 18 hours. After the reaction mixture had been allowed to cool to room temperature, diethyl ether (120 ml) and silica gel (40 g) were added, and the components insoluble are removed by vacuum filtration. Then, diethyl ether (120 ml) and silica gel (40 g) were added to the filtrate, and the components insoluble are removed by vacuum filtration. The filtrate was concentrated under reduced pressure to give (T-3) (7.48 g, 51%) as yellow liquid.

Second Step

Compound (T-3) (3.2 g, 13.0 mmol) was dissolved in dichloromethane (27.9 ml) and cooled to −78° C. under argon atmosphere, and then diisobutylaluminium hydride in dichloromethane solution (1M, 17.7 ml) was added dropwise during a period of 10 minutes. After being stirred at −78° C. for 5 minutes, Methanol (2.5 ml), saturated Potassium sodium tartrate aqueous solution (70 ml) and diethyl ether (50 ml) were added to the mixture. Then the mixture had been allowed to cool to room temperature, and stirred for 2 hours. After separation, the aqueous layer was extracted with diethyl ether (25 ml×2). The combined organic extracts were dried over anhydrous magnesium sulfate, and concentrated under reduced pressure. The residue was purified by silica gel chromatography (pentane:diethyl ether=8:2, by volume as eluent) to give (T-4) (2.59 g, 92%) as yellow liquid.

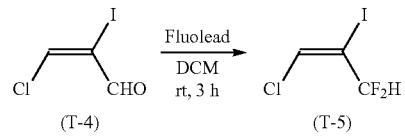

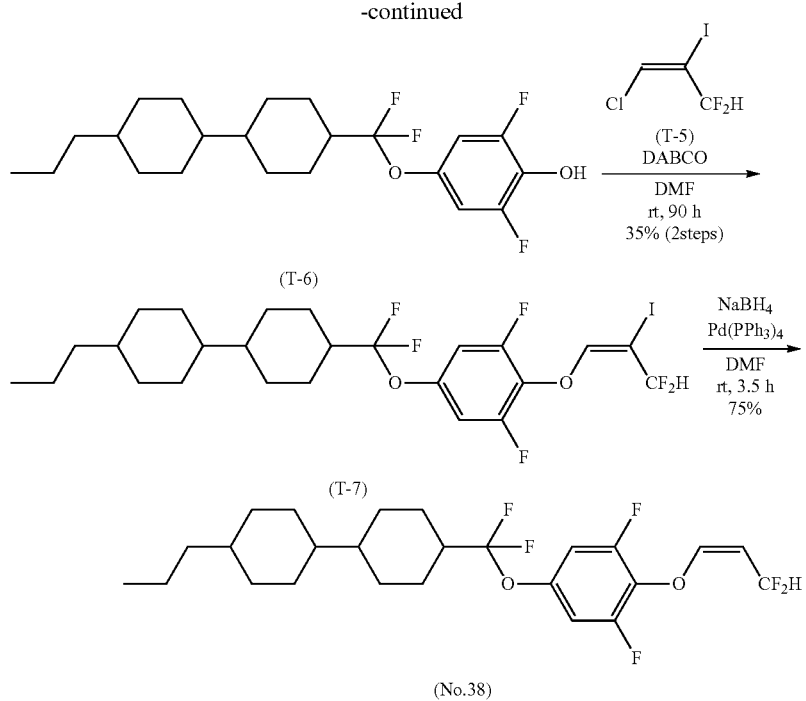

Third Step
The compound (T-4) (2.59 g, 12.0 mmol) was dissolved into dichloromethane (6 ml), and then 4-tert-Butyl-2,6-dimethylphenylsulfur Trifluoride (3.29 g, 13.2 mmol) was added. The mixture was stirred for 3 hours at room temperature to give compound (T-5). The resulting (T-5) solution was added dropwise to a solution of (T-6) in dimethylformamide, and then the reaction mixture was stirred for 90 minutes at room temperature. The reaction mixture was poured into water (200 ml), and extracted with hexane (150 ml×2). The organic extract was dried over anhydrous magnesium sulfate, and concentrated under reduced pressure. The residue was purified by silica gel chromatography (hexane as eluent) to give compound (T-7) (2.57 g, 35%) as white solid.

Four Step
The compound (T-7) (2.14 g, 3.54 mmol), and Tetrakis(triphenylphosphine)palladium (81.8 mg, 0.0708 mmol) were dissolved into dimethylformamide, and cooled to 0° C., and then sodium borohydride (134.3 mg, 3.54 mmol) was added. The mixture was stirred at room temperature for 3.5 hours. The mixture was extracted with hexane (20 ml×2), and the extract was dried over anhydrous magnesium sulfate. After concentration under reduced pressure, the residue was purified by silica gel chromatography (hexane as eluent) and recrystallization from hexane to give compound (No. 38) (1.19 g, 71%) as white crystal.

1H-NMR (400 MHz, CDCl$_3$).: 6.84 (2H, d, J=8.5 Hz), 6.79 (1H, dt, J=7.3 Hz, 55.4 Hz), 6.50 (1H, d, J=6.5 Hz), 5.11-5.04 (1H, m), 2.02-1.96 (3H, m), 1.86-1.83 (2H, m), 1.77-1.70 (4H, m), 1.38-1.26 (4H, m), 1.16-1.13 (3H, m), 1.08-0.93 (6H, m), 0.89-0.81 (5H, m)

Physical properties of compound No. 38 were as described below.

Phase transition temperature: C 61.8 N 156.2 I.
Maximum temperature (NI)=117.0° C.; dielectric anisotropy (Δ∈)=24.5; optical anisotropy (Δn)=0.104.

Compounds (No. 1 to No. 270) described below can be prepared according to the method for synthesizing compound (1) as already described.

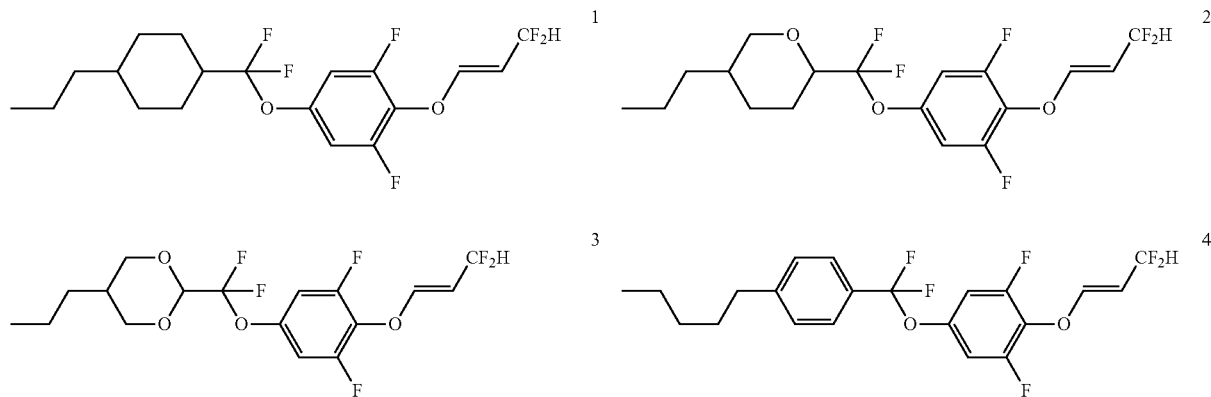

-continued
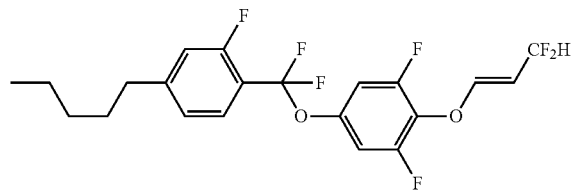
5
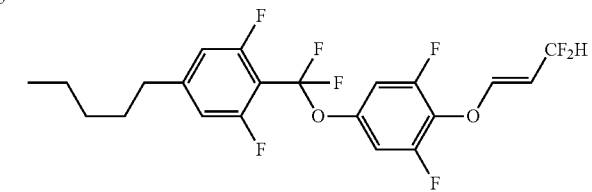
6
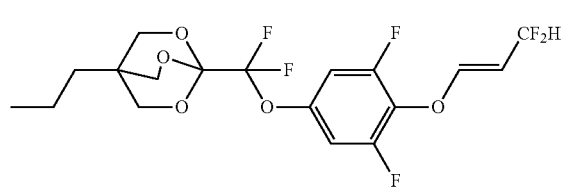
7
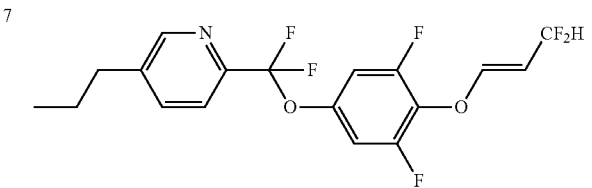
8
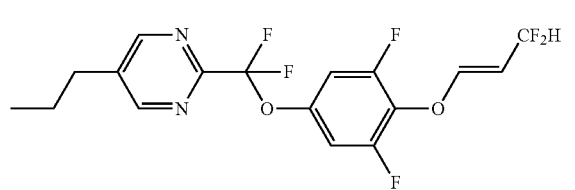
9
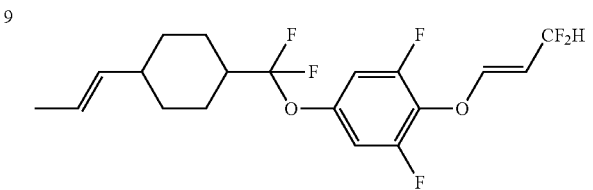
10
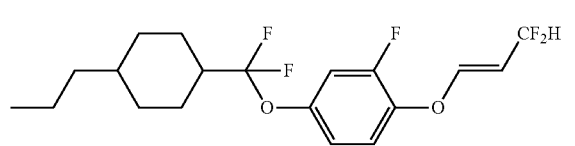
11
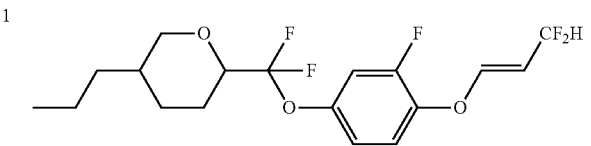
12
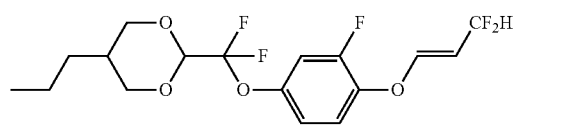
13
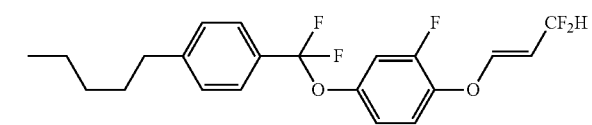
14
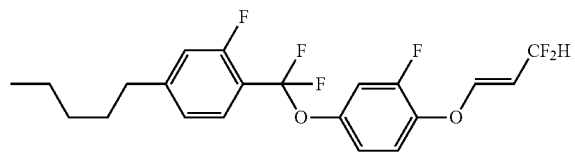
15
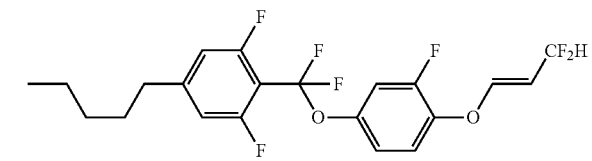
16
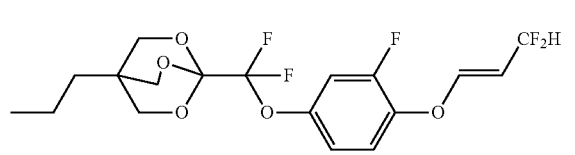
17
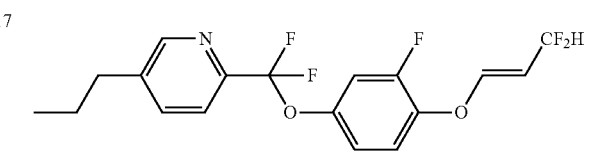
18
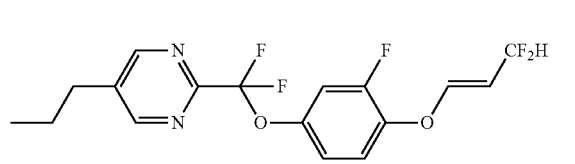
19
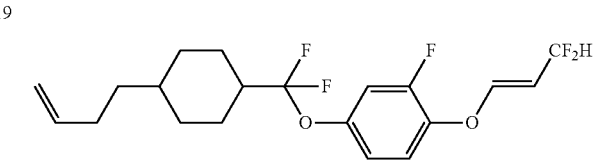
20
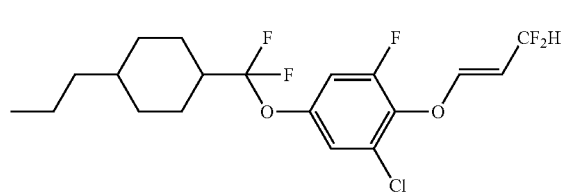
21
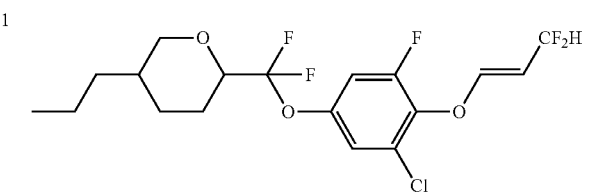
22

-continued

-continued
39
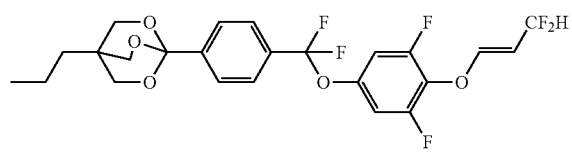
40
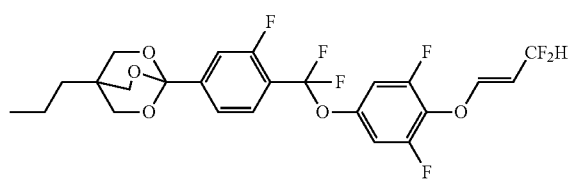
41
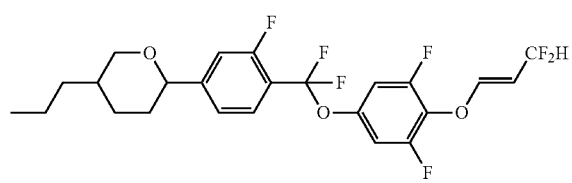
42
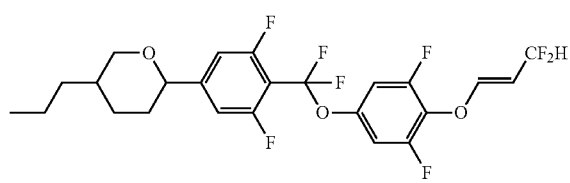
43
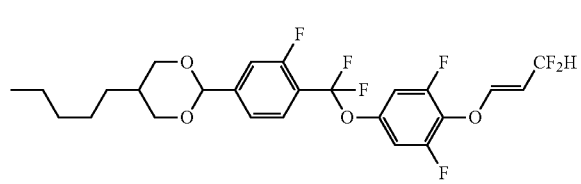
44
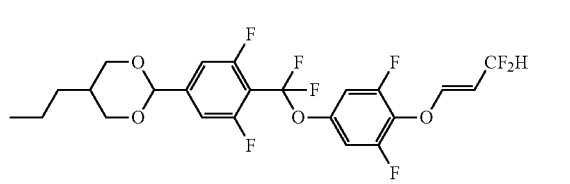
45
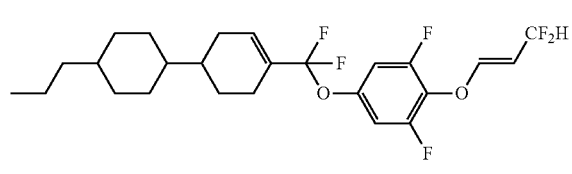
46
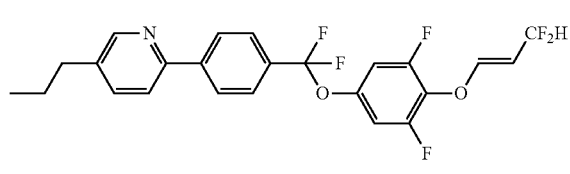
47
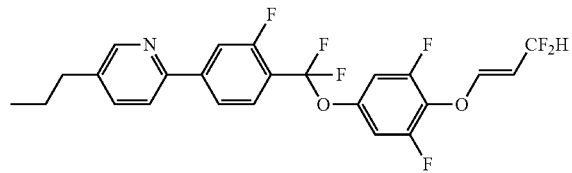
48
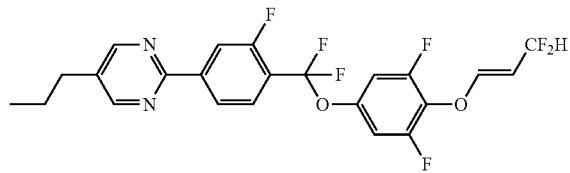
49
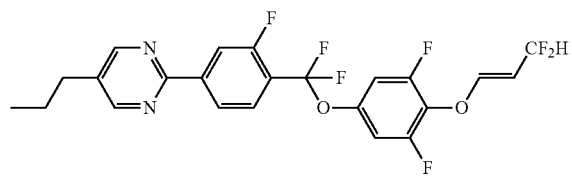
50
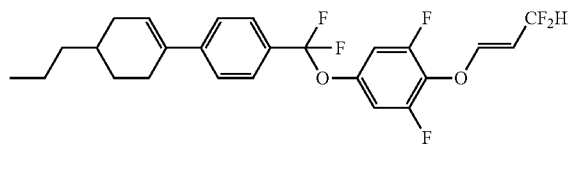
51
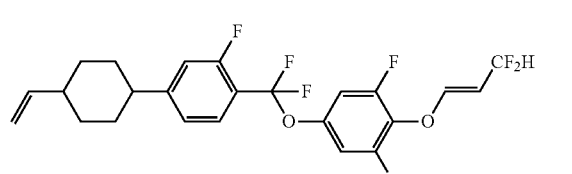
52
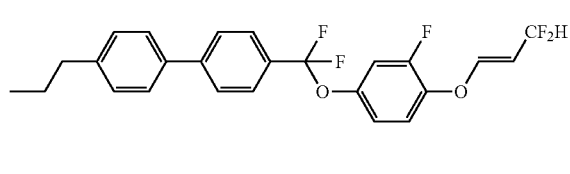
53
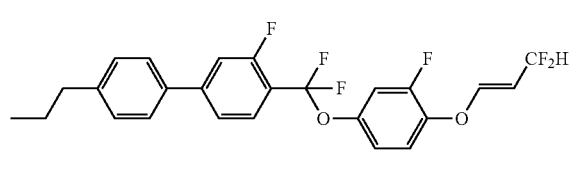
54
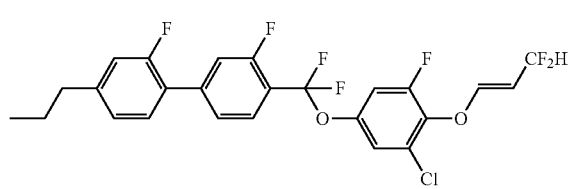

55
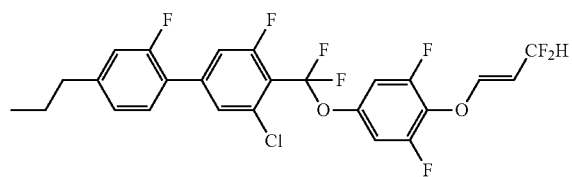
56
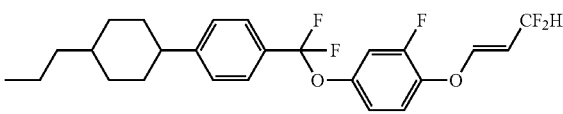
57
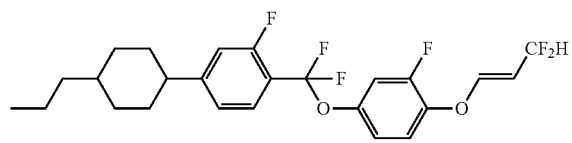
58
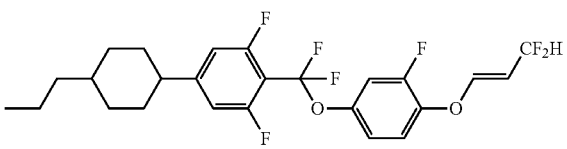
59
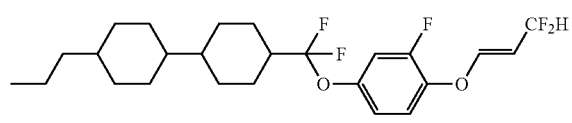
60
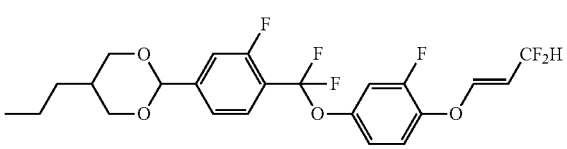
61
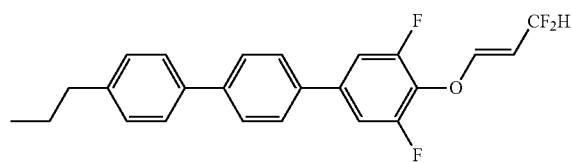
62
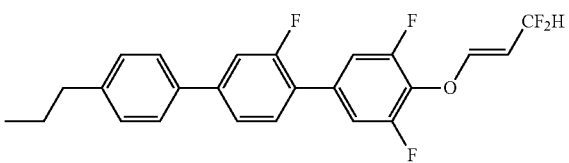
63
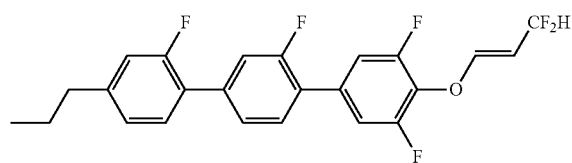
64
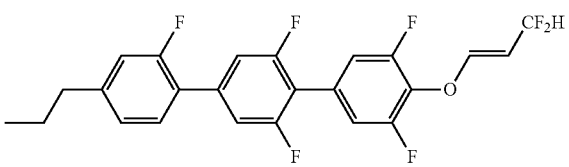
65
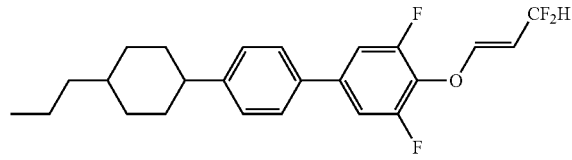
66
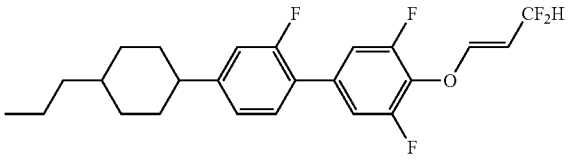
67
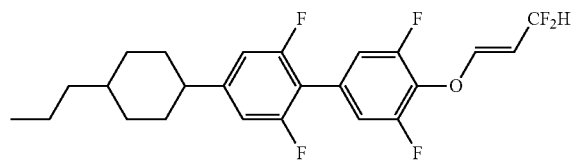
68
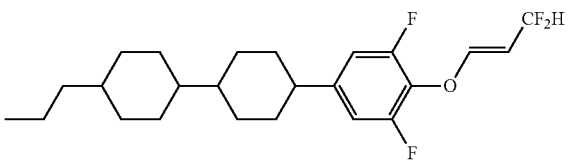
69
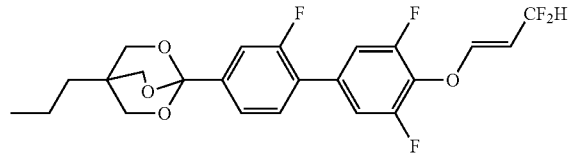
70
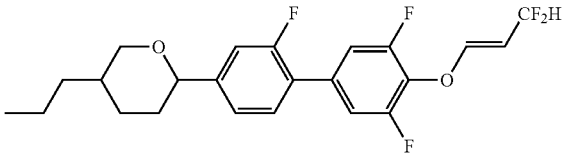

-continued
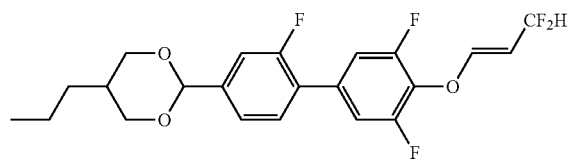
71
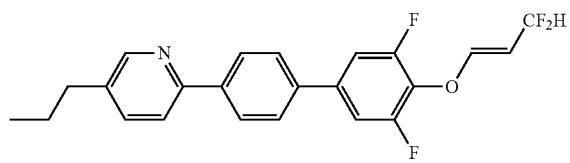
72
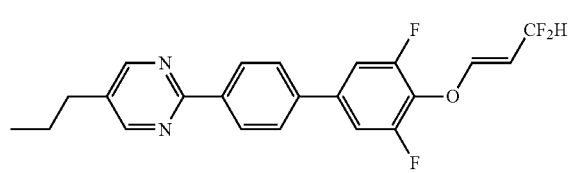
73
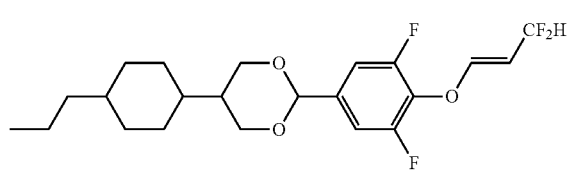
74
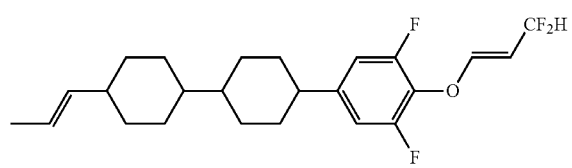
75
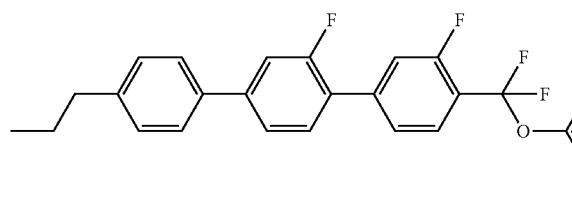
76
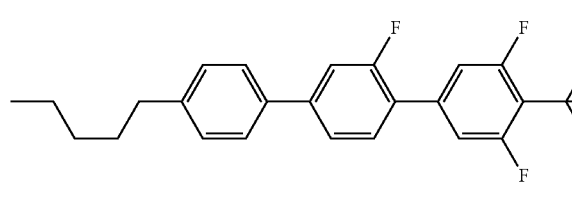
77
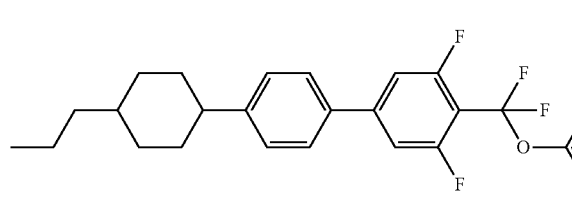
78
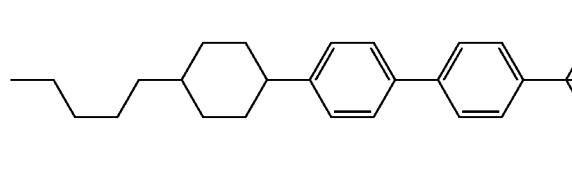
79
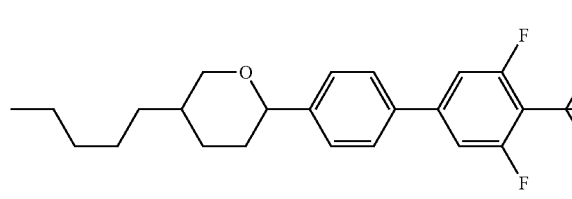
80

-continued
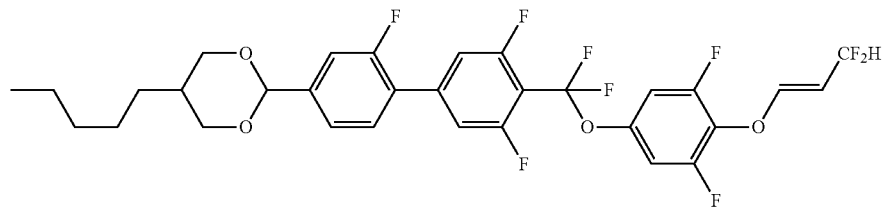
81
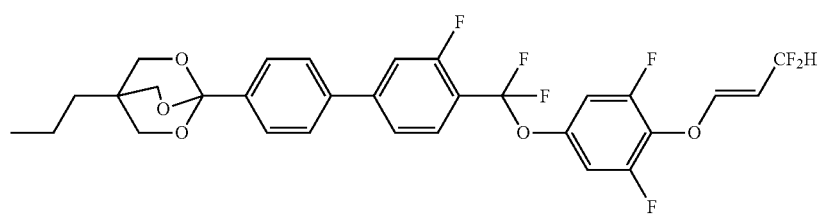
82
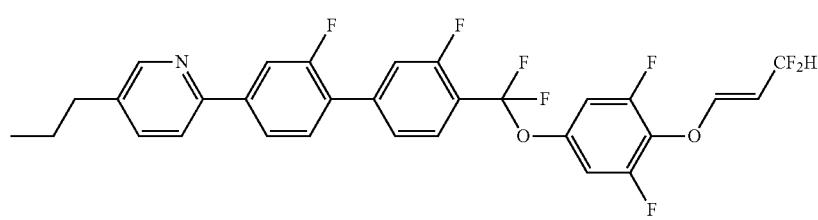
83
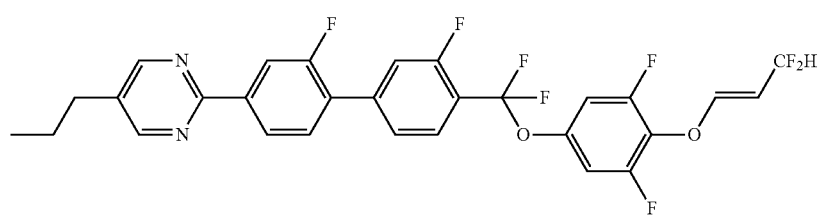
84
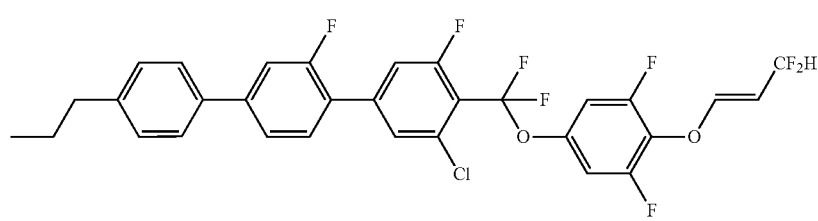
85
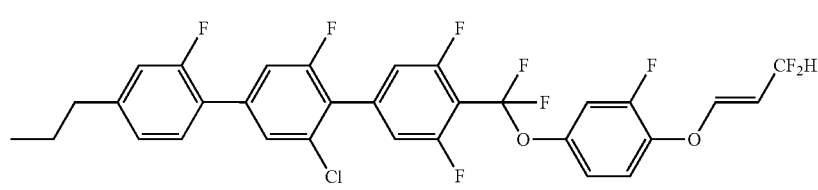
86
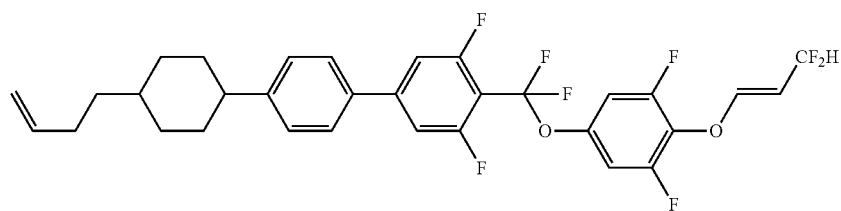
87

-continued
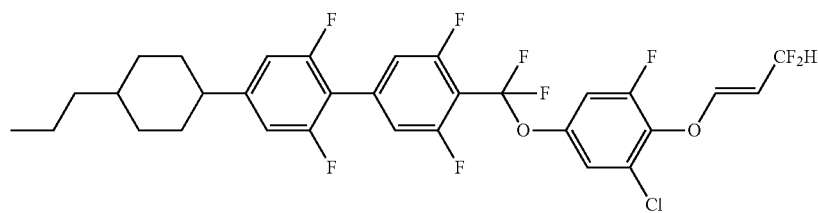
88
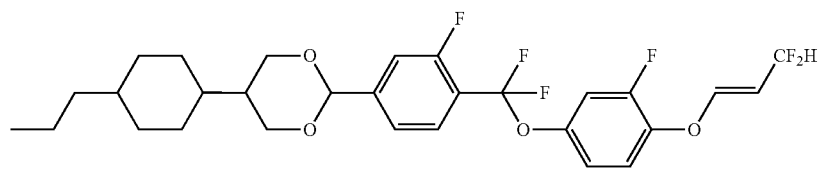
89
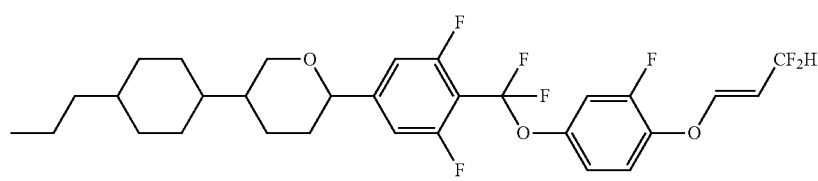
90
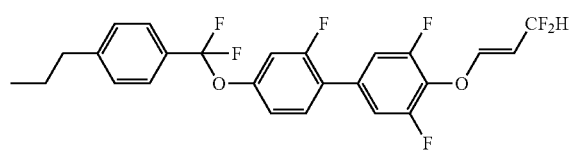
91
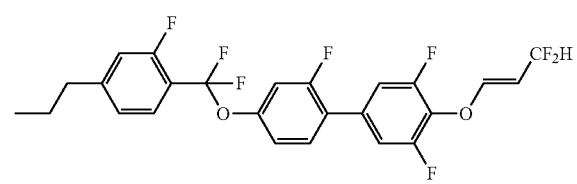
92
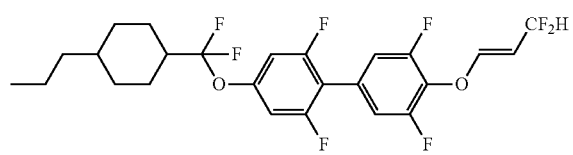
93
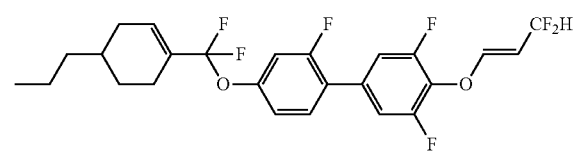
94
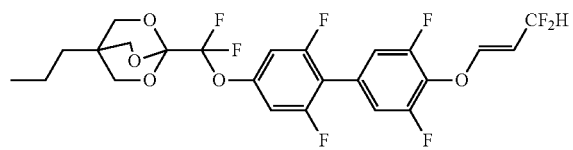
95
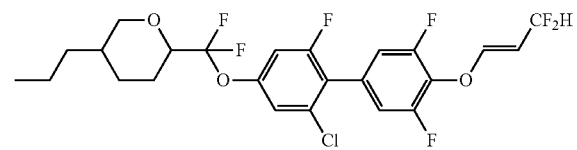
96
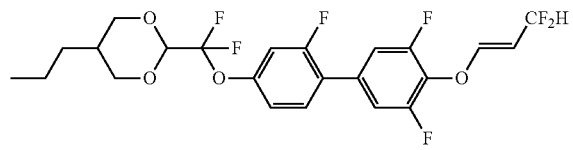
97
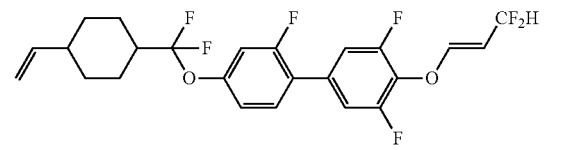
98
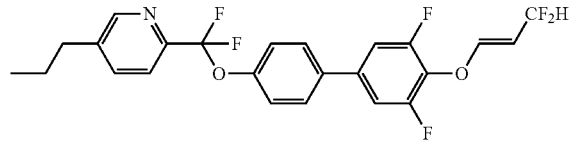
99
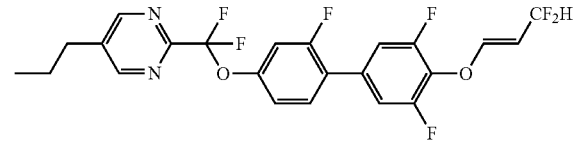
100

101
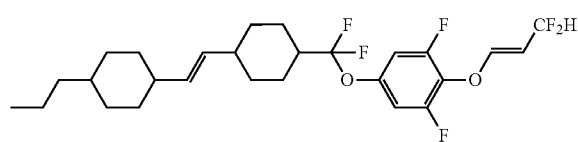
102
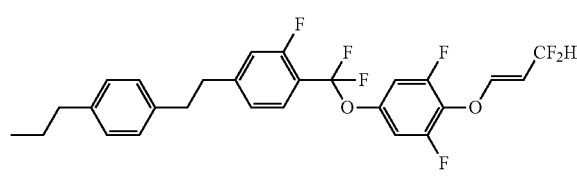
103
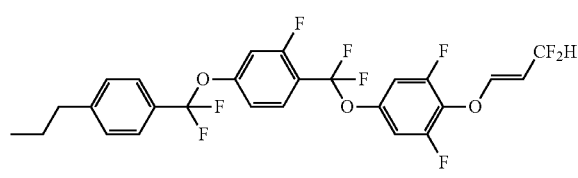
104
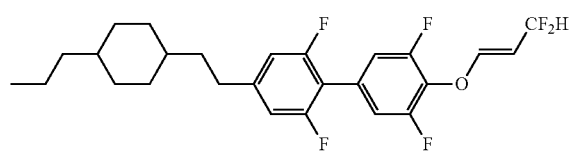
105
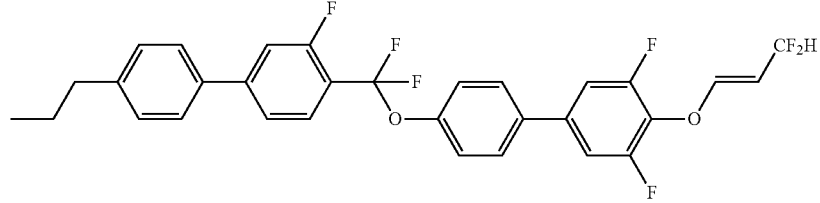
106
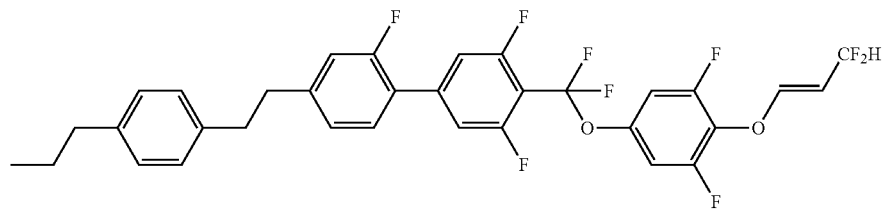
107
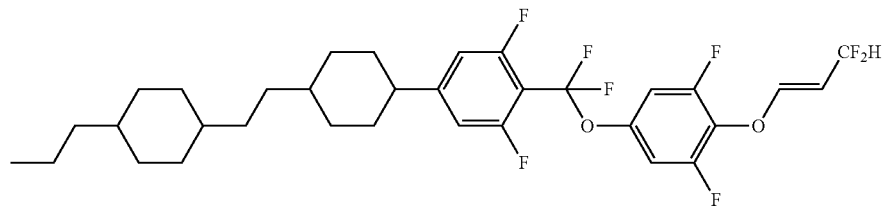
108
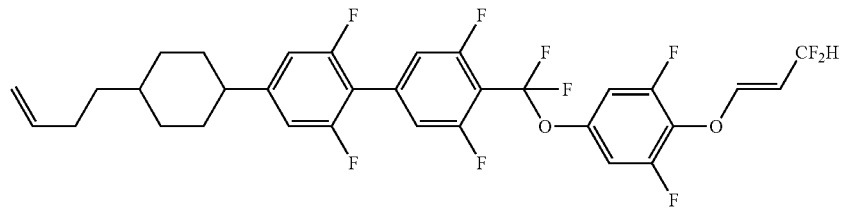
109
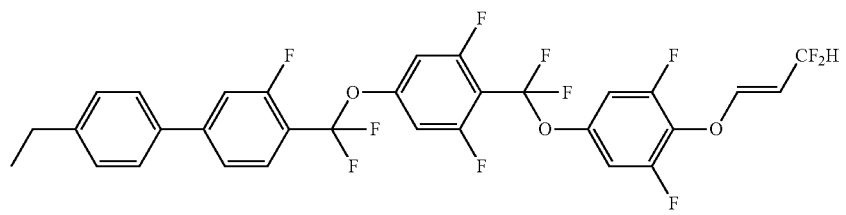
110

-continued
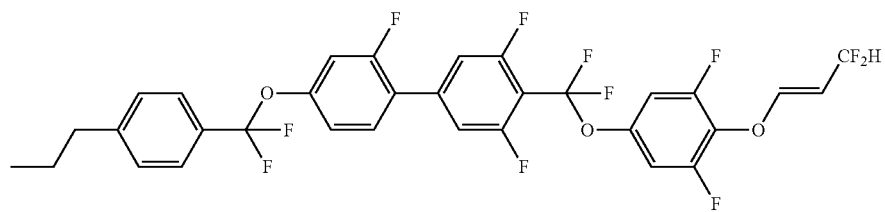
111
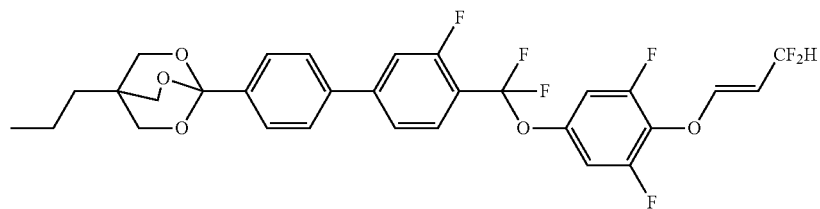
112
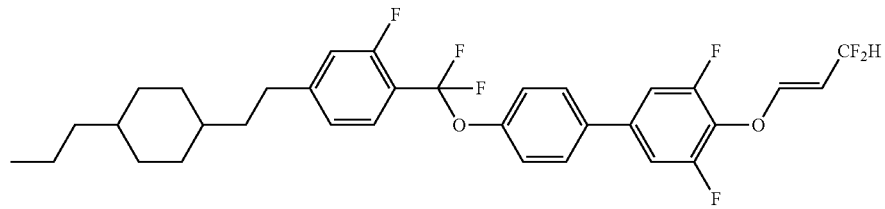
113
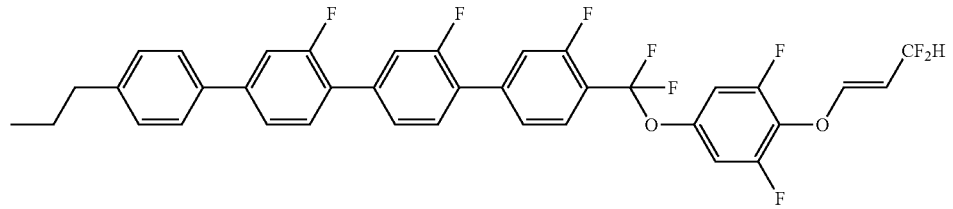
114
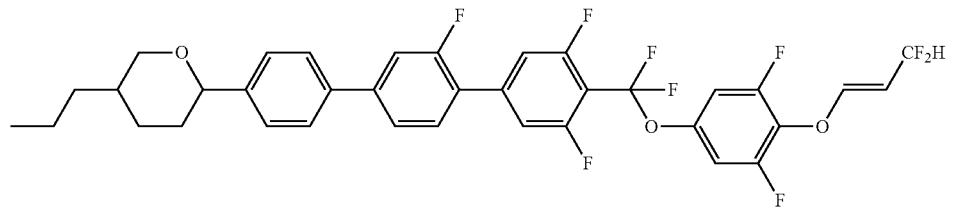
115
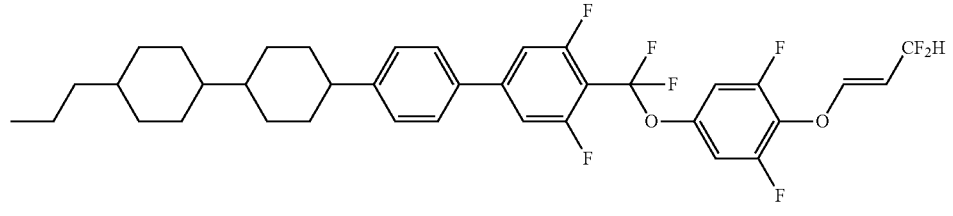
116
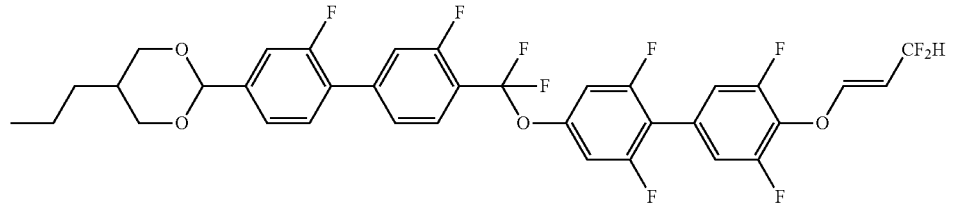
117

-continued
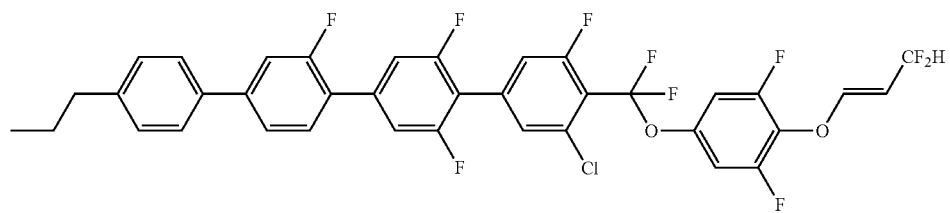
118
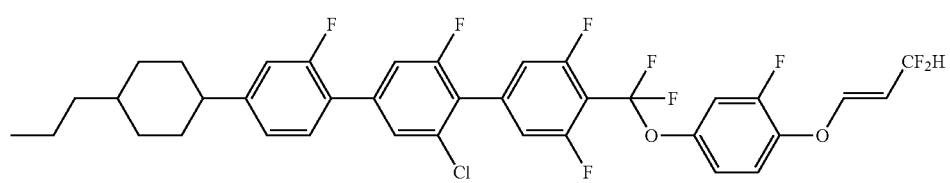
119
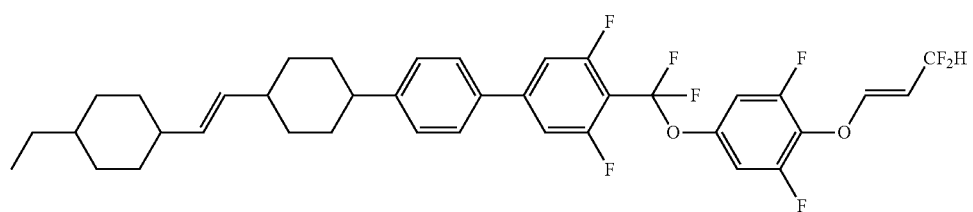
120
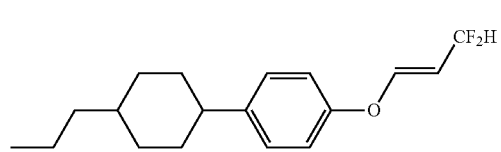
121
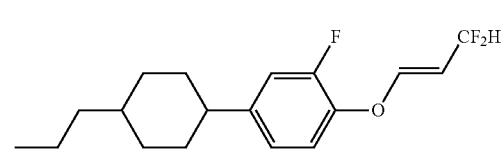
122
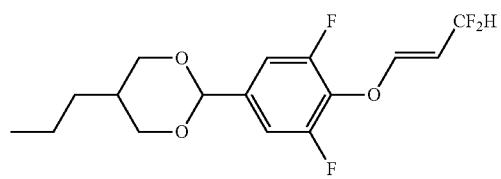
123
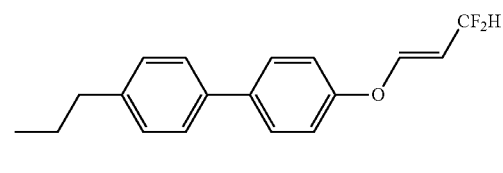
124
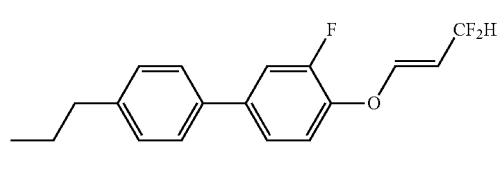
125
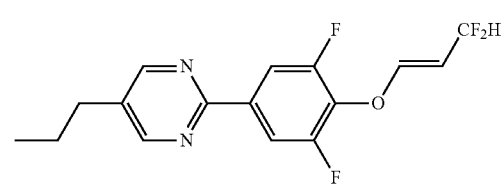
126
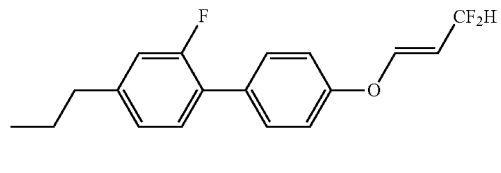
127
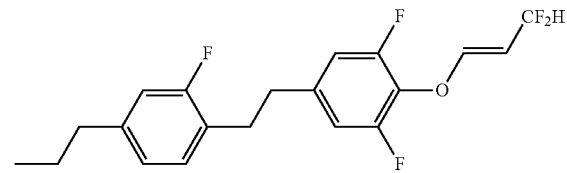
128
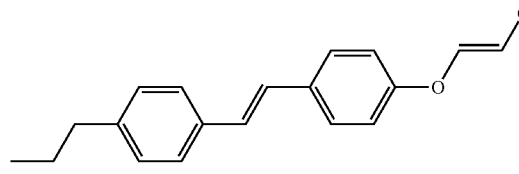
129
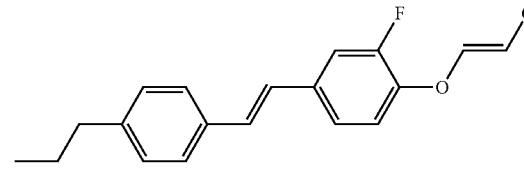
130

131 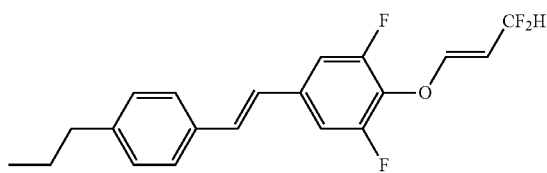
132 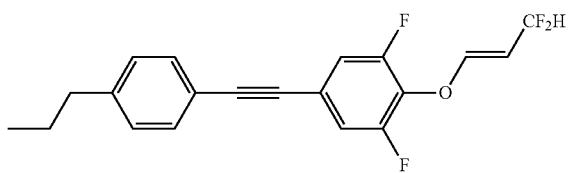
133 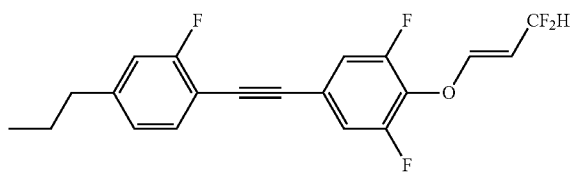
134 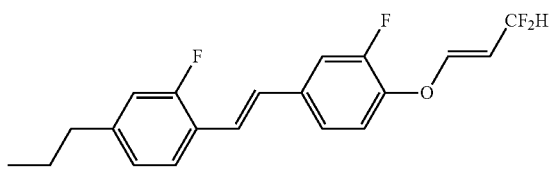
135 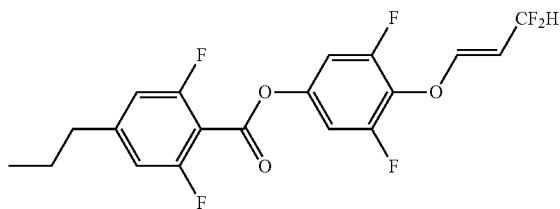
136 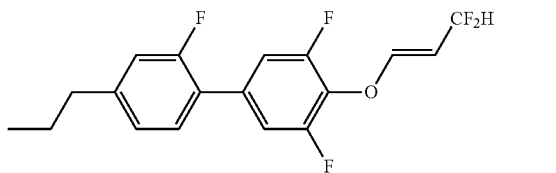
137 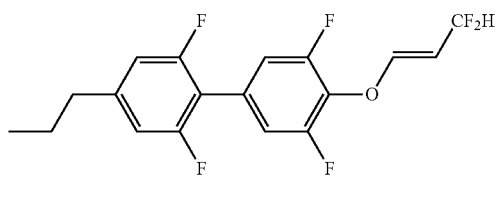
138 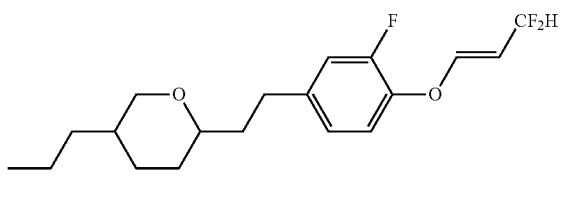
139 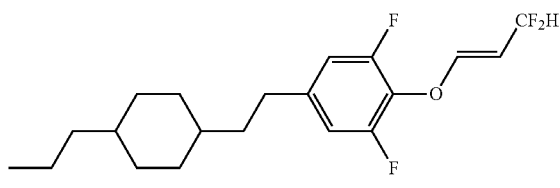
140 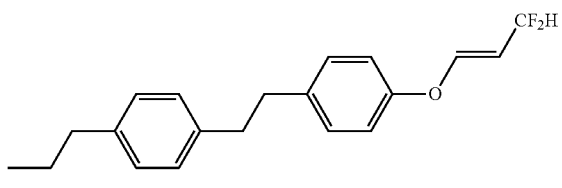
141 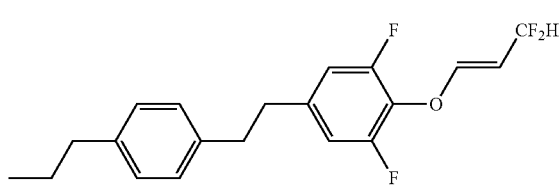
142 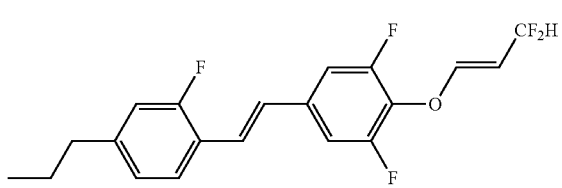
143 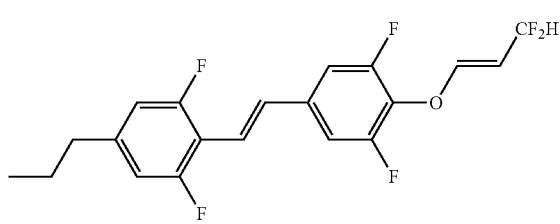
144 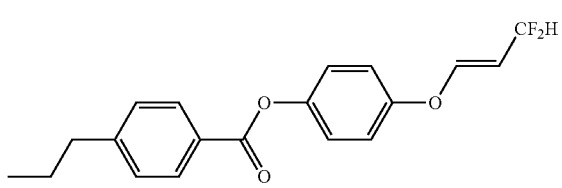

-continued
145
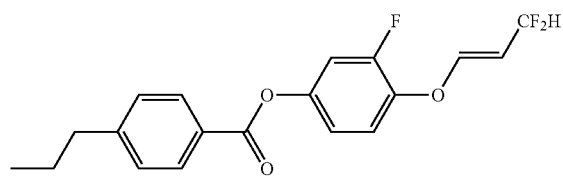
146
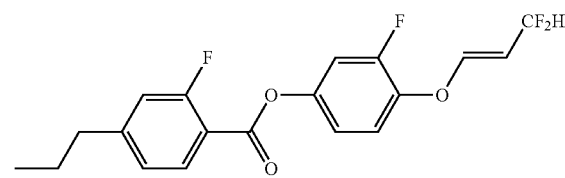
147
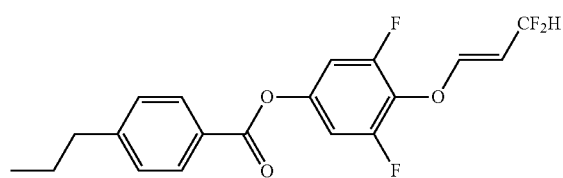
148
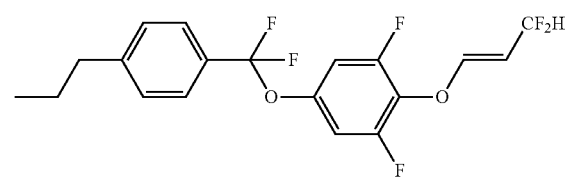
149
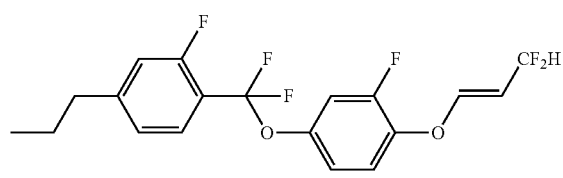
150
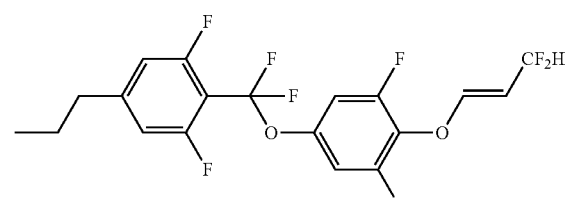
151
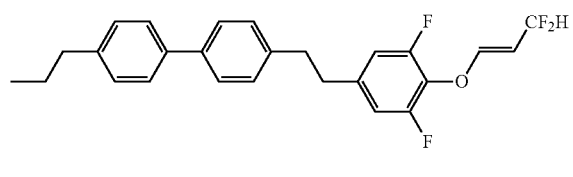
152
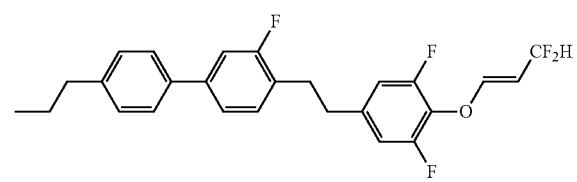
153
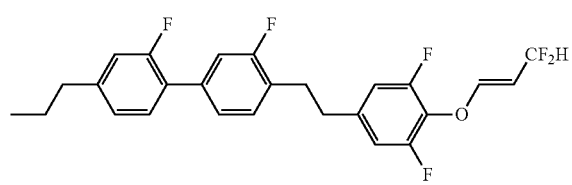
154
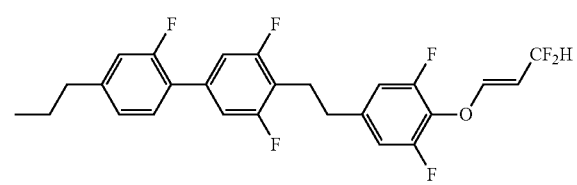
155
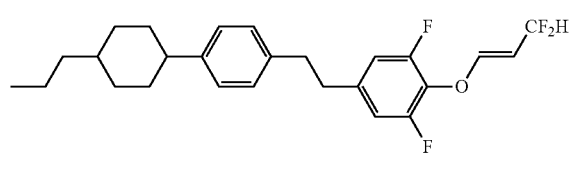
156
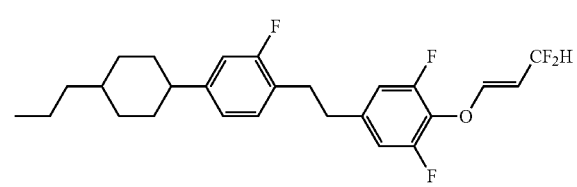
157
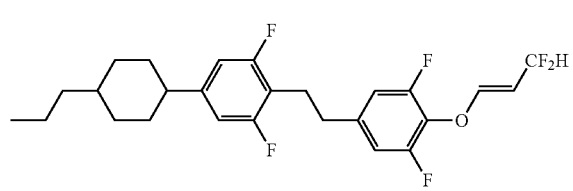
158
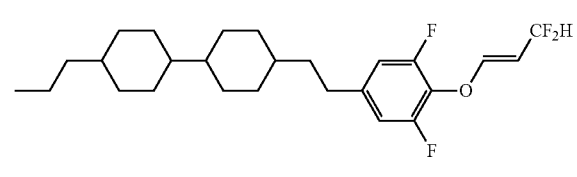
159
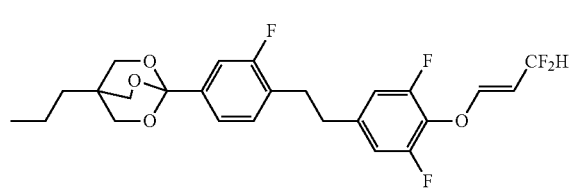
160
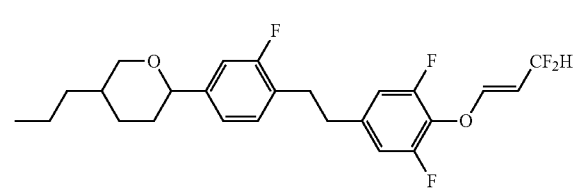

-continued
161
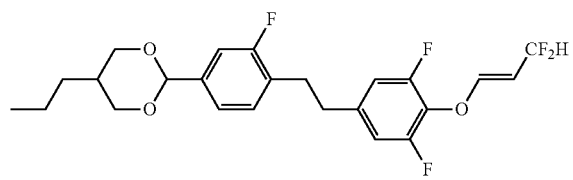
162
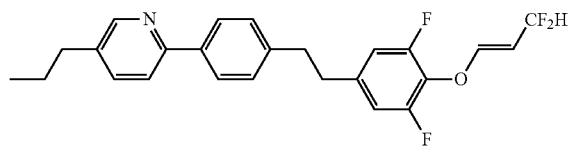
163
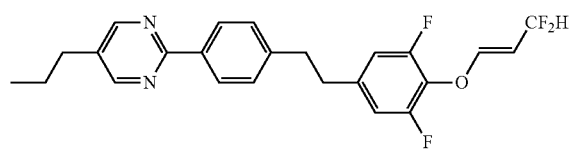
164
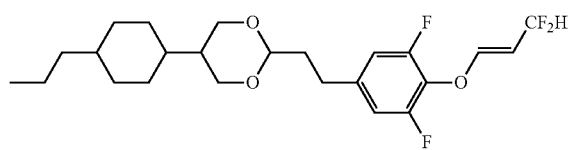
165
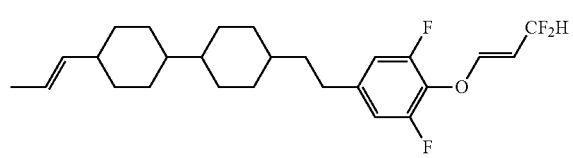
166
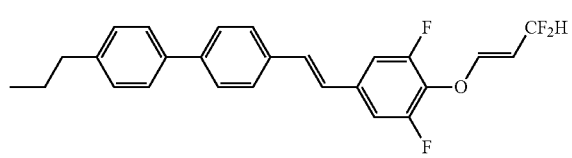
167
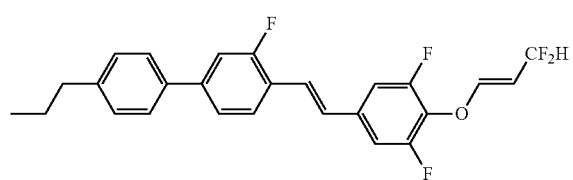
168
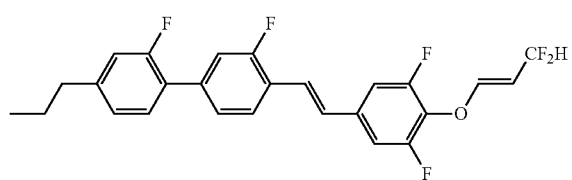
169
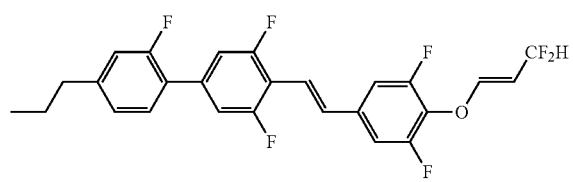
170
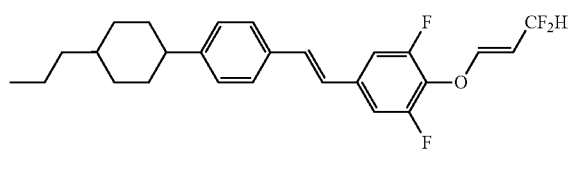
171
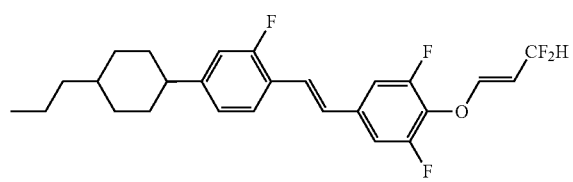
172
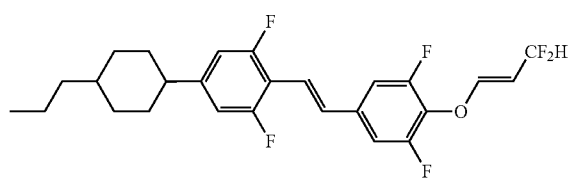
173
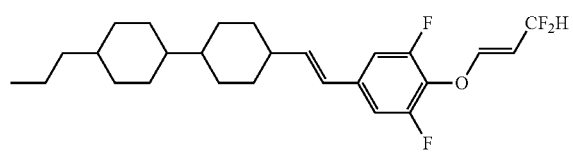
174
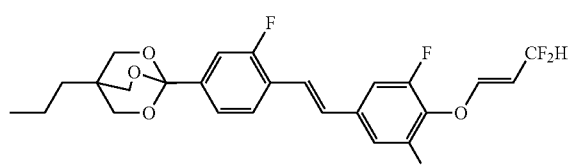
175
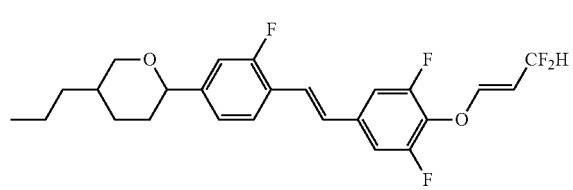
176
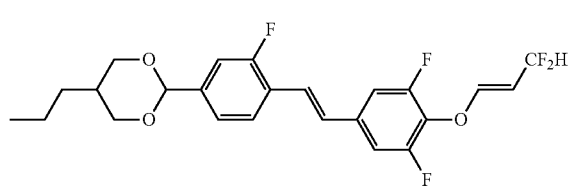

-continued
177
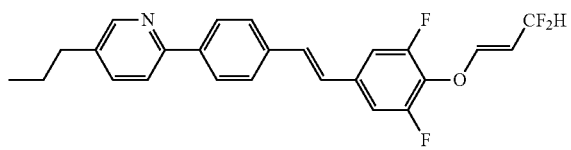
178
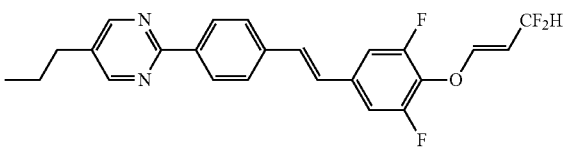
179
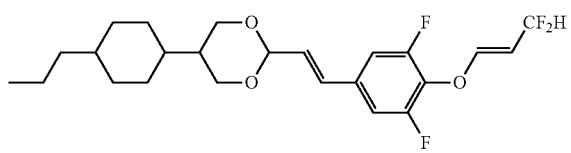
180
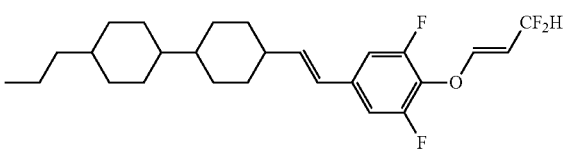
181
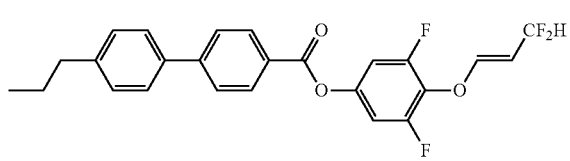
182
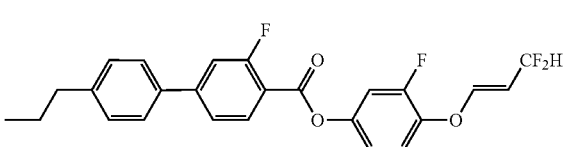
183
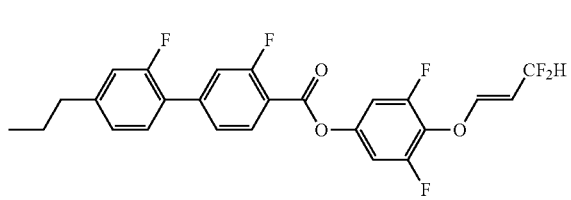
184
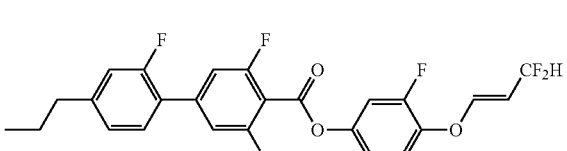
185
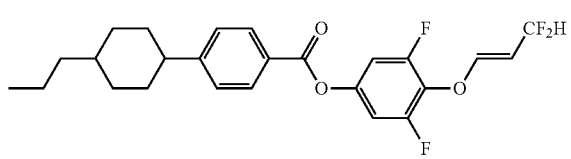
186
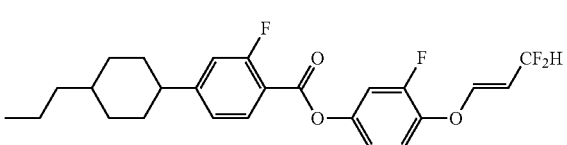
187
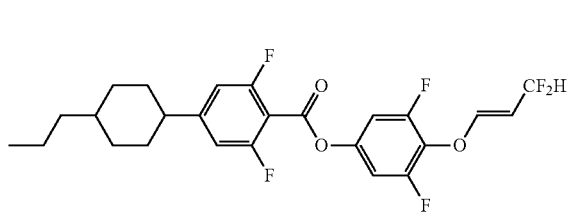
188
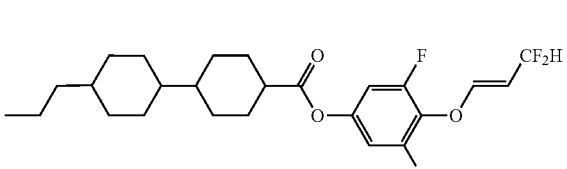
189
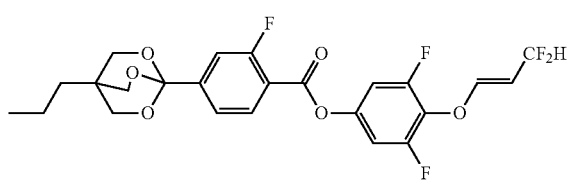
190
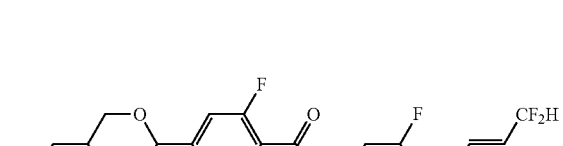
191
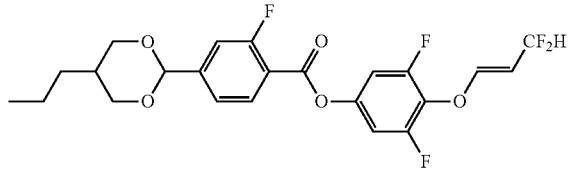
192
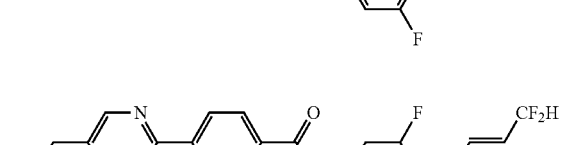

-continued
193
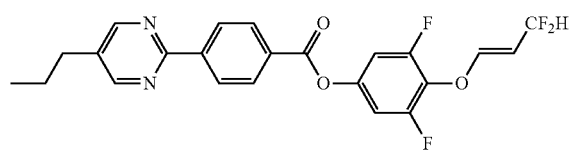
194
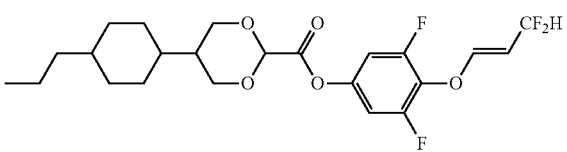
195
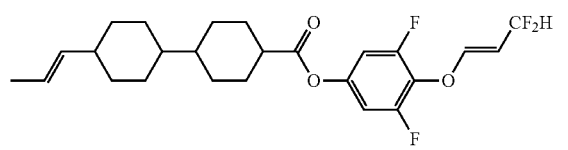
196
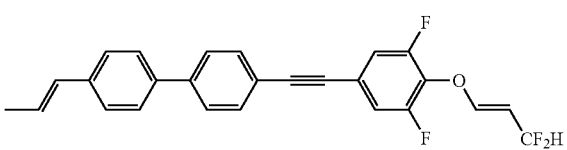
197
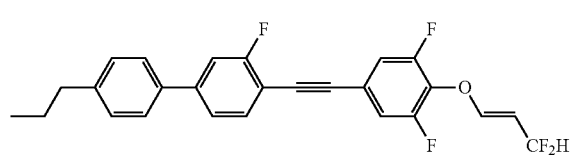
198
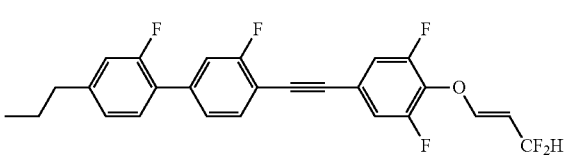
199
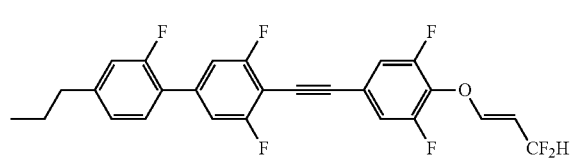
200
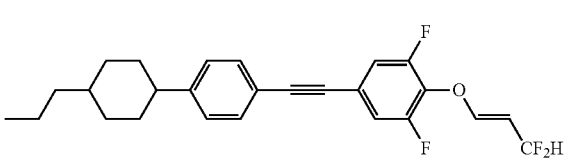
201
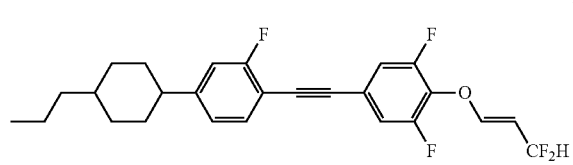
202
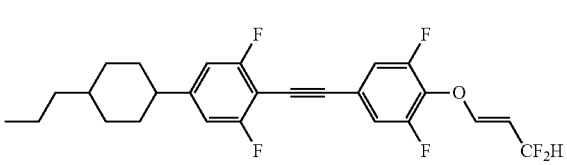
203
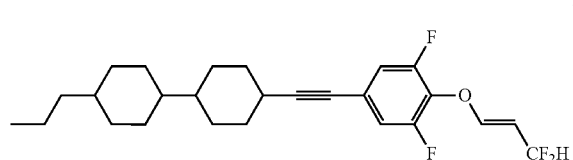
204
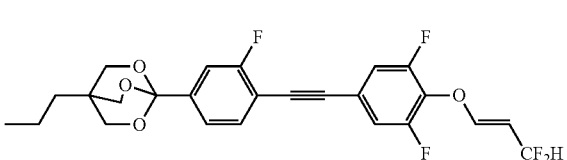
205
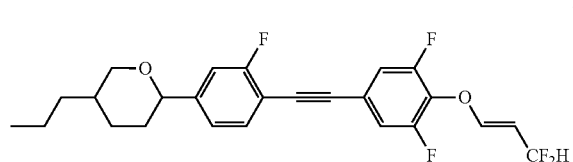
206
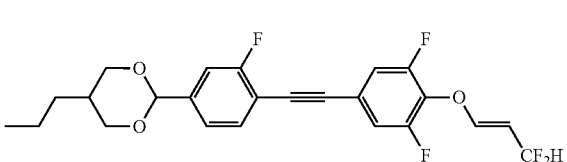
207
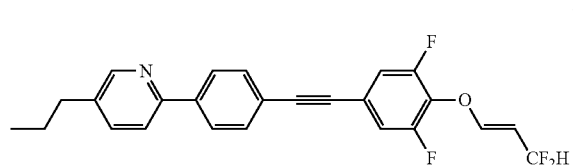
208
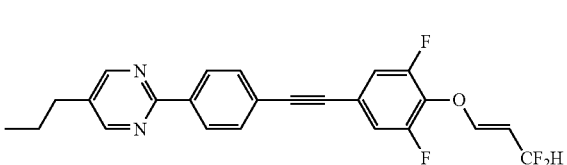
209
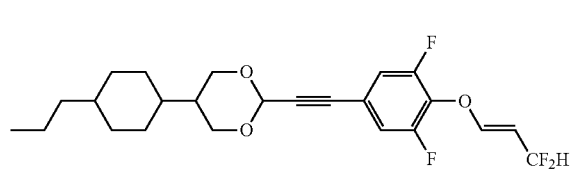
210
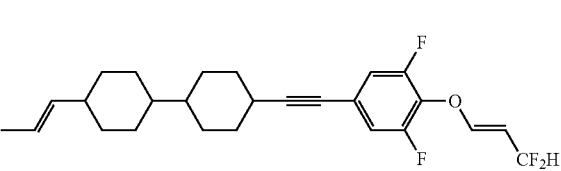

-continued

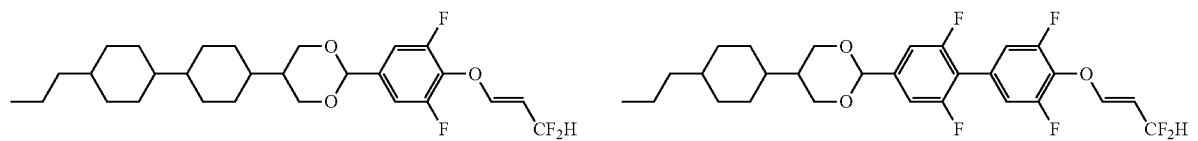
229
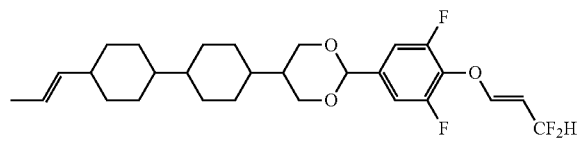
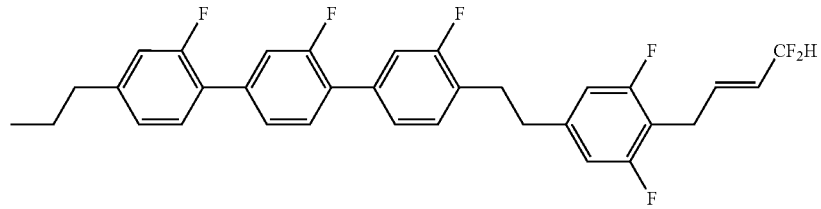
230
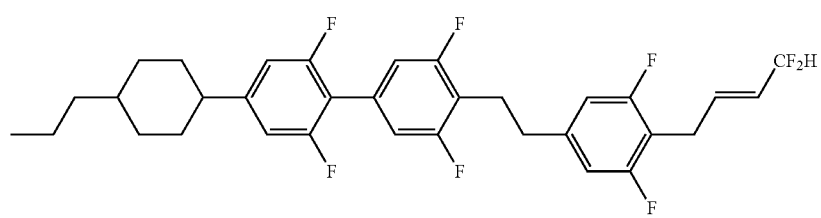
231
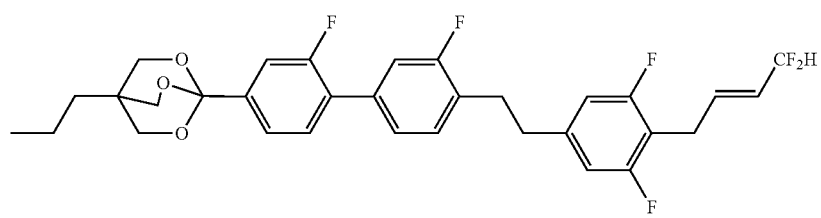
232
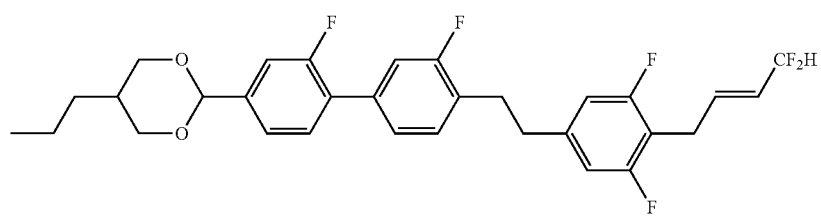
233
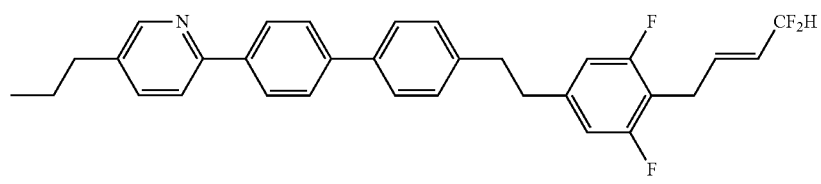
234
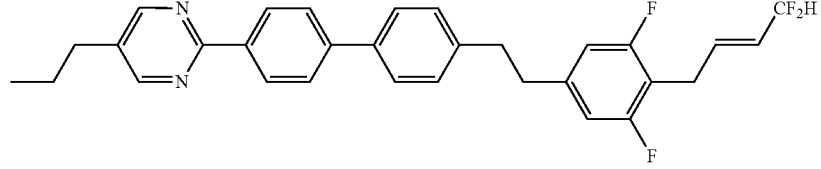
235
236
237

-continued
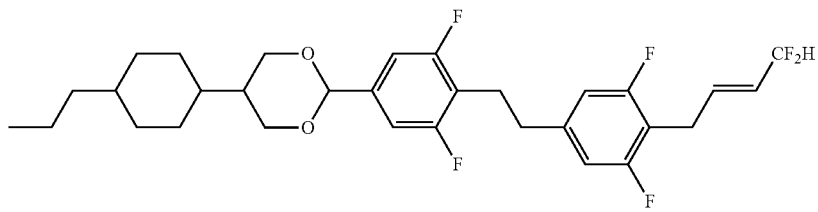
238
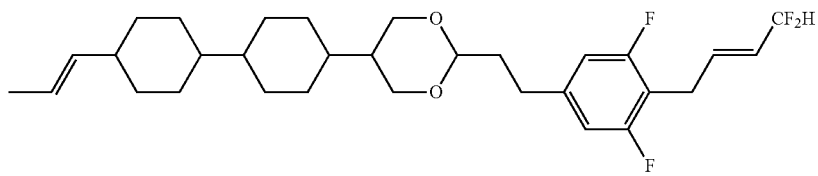
239
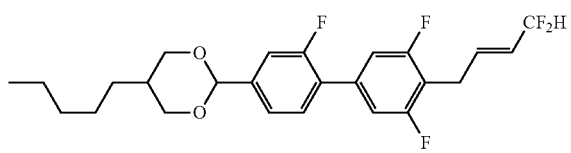
240
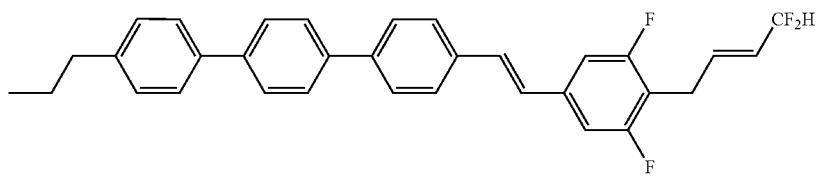
241
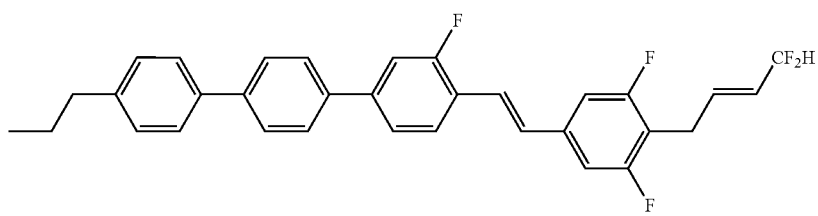
242
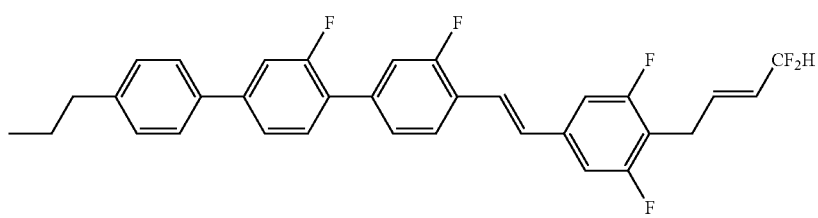
243
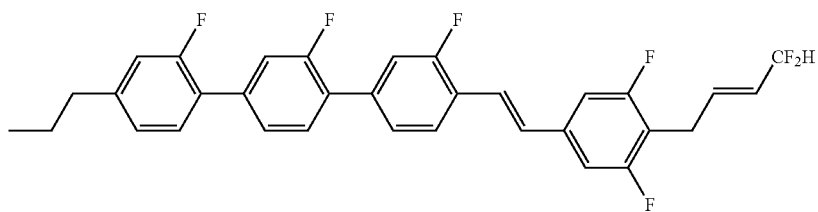
244
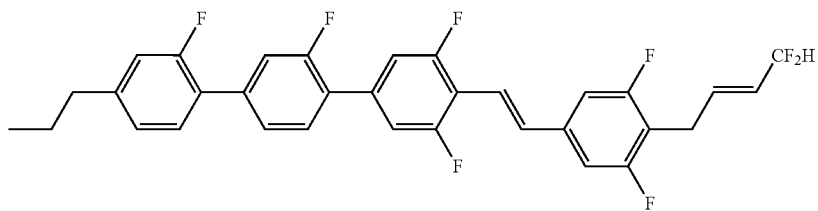
245

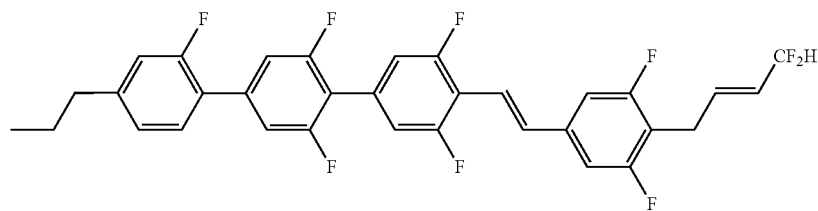
246
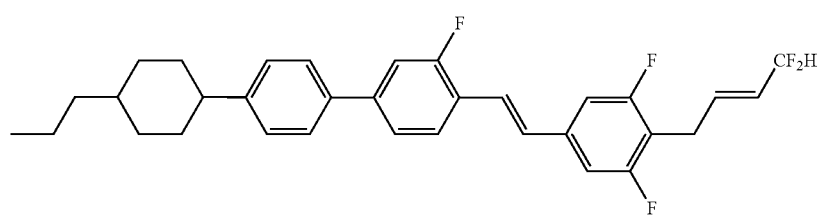
247
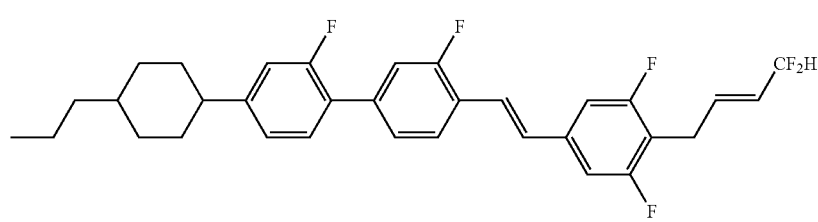
248
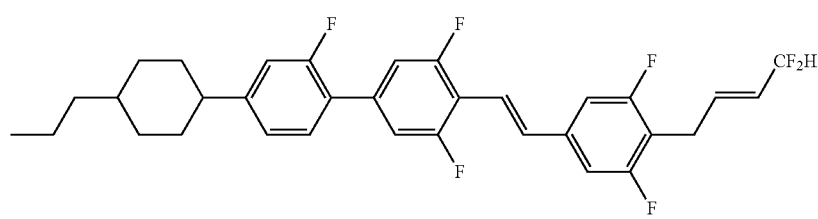
249
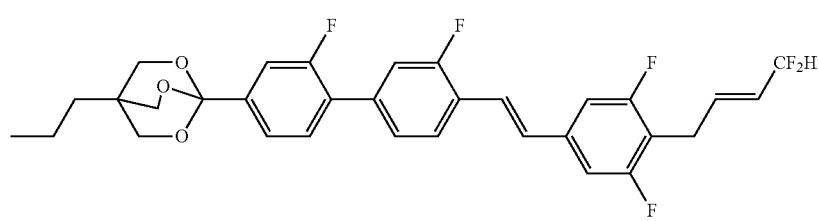
250
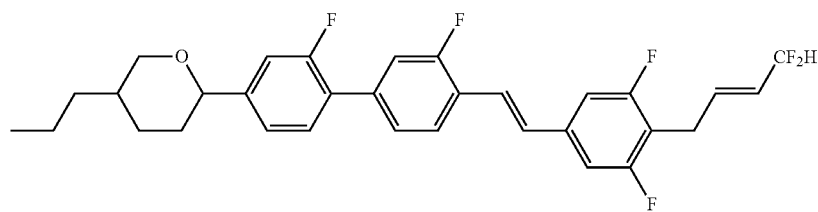
251
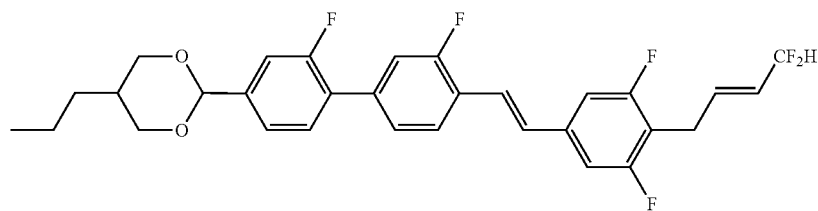
252

-continued
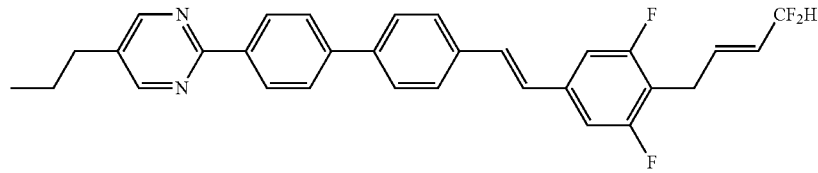
253
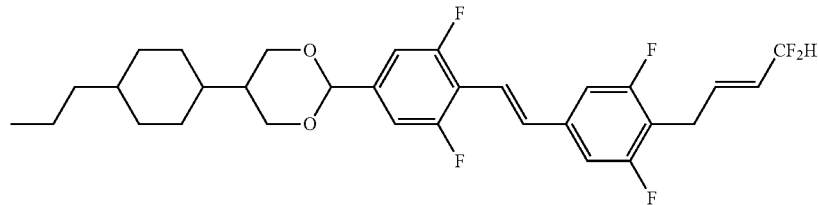
254
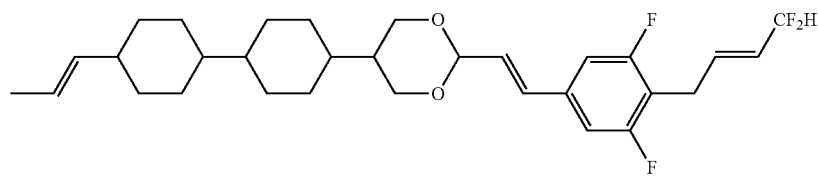
255
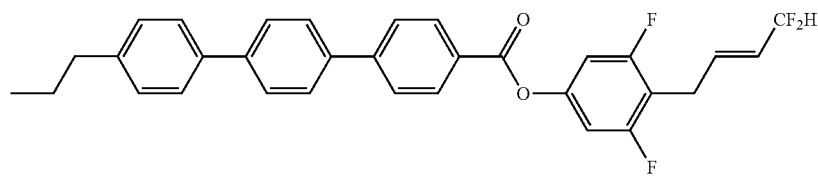
256
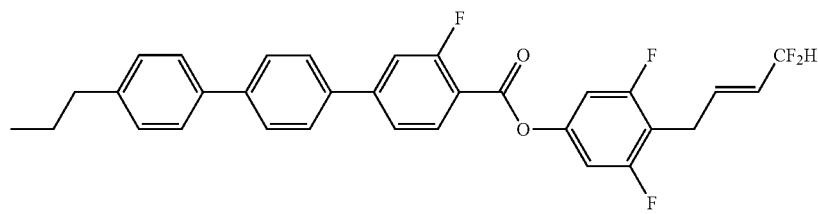
257
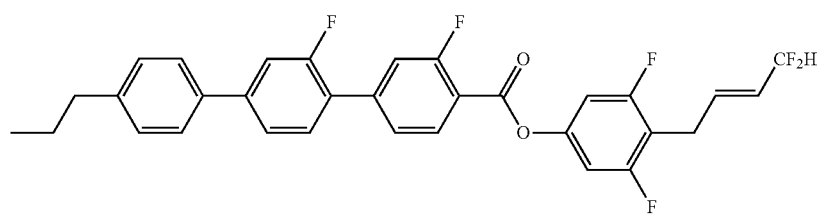
258
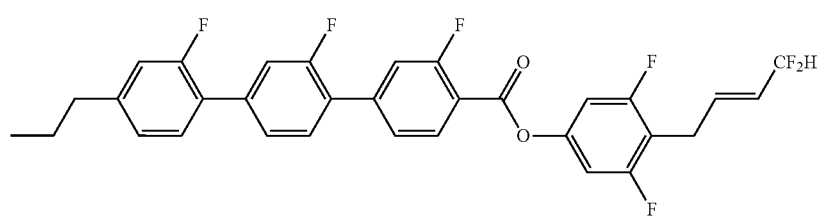
259
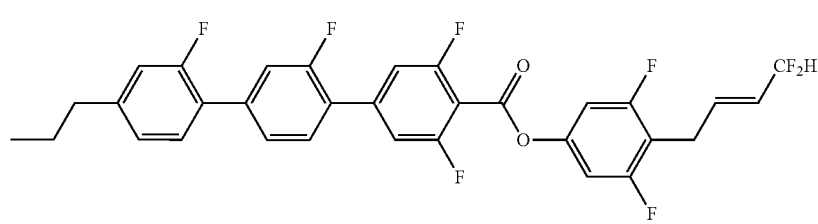
260

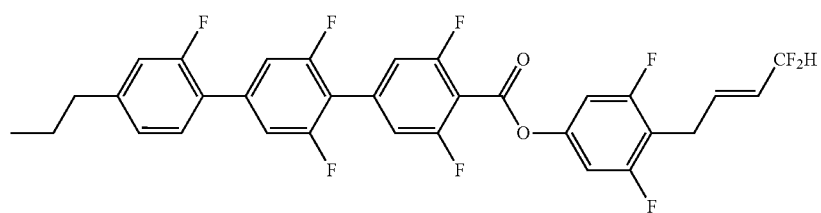
261
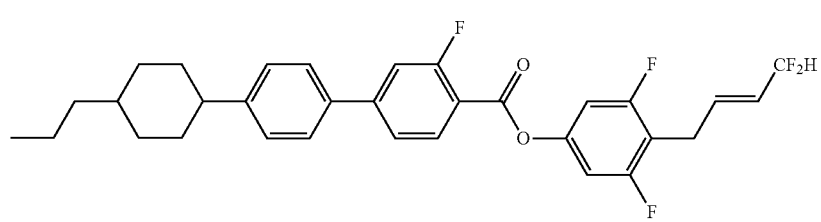
262
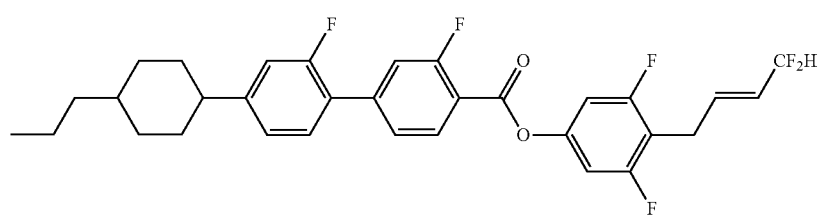
263
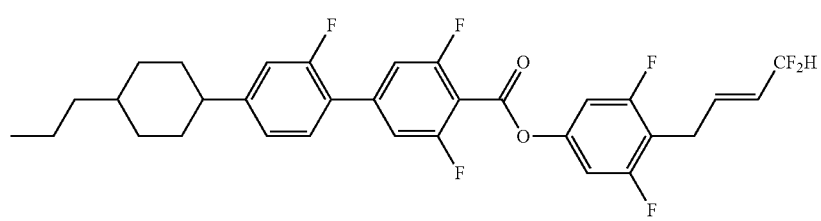
264
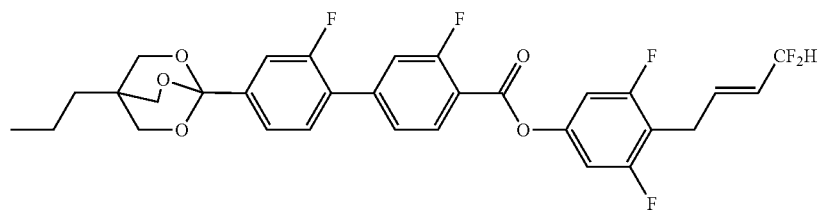
265
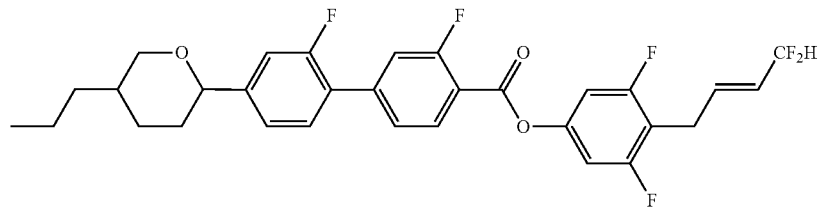
266
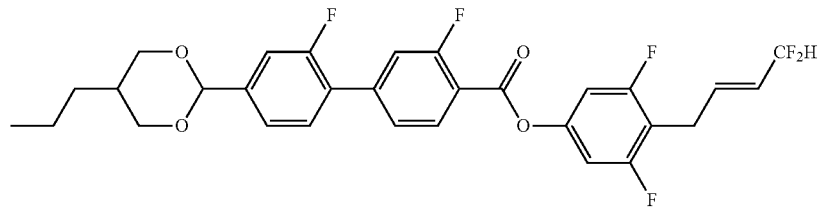
267

-continued

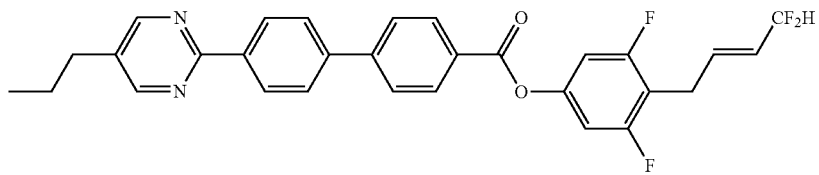

268

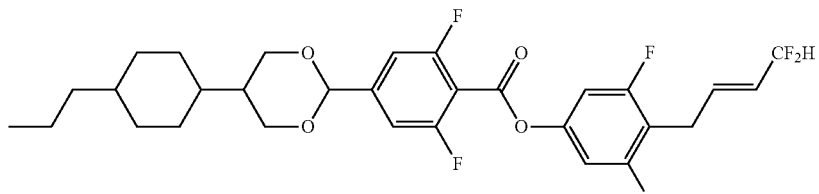

269

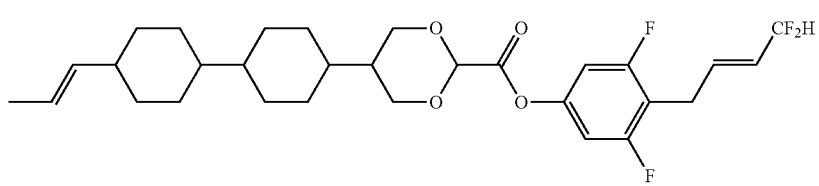

270

Comparative Example 1

Compound (A) described below was prepared as a comparative compound, and physical properties were compared with the physical properties of compound No. 38 as described in Example 1. As for a method for synthesizing compound (A), synthesis was performed according to a method described in JP 2002-53513 A.

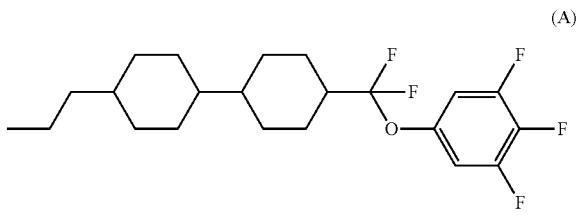 [SMILES: CCCC1CCC(C2CCC(C(F)(F)Oc3cc(F)c(F)c(F)c3)CC2)CC1]

(A)

$^1$H-NMR (CDCl$_3$; δ ppm): 0.81-0.89 (2H, m), 0.86-0.89 (3H, t), 0.94-1.05 (6H, m), 1.13-1.16 (3H, m), 1.27-1.36 (4H, m), 1.70-1.77 (4H, m), 1.83-1.85 (2H, m), 1.93-2.02 (3H, m), 6.80-6.86 (2H, m)

The physical properties of compound (A) were as described below.

Phase transition temperature: C 42.2N 104.2 I.

Maximum temperature (NI)=88.4° C.; dielectric anisotropy (Δ∈)=12.5; optical anisotropy (Δn)=0.077.

As a result, compound No. 38 was found to be superior in having a larger dielectric anisotropy (Δ∈) than dielectric anisotropy of comparative compound (A).

1-2. Example of Composition (1)

Liquid crystal composition (1) of the invention will be described in detail by way of Examples. Compounds in Examples were expressed using symbols according to definitions in the Table below. In the Table, a configuration with regard to 1,4-cyclohexylene is trans. A parenthesized number next to a symbolized compound in Examples corresponds to the number of the compound. A symbol (-) means any other liquid crystal compound. A ratio (percentage) of a liquid crystal compound is expressed in terms of weight percentage (% by weight) based on the weight of the liquid crystal composition. Values of physical properties of the composition were summarized in a last part. The physical properties were measured in accordance with the methods described above, and the measured values were directly described (without extrapolating the measured values).

TABLE

| Method for Description of Compounds using Symbols R—(A$_1$)—Z$_1$— - - - - —Z$_n$—(A$_n$)—R' | |
|---|---|
| 1) Left-terminal Group R— | Symbol |
| $C_nH_{2n+1}$— | n- |
| $C_nH_{2n+1}$O— | nO— |
| $C_mH_{2m+1}OC_nH_{2n}$— | mOn- |
| CH$_2$=CH— | V— |
| $C_nH_{2n+1}$—CH=CH— | nV— |
| CH$_2$=CH—$C_nH_{2n}$— | Vn- |
| $C_mH_{2m+1}$—CH=CH—$C_nH_{2n}$— | mVn- |
| CF$_2$=CH— | VFF— |
| CF$_2$=CH—$C_nH_{2n}$— | VFFn- |
| 2) Right-terminal Group —R' | Symbol |
| —$C_nH_{2n+1}$ | -n |
| —O$C_nH_{2n+1}$ | —On |
| —COOCH$_3$ | —EMe |
| —CH=CH$_2$ | —V |
| —CH=CH—$C_nH_{2n+1}$ | —Vn |
| —$C_nH_{2n}$—CH=CH$_2$ | -nV |
| —$C_mH_{2m}$—CH=CH—$C_nH_{2n+1}$ | -mVn |
| —CH=CF$_2$ | —VFF |
| —F | —F |
| —Cl | —CL |
| —OCF$_3$ | —OCF3 |
| —OCF$_2$H | —OCF2H |
| —CF$_3$ | —CF3 |
| —OCH=CH—CF$_2$H | —OVCF2H |
| —C≡N | —C |

TABLE-continued

| 3) Bonding Group —$Z_n$— | Symbol |
|---|---|
| —$O_nH_{2n}$— | n |
| —COO— | E |
| —CH=CH— | V |
| —CH$_2$O— | 1O |
| —OCH$_2$— | O1 |
| —CF$_2$O— | X |
| —C≡C— | T |

| 4) Ring Structure —$A_n$— | Symbol |
|---|---|
|  | H |
|  | B |
| 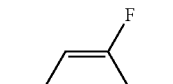 | B(F) |
| 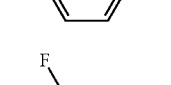 | B(2F) |
| 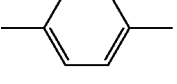 | B(F,F) |
| 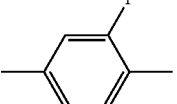 | B(2F,5F) |
| 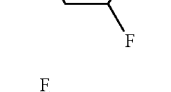 | B(2F,3F) |
| 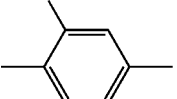 | Py |
|  | G |
|  | dh |

5) Examples of Description

Example 1 3-HHXB(F,F)-OVCF2H

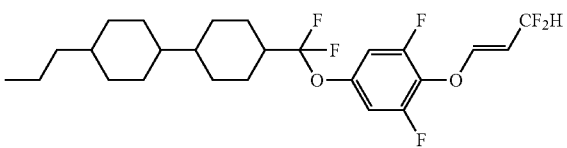 [SMILES: CCCC1CCC(C2CCC(C(F)(F)Oc3cc(F)c(O/C=C/C(F)F)c(F)c3)CC2)CC1]

Example 2 3-BB(F,F)XB(F,F)-OVCF2H

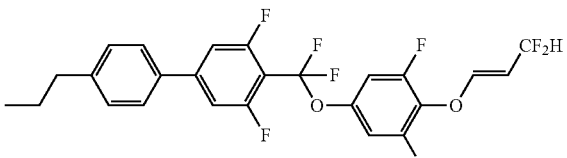

Example 3 3-HH-4

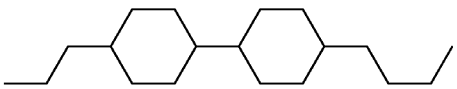 [SMILES: CCCCC1CCC(C2CCC(CCC)CC2)CC1]

Example 4 3-HBB(F,F)-F

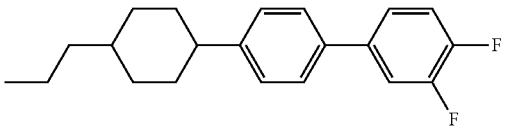

Example 2

| | | |
|---|---|---|
| 3-HHXB(F,F)-OVCF2H | (No. 38) | 6% |
| 3-HB-O2 | (13-5) | 10% |
| 5-HB-CL | (2-2) | 13% |
| 3-HBB(F,F)-F | (3-24) | 7% |
| 3-PyB(F)-F | (2-15) | 10% |
| 5-PyB(F)-F | (2-15) | 10% |
| 3-PyBB-F | (3-80) | 10% |
| 4-PyBB-F | (3-80) | 10% |
| 5-PyBB-F | (3-80) | 10% |
| 5-HBB(F)B-2 | (15-5) | 7% |
| 5-HBB(F)B-3 | (15-5) | 7% |

NI = 90.3° C.;
Δn = 0.181;
Δε = 8.9;
η = 42.4 mPa·s.

Example 3

| | | |
|---|---|---|
| 5-HBBXB(F,F)-OVCF2H | (No. 79) | 7% |
| 2-HB-C | (5-1) | 5% |
| 3-HB-C | (5-1) | 9% |
| 3-HB-O2 | (13-5) | 15% |
| 2-BTB-1 | (13-10) | 3% |
| 3-HHB-F | (3-1) | 4% |
| 3-HHB-1 | (14-1) | 8% |

-continued

| | | |
|---|---|---|
| 3-HHB-O1 | (14-1) | 5% |
| 3-HHB-3 | (14-1) | 14% |
| 3-HHEB-F | (3-10) | 4% |
| 2-HHB(F)-F | (3-2) | 7% |
| 3-HHB(F)-F | (3-2) | 7% |
| 5-HHB(F)-F | (3-2) | 7% |
| 3-HHB(F,F)-F | (3-3) | 5% |

Example 4

| | | |
|---|---|---|
| 3-HBB(F,F)XB(F,F)-OVCF2H | (No. 78) | 5% |
| 5-HB-CL | (2-2) | 11% |
| 3-HH-4 | (13-1) | 12% |
| 3-HH-5 | (13-1) | 4% |
| 3-HHB-F | (3-1) | 4% |
| 3-HHB-CL | (3-1) | 3% |
| 4-HHB-CL | (3-1) | 4% |
| 3-HHB(F)-F | (3-2) | 10% |
| 4-HHB(F)-F | (3-2) | 9% |
| 5-HHB(F)-F | (3-2) | 9% |
| 7-HHB(F)-F | (3-2) | 8% |
| 5-HBB(F)-F | (3-23) | 4% |
| 1O1-HBBH-5 | (15-1) | 3% |
| 3-HHBB(F,F)-F | (4-6) | 2% |
| 4-HHBB(F,F)-F | (4-6) | 3% |
| 5-HHBB(F,F)-F | (4-6) | 3% |
| 3-HH2BB(F,F)-F | (4-15) | 3% |
| 4-HH2BB(F,F)-F | (4-15) | 3% |

Example 5

| | | |
|---|---|---|
| 5-dhBB(F,F)XB(F,F)-OVCF2H | (No. 80) | 7% |
| 3-HHB(F,F)-F | (3-3) | 9% |
| 3-H2HB(F,F)-F | (3-15) | 8% |
| 4-H2HB(F,F)-F | (3-15) | 8% |
| 5-H2HB(F,F)-F | (3-15) | 8% |
| 3-HBB(F,F)-F | (3-24) | 21% |
| 5-HBB(F,F)-F | (3-24) | 17% |
| 3-H2BB(F,F)-F | (3-27) | 10% |
| 5-HHBB(F,F)-F | (4-6) | 3% |
| 5-HHEBB-F | (4-17) | 2% |
| 3-HH2BB(F,F)-F | (4-15) | 3% |
| 1O1-HBBH-5 | (15-1) | 4% |

Example 6

| | | |
|---|---|---|
| 5-GB(F)B(F,F)XB(F,F)-OVCF2H | (No. 81) | 6% |
| 5-HB-F | (2-2) | 10% |
| 6-HB-F | (2-2) | 7% |
| 7-HB-F | (2-2) | 5% |
| 2-HHB-OCF3 | (3-1) | 7% |
| 3-HHB-OCF3 | (3-1) | 7% |
| 4-HHB-OCF3 | (3-1) | 7% |
| 5-HHB-OCF3 | (3-1) | 5% |
| 3-HH2B-OCF3 | (3-4) | 4% |
| 5-HH2B-OCF3 | (3-4) | 4% |
| 3-HHB(F,F)-OCF2H | (3-3) | 4% |
| 3-HHB(F,F)-OCF3 | (3-3) | 5% |
| 3-HH2B(F)-F | (3-5) | 3% |
| 3-HBB(F)-F | (3-23) | 10% |
| 5-HBB(F)-F | (3-23) | 10% |
| 5-HBBH-3 | (15-1) | 3% |
| 3-HB(F)BH-3 | (15-2) | 3% |

Example 7

| | | |
|---|---|---|
| 5-BB(F)B(F,F)XB(F,F)-OVCF2H | (No. 77) | 4% |
| 5-HB-CL | (2-2) | 11% |
| 3-HH-4 | (13-1) | 8% |
| 3-HHB-1 | (14-1) | 5% |
| 3-HHB(F,F)-F | (3-3) | 8% |
| 3-HBB(F,F)-F | (3-24) | 20% |
| 5-HBB(F,F)-F | (3-24) | 15% |
| 3-HHEB(F,F)-F | (3-12) | 6% |
| 4-HHEB(F,F)-F | (3-12) | 3% |
| 5-HHEB(F,F)-F | (3-12) | 3% |
| 2-HBEB(F,F)-F | (3-39) | 3% |
| 3-HBEB(F,F)-F | (3-39) | 5% |
| 5-HBEB(F,F)-F | (3-39) | 3% |
| 3-HHBB(F,F)-F | (4-6) | 6% |

Example 8

| | | |
|---|---|---|
| 5-GB(F)B(F,F)-OVCF2H | (No. 240) | 9% |
| 3-HB-CL | (2-2) | 6% |
| 5-HB-CL | (2-2) | 4% |
| 3-HHB-OCF3 | (3-1) | 5% |
| 3-H2HB-OCF3 | (3-13) | 5% |
| 5-H4HB-OCF3 | (3-19) | 11% |
| V-HHB(F)-F | (3-2) | 5% |
| 3-HHB(F)-F | (3-2) | 5% |
| 5-HHB(F)-F | (3-2) | 5% |
| 3-H4HB(F,F)-CF3 | (3-21) | 8% |
| 5-H4HB(F,F)-CF3 | (3-21) | 10% |
| 5-H2HB(F,F)-F | (3-15) | 5% |
| 5-H4HB(F,F)-F | (3-21) | 4% |
| 2-H2BB(F)-F | (3-26) | 5% |
| 3-H2BB(F)-F | (3-26) | 8% |
| 3-HBEB(F,F)-F | (3-39) | 5% |

Example 9

| | | |
|---|---|---|
| 5-BB(F)B(F,F)-OVCF2H | (No. 62) | 10% |
| 5-HB-CL | (2-2) | 3% |
| 7-HB(F)-F | (2-3) | 7% |
| 3-HH-4 | (13-1) | 9% |
| 3-HH-EMe | (13-2) | 18% |
| 3-HHEB-F | (3-10) | 8% |
| 5-HHEB-F | (3-10) | 8% |
| 3-HHEB(F,F)-F | (3-12) | 9% |
| 4-HHEB(F,F)-F | (3-12) | 5% |
| 4-HGB(F,F)-F | (3-103) | 4% |
| 5-HGB(F,F)-F | (3-103) | 5% |
| 2-H2GB(F,F)-F | (3-106) | 4% |
| 3-H2GB(F,F)-F | (3-106) | 4% |
| 5-GHB(F,F)-F | (3-109) | 6% |

Example 10

| | | |
|---|---|---|
| 3-BB(F,F)XB(F,F)-OVCF2H | (No. 32) | 7% |
| 3-GB(F,F)XB(F,F)-OVCF2H | (No. 44) | 5% |
| 1V2-BEB(F,F)-C | (5-15) | 6% |
| 3-HB-C | (5-1) | 15% |
| 2-BTB-1 | (13-10) | 10% |
| 5-HH-VFF | (13-1) | 26% |
| 3-HHB-1 | (14-1) | 4% |
| VFF-HHB-1 | (14-1) | 6% |
| VFF2-HHB-1 | (14-1) | 9% |

-continued

| | | |
|---|---|---|
| 3-H2BTB-2 | (14-17) | 4% |
| 3-H2BTB-3 | (14-17) | 4% |
| 3-H2BTB-4 | (14-17) | 4% |

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A liquid crystal compound of the invention satisfies at least one of physical properties such as a high stability to heat or light, a high clearing point, a low minimum temperature of a liquid crystal phase, a small viscosity, a suitable optical anisotropy, a large dielectric anisotropy, a suitable elastic constant and an excellent compatibility with other liquid crystal compounds. A liquid crystal composition of the invention contains the compound and satisfies at least one of physical properties such as a high maximum temperature, a low minimum temperature, a small viscosity, a suitable optical anisotropy, a large dielectric anisotropy and a suitable elastic constant. The composition has a suitable balance regarding at least two of physical properties. A liquid crystal display device of the invention includes the composition and has a wide temperature range in which the device can be used, a short response time, a large voltage holding ratio, a low threshold voltage, a large contrast ratio and a long service life. Therefore, the device can be widely applied to a liquid crystal display device used for a personal computer, a television and so forth.

What is claimed is:
1. A compound represented by formula (1):

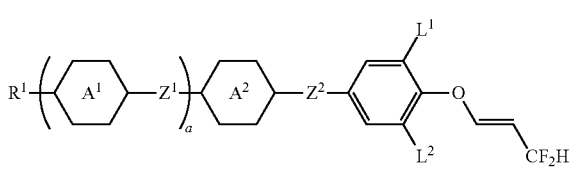

(1)

wherein, in formula (1),
R$^1$ is alkyl having 1 to 10 carbons, and in the alkyl, at least one of —CH$_2$— may be replaced by —O—, at least one of —CH$_2$CH$_2$— may be replaced by —CH=CH—, and in the groups, at least one of hydrogen may be replaced by halogen;
ring A$^1$ and ring A$^2$ are independently 1,4-cyclohexylene, 1,4-cyclohexenylene, 1,4-phenylene, 1,4-phenylene in which at least one of hydrogen is replaced by halogen, tetrahydropyran-2,5-diyl, pyrimidine-2,5-diyl, pyridine-2,5-diyl, 1,3-dioxane-2,5-diyl or 2,6,7-trioxabicyclo[2.2.2]octane-1,4-diyl;
Z$^1$ and Z$^2$ are independently a single bond or alkylene having 1 to 4 carbons, and in the alkylene, at least one of —CH$_2$— may be replaced by —O— or —COO—, at least one of —CH$_2$CH$_2$— may be replaced by —CH=CH— or —C≡C—, and in the groups, at least one of hydrogen may be replaced by halogen;
L$^1$ and L$^2$ are independently hydrogen or halogen; and
a is 0, 1, 2 or 3.

2. The compound according to claim 1, wherein, in formula (1),
R$^1$ is alkyl having 1 to 10 carbons, and in the alkyl, at least one of —CH$_2$— may be replaced by —O—, at least one of —CH$_2$CH$_2$— may be replaced by —CH=CH—, and in the groups, at least one of hydrogen may be replaced by halogen;
ring A$^1$ and ring A$^2$ are independently 1,4-cyclohexylene, 1,4-cyclohexenylene, 1,4-phenylene, 1,4-phenylene in which at least one of hydrogen is replaced by halogen, tetrahydropyran-2,5-diyl, pyrimidine-2,5-diyl, pyridine-2,5-diyl, 1,3-dioxane-2,5-diyl or 2,6,7-trioxabicyclo[2.2.2]octane-1,4-diyl;
Z$^1$ and Z$^2$ are independently a single bond, —CH$_2$CH$_2$—, —C≡C—, —CH=CH—, —CF$_2$O—, —CH$_2$O— or —COO—;
L$^1$ and L$^2$ are independently hydrogen or halogen; and
a is 0, 1, 2 or 3.

3. The compound according to claim 1, wherein, in formula (1),
R$^1$ is alkyl having 1 to 10 carbons or alkenyl having 2 to 10 carbons, and in the groups, at least one of hydrogen may be replaced by fluorine;
ring A$^1$ and ring A$^2$ are independently 1,4-cyclohexylene, 1,4-phenylene, 2-fluoro-1,4-phenylene, 2,6-difluoro-1,4-phenylene, 2-chloro-1,4-phenylene, 2-chloro-6-fluoro-1,4-phenylene, 2,6-dichloro-1,4-phenylene, tetrahydropyran-2,5-diyl, 1,3-dioxane-2,5-diyl or 2,6,7-trioxabicyclo[2.2.2]octane-1,4-diyl;
Z$^1$ and Z$^2$ are independently a single bond, —CH$_2$CH$_2$—, —CH=CH—, —CF$_2$O— or —COO—;
L$^1$ and L$^2$ are independently hydrogen, chlorine or fluorine; and
a is 0, 1, 2 or 3.

4. The compound according to claim 1, wherein, in formula (1), R$^1$ is alkyl having 1 to 10 carbons or alkenyl having 2 to 10 carbons; ring A$^1$ and ring A$^2$ are independently 1,4-cyclohexylene, 1,4-phenylene, 2-fluoro-1,4-phenylene, 2,6-difluoro-1,4-phenylene, 2-chloro-1,4-phenylene, 2-chloro-6-fluoro-1,4-phenylene, tetrahydropyran-2,5-diyl or 1,3-dioxane-2,5-diyl; Z$^1$ and Z$^2$ are a single bond, —CH$_2$CH$_2$—, —CH=CH— or —CF$_2$O—; L$^1$ and L$^2$ are independently hydrogen, chlorine or fluorine; and a is 0, 1 or 2.

5. The compound according to claim 1, wherein, in formula (1), R$^1$ is alkyl having 1 to 10 carbons or alkenyl having 2 to 10 carbons; ring A$^1$ and ring A$^2$ are independently 1,4-cyclohexylene, 1,4-phenylene, 2-fluoro-1,4-phenylene, 2,6-difluoro-1,4-phenylene, tetrahydropyran-2,5-diyl or 1,3-dioxane-2,5-diyl; Z$^1$ and Z$^2$ are independently a single bond or —CF$_2$O—; L$^1$ and L$^2$ are independently hydrogen or fluorine; and a is 1, 2 or 3.

6. The compound according to claim 1, wherein, in formula (1), R$^1$ is alkyl having 1 to 10 carbons or alkenyl having 2 to 10 carbons; ring A$^1$ and ring A$^2$ are independently 1,4-cyclohexylene, 1,4-phenylene, 2-fluoro-1,4-phenylene, 2,6-difluoro-1,4-phenylene, tetrahydropyran-2,5-diyl or 1,3-dioxane-2,5-diyl; Z$^1$ and Z$^2$ are a single bond; L$^1$ and L$^2$ are fluorine; and a is 0, 1 or 2.

7. The compound according to claim 1, represented by formula (1-2), (1-3) or (1-4):

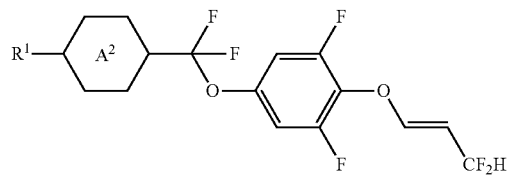
(1-2)

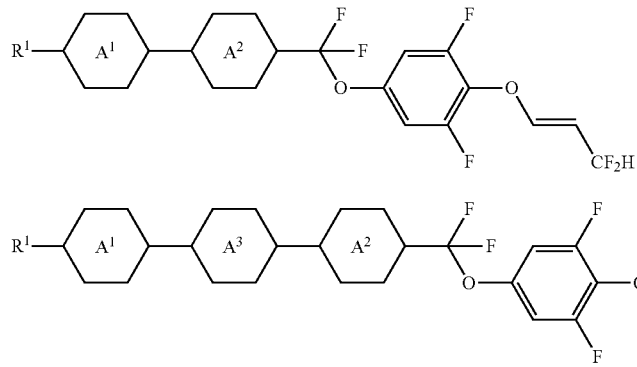
(1-3)

(1-4)

wherein, in formulas (1-2), (1-3) and (1-4), $R^1$ is alkyl having 1 to 10 carbons or alkenyl having 2 to 10 carbons;

ring $A^1$ is 1,4-cyclohexylene, 1,4-phenylene, 2-fluoro-1,4-phenylene, 2,6-difluoro-1,4-phenylene, tetrahydropyran-2,5-diyl or 1,3-dioxane-2,5-diyl; and ring $A^2$ and ring $A^3$ are independently 1,4-cyclohexylene, 1,4-phenylene, 2-fluoro-1,4-phenylene or 2,6-difluoro-1,4-phenylene.

8. A liquid crystal composition, containing at least one of the compounds according to claim 1.

9. The liquid crystal composition according to claim 8, further containing at least one compound selected from the group of compounds represented by formulas (2) to (4):

wherein, in formulas (2) to (4), $R^{11}$ is alkyl having 1 to 10 carbons or alkenyl having 2 to 10 carbons, and in the alkyl and the alkenyl, at least one of hydrogen may be replaced by fluorine and at least one of —$CH_2$— may be replaced by —O—;

$X^{11}$ is fluorine, chlorine, —$OCF_3$, —$OCHF_2$, —$CF_3$, —$CHF_2$, —$CH_2F$, —$OCF_2CHF_2$ or —$OCF_2CHFCF_3$;

ring $B^1$, ring $B^2$ and ring $B^3$ are independently 1,4-cyclohexylene, 1,4-phenylene in which at least one of hydrogen may be replaced by fluorine, tetrahydropyran-2,5-diyl, 1,3-dioxane-2,5-diyl or pyrimidine-2,5-diyl;

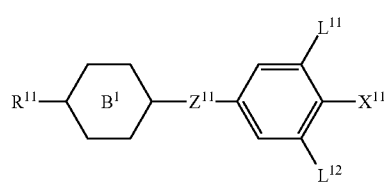
(2)

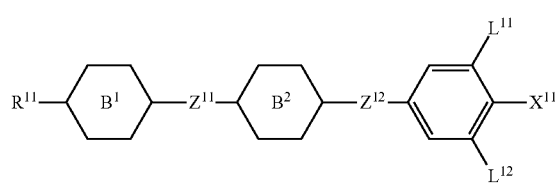
(3)

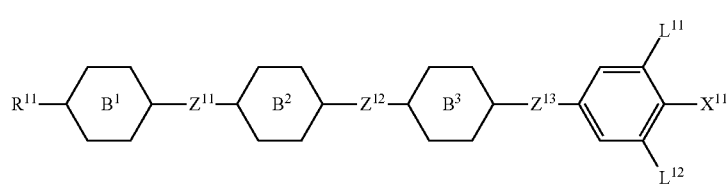
(4)

$Z^{11}$, $Z^{12}$ and $Z^{13}$ are independently a single bond, —CH$_2$CH$_2$—, —CH=CH—, —C≡C—, —COO—, —CF$_2$O—, —OCF$_2$—, —CH$_2$O— or —(CH$_2$)$_4$—; and $L^{11}$ and $L^{12}$ are independently hydrogen or fluorine.

10. The liquid crystal composition according to claim 8, further containing at least one compound selected from the group of compounds represented by formula (5):

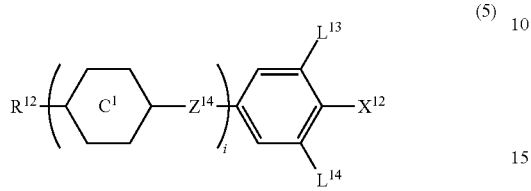
(5)

wherein, in formula (5), $R^{12}$ is alkyl having 1 to 10 carbons or alkenyl having 2 to 10 carbons, and in the alkyl and the alkenyl, at least one of hydrogen may be replaced by fluorine and at least one of —CH$_2$— may be replaced by —O—;

$X^{12}$ is —C≡N or —C≡C—C≡N;

ring $C^1$ is 1,4-cyclohexylene, 1,4-phenylene in which at least one of hydrogen may be replaced by fluorine, tetrahydropyran-2,5-diyl, 1,3-dioxan-2,5-diyl or pyrimidine-2,5-diyl;

$Z^{14}$ is a single bond, —CH$_2$CH$_2$—, —C≡C—, —COO—, —CF$_2$O—, —OCF$_2$— or —CH$_2$O—;

$L^{13}$ and $L^{14}$ are independently hydrogen or fluorine; and i is 1, 2, 3 or 4.

11. The liquid crystal composition according to claim 8, further containing at least one compound selected from the group of compounds represented by formulas (6) to (12):

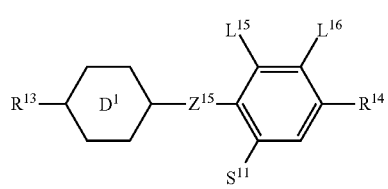
(6)

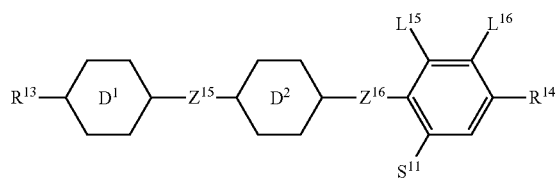
(7)

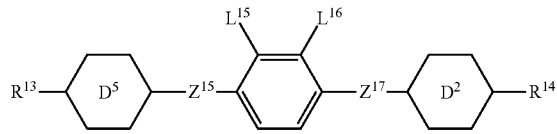
(8)

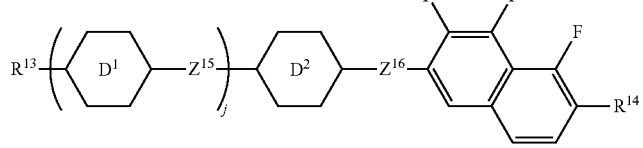
(9)

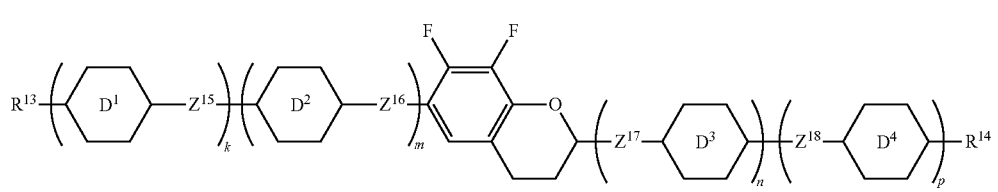
(10)

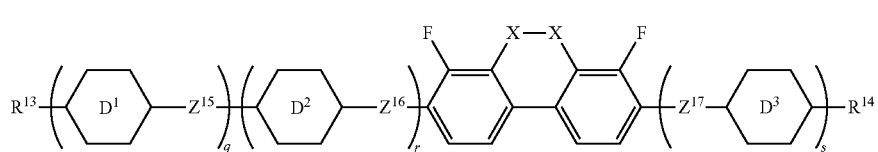
(11)

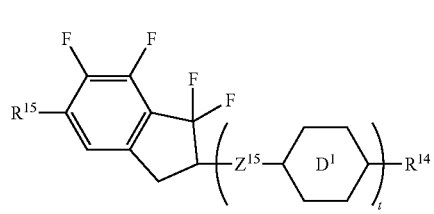
(12)

wherein, in formulas (6) to (12),

- $R^{13}$ and $R^{14}$ are independently alkyl having 1 to 10 carbons or alkenyl having 2 to 10 carbons, and in the alkyl and the alkenyl, at least one of —$CH_2$— may be replaced by —O— and at least one of hydrogen may be replaced by fluorine;
- $R^{15}$ is hydrogen, fluorine, alkyl having 1 to 10 carbons or alkenyl having 2 to 10 carbons, and in the alkyl and the alkenyl, at least one of —$CH_2$— may be replaced by —O— and at least one of hydrogen may be replaced by fluorine;
- $S^{11}$ is hydrogen or methyl;
- X is —$CF_2$—, —O— or —CHF—;
- ring $D^1$, ring $D^2$, ring $D^3$ and ring $D^4$ are independently 1,4-cyclohexylene, 1,4-cyclohexenylene, 1,4-phenylene in which at least one of hydrogen may be replaced by fluorine, tetrahydropyran-2,5-diyl or decahydronaphthalene-2,6-diyl;
- ring $D^5$ and ring $D^6$ are independently 1,4-cyclohexylene, 1,4-cyclohexenylene, 1,4-phenylene, tetrahydropyran-2,5-diyl or decahydronaphthalene-2,6-diyl;
- $Z^{15}$, $Z^{16}$, $Z^{17}$ and $Z^{18}$ are independently a single bond, —$CH_2CH_2$—, —COO—, —$CH_2O$—, —$OCF_2$— or —$OCF_2CH_2CH_2$—;
- $L^{15}$ and $L^{16}$ are independently fluorine or chlorine; and
- j, k, m, n, p, q, r and s are independently 0 or 1, a sum of k, m, n and p is 1 or 2, a sum of q, r and s is 0, 1, 2 or 3, and t is 1, 2 or 3.

12. The liquid crystal composition according to claim 8, further containing at least one compound selected from the group of compounds represented by formulas (13) to (15):

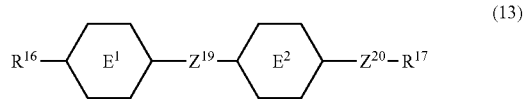

(13)

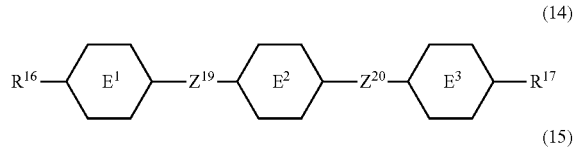

(14)

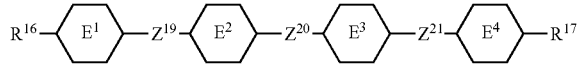

(15)

wherein, in formulas (13) to (15),

- $R^{16}$ and $R^{17}$ are independently alkyl having 1 to 10 carbons or alkenyl having 2 to 10 carbons, and in the alkyl or the alkenyl, at least one of —$CH_2$— may be replaced by —O— and at least one of hydrogen may be replaced by fluorine;
- ring $E^1$, ring $E^2$, ring $E^3$ and ring $E^4$ are independently 1,4-cyclohexylene, 1,4-phenylene, 2-fluoro-1,4-phenylene, 2,5-difluoro-1,4-phenylene or pyrimidine-2,5-diyl; and
- $Z^{19}$, $Z^{20}$ and $Z^{21}$ are independently a single bond, —$CH_2CH_2$—, —CH=CH—, —C≡C— or —COO—.

13. The liquid crystal composition according to claim 8, further containing at least one of a polymerizable compound, an optically active compound, an antioxidant, an ultraviolet light absorber, a light stabilizer, a heat stabilizer and a defoaming agent.

14. A liquid crystal display device, including the liquid crystal composition according to claim 8.

* * * * *